United States Patent
Nielsen et al.

(10) Patent No.: US 8,620,726 B2
(45) Date of Patent: Dec. 31, 2013

(54) METHODS AND APPARATUS FOR ANALYZING LOCATE AND MARKING OPERATIONS BY COMPARING LOCATE INFORMATION AND MARKING INFORMATION

(75) Inventors: Steven Nielsen, North Palm Beach, FL (US); Curtis Chambers, Palm Beach Gardens, FL (US); Jeffrey Farr, Jupiter, FL (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 227 days.

(21) Appl. No.: 12/850,187

(22) Filed: Aug. 4, 2010

(65) Prior Publication Data

US 2011/0046999 A1     Feb. 24, 2011

Related U.S. Application Data

(63) Continuation-in-part of application No. 12/493,109, filed on Jun. 26, 2009, and a continuation-in-part of application No. 12/569,192, filed on Sep. 29, 2009, and a continuation-in-part of application No. 12/572,202, filed on Oct. 1, 2009, and a continuation-in-part of application No. 12/703,958, filed on Feb. 11, 2010, now Pat. No. 8,442,766, and a continuation-in-part of application No. 12/704,087, (Continued)

(51) Int. Cl.
*G06Q 10/00*     (2012.01)

(52) U.S. Cl.
USPC ........................................................ 705/7.38

(58) Field of Classification Search
USPC ........................................................ 705/7.38
See application file for complete search history.

(56) References Cited

U.S. PATENT DOCUMENTS

| 4,208,653 | A | 6/1980 | Abe |
| 4,455,509 | A | 6/1984 | Crum et al. |

(Continued)

FOREIGN PATENT DOCUMENTS

| CA | 2386200 | 4/2000 |
| CA | 2435290 | 8/2002 |

(Continued)

OTHER PUBLICATIONS

CGA Common Ground Alliance, Best Practice Version 3.0, published Mar. 2006.*

(Continued)

*Primary Examiner* — Peter Choi
*Assistant Examiner* — Nadja Chong Cruz

(57) ABSTRACT

Methods, apparatus and systems including a computer comprising at least one hardware processor, at least one tangible storage medium (memory), and at least one input/output (I/O) interface for evaluating a quality of a locate and/or marking operation. First information relating to the marking operation (e.g., marking information) is compared to second information relating to the locate operation (e.g., locate information). In some examples, one or both of the marking information and the locate information may be filtered to improve data integrity in some manner. One or more indications of a quality assessment of the locate and/or marking operation is automatically generated based on such a comparison, and the one or more indications of the quality assessment are electronically stored on the at least one tangible storage medium, and/or electronically transmitted via the at least one I/O interface, so as to provide an electronic record of the quality assessment.

23 Claims, 12 Drawing Sheets

Related U.S. Application Data filed on Feb. 11, 2010, and a continuation-in-part of application No. 12/703,809, filed on Feb. 11, 2010.

(60) Provisional application No. 61/102,151, filed on Oct. 2, 2008, provisional application No. 61/102,169, filed on Oct. 2, 2008, provisional application No. 61/102,186, filed on Oct. 2, 2008, provisional application No. 61/102,205, filed on Oct. 2, 2008, provisional application No. 61/184,092, filed on Jun. 4, 2009, provisional application No. 61/220,491, filed on Jun. 25, 2009, provisional application No. 61/102,122, filed on Oct. 2, 2008, provisional application No. 61/151,574, filed on Feb. 11, 2009, provisional application No. 61/232,112, filed on Aug. 7, 2009, provisional application No. 61/235,519, filed on Aug. 20, 2009, provisional application No. 61/151,578, filed on Feb. 11, 2009, provisional application No. 61/174,081, filed on Apr. 30, 2009, provisional application No. 61/172,843, filed on Apr. 27, 2009, provisional application No. 61/151,760, filed on Feb. 11, 2009, provisional application No. 61/151,778, filed on Feb. 11, 2009.

(56) References Cited

U.S. PATENT DOCUMENTS

| | | |
|---|---|---|
| 4,550,376 A | 10/1985 | Maciejczak |
| 5,103,920 A | 4/1992 | Patton |
| 5,486,067 A | 1/1996 | Huynh |
| 5,918,565 A | 7/1999 | Casas |
| 6,138,906 A | 10/2000 | DeMayo |
| 6,169,517 B1 | 1/2001 | Eslambolchi |
| 6,421,725 B1 | 7/2002 | Vermilyea et al. |
| 6,512,312 B1 | 1/2003 | Herkenrath et al. |
| 6,526,526 B1 | 2/2003 | Dong et al. |
| 6,578,005 B1 | 6/2003 | Lesaint et al. |
| 6,601,017 B1 * | 7/2003 | Kennedy et al. ............. 702/182 |
| 6,684,250 B2 | 1/2004 | Anderson |
| 6,748,340 B2 | 6/2004 | Otsuki |
| 6,751,553 B2 | 6/2004 | Young |
| 6,751,554 B1 | 6/2004 | Asher et al. |
| 6,845,148 B1 | 1/2005 | Beamon |
| 6,915,211 B2 | 7/2005 | Kram et al. |
| 6,938,048 B1 | 8/2005 | Jilk et al. |
| 6,949,052 B2 | 9/2005 | Millington et al. |
| 6,958,690 B1 | 10/2005 | Asher et al. |
| 6,980,929 B2 | 12/2005 | Aronstam et al. |
| 6,996,210 B2 | 2/2006 | Esty et al. |
| 7,003,443 B2 | 2/2006 | Ford |
| 7,003,475 B1 | 2/2006 | Friedland et al. |
| 7,079,990 B2 | 7/2006 | Haller et al. |
| 7,313,759 B2 | 12/2007 | Sinisi |
| 7,324,905 B2 | 1/2008 | Droubie |
| 7,372,247 B1 | 5/2008 | Giusti et al. |
| 7,398,184 B1 | 7/2008 | Chen |
| 7,469,247 B2 | 12/2008 | Cossins et al. |
| 7,626,496 B1 | 12/2009 | Asher et al. |
| 7,640,105 B2 | 12/2009 | Nielsen et al. |
| 7,741,848 B1 | 6/2010 | Olsson |
| 7,773,095 B1 * | 8/2010 | Badrak et al. ............. 345/619 |
| 7,889,124 B2 | 2/2011 | Islam et al. |
| 7,986,246 B2 | 7/2011 | Angelis et al. |
| 8,040,272 B1 | 10/2011 | Clodfelter et al. |
| 8,060,304 B2 | 11/2011 | Nielsen et al. |
| 8,077,072 B2 | 12/2011 | Mohamadi et al. |
| 8,127,865 B2 | 3/2012 | Watson et al. |
| 8,311,765 B2 | 11/2012 | Nielsen et al. |
| 8,463,487 B2 | 6/2013 | Nielsen et al. |
| 8,467,932 B2 | 6/2013 | Nielsen et al. |
| 2002/0029161 A1 | 3/2002 | Brodersen |
| 2002/0032028 A1 | 3/2002 | Kaupe |
| 2002/0038076 A1 | 3/2002 | Sheehan et al. |
| 2002/0055870 A1 | 5/2002 | Thomas |
| 2002/0153134 A1 | 10/2002 | Newman |
| 2002/0184235 A1 | 12/2002 | Young |
| 2003/0110184 A1 | 6/2003 | Gibson et al. |
| 2003/0130820 A1 * | 7/2003 | Lane, III ............. 702/184 |
| 2003/0168834 A1 | 9/2003 | Ulrich |
| 2003/0177027 A1 | 9/2003 | DiMarco |
| 2003/0177051 A1 | 9/2003 | Driscoll et al. |
| 2003/0212621 A1 | 11/2003 | Poulter |
| 2003/0216949 A1 | 11/2003 | Kram et al. |
| 2004/0236620 A1 | 11/2004 | Chauhan et al. |
| 2005/0033620 A1 | 2/2005 | Gloor et al. |
| 2005/0057745 A1 | 3/2005 | Bontje |
| 2005/0232475 A1 | 10/2005 | Floeder |
| 2005/0240649 A1 | 10/2005 | Elkington |
| 2005/0278371 A1 | 12/2005 | Funk et al. |
| 2006/0026020 A1 | 2/2006 | Waite et al. |
| 2006/0077095 A1 * | 4/2006 | Tucker et al. ............. 342/357.08 |
| 2006/0085133 A1 | 4/2006 | Young |
| 2006/0085396 A1 | 4/2006 | Evans |
| 2006/0087402 A1 | 4/2006 | Manning |
| 2006/0091888 A1 | 5/2006 | Holman et al. |
| 2006/0206370 A1 | 9/2006 | Skopal |
| 2006/0235741 A1 | 10/2006 | Deaton et al. |
| 2006/0245572 A1 | 11/2006 | Asher |
| 2006/0282280 A1 * | 12/2006 | Stotz et al. ............. 705/1 |
| 2007/0127694 A1 | 6/2007 | Hajj et al. |
| 2007/0219722 A1 | 9/2007 | Sawyer, Jr. |
| 2007/0288159 A1 | 12/2007 | Skelton |
| 2008/0010009 A1 | 1/2008 | Miyoshi |
| 2008/0017416 A1 | 1/2008 | Watson |
| 2008/0025614 A1 | 1/2008 | Hintz et al. |
| 2008/0121684 A1 * | 5/2008 | Gualandri ............. 235/375 |
| 2008/0125942 A1 | 5/2008 | Tucker et al. |
| 2008/0137589 A1 | 6/2008 | Barrett |
| 2009/0013928 A1 | 1/2009 | Nielsen et al. |
| 2009/0157746 A1 | 6/2009 | More et al. |
| 2009/0184823 A1 | 7/2009 | Tessier |
| 2009/0201178 A1 | 8/2009 | Nielsen et al. |
| 2009/0201311 A1 | 8/2009 | Nielsen et al. |
| 2009/0202101 A1 | 8/2009 | Nielsen et al. |
| 2009/0202110 A1 | 8/2009 | Nielsen et al. |
| 2009/0202111 A1 | 8/2009 | Nielsen et al. |
| 2009/0202112 A1 | 8/2009 | Nielsen et al. |
| 2009/0204238 A1 | 8/2009 | Nielsen et al. |
| 2009/0204466 A1 | 8/2009 | Nielsen et al. |
| 2009/0204614 A1 | 8/2009 | Nielsen et al. |
| 2009/0204625 A1 | 8/2009 | Nielsen et al. |
| 2009/0207019 A1 | 8/2009 | Nielsen et al. |
| 2009/0208642 A1 | 8/2009 | Nielsen et al. |
| 2009/0210098 A1 | 8/2009 | Nielsen et al. |
| 2009/0210284 A1 | 8/2009 | Nielsen et al. |
| 2009/0210285 A1 | 8/2009 | Nielsen et al. |
| 2009/0210297 A1 | 8/2009 | Nielsen et al. |
| 2009/0210298 A1 | 8/2009 | Nielsen et al. |
| 2009/0223355 A1 | 9/2009 | Manders |
| 2009/0237408 A1 | 9/2009 | Nielsen et al. |
| 2009/0238414 A1 | 9/2009 | Nielsen et al. |
| 2009/0238415 A1 | 9/2009 | Nielsen et al. |
| 2009/0238416 A1 | 9/2009 | Nielsen et al. |
| 2009/0238417 A1 | 9/2009 | Nielsen et al. |
| 2009/0241045 A1 | 9/2009 | Nielsen et al. |
| 2009/0241046 A1 | 9/2009 | Nielsen et al. |
| 2009/0265430 A1 | 10/2009 | Bechtel |
| 2009/0289637 A1 | 11/2009 | Radtke |
| 2009/0324815 A1 | 12/2009 | Nielsen et al. |
| 2009/0327024 A1 | 12/2009 | Nielsen et al. |
| 2010/0006667 A1 | 1/2010 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0034483 A1 | 2/2010 | Giuffrida |
| 2010/0084532 A1 | 4/2010 | Nielsen et al. |
| 2010/0085054 A1 | 4/2010 | Nielsen et al. |
| 2010/0085376 A1 | 4/2010 | Nielsen et al. |
| 2010/0085694 A1 | 4/2010 | Nielsen et al. |
| 2010/0085701 A1 | 4/2010 | Nielsen et al. |
| 2010/0086671 A1 | 4/2010 | Nielsen et al. |

(56) References Cited

U.S. PATENT DOCUMENTS

| | | |
|---|---|---|
| 2010/0086677 A1 | 4/2010 | Nielsen et al. |
| 2010/0088031 A1 | 4/2010 | Nielsen et al. |
| 2010/0088032 A1 | 4/2010 | Nielsen et al. |
| 2010/0088134 A1 | 4/2010 | Nielsen et al. |
| 2010/0088135 A1 | 4/2010 | Nielsen et al. |
| 2010/0088164 A1 | 4/2010 | Nielsen et al. |
| 2010/0090700 A1 | 4/2010 | Nielsen et al. |
| 2010/0090858 A1 | 4/2010 | Nielsen et al. |
| 2010/0094553 A1 | 4/2010 | Nielsen et al. |
| 2010/0097224 A1 | 4/2010 | Prodanovich |
| 2010/0117654 A1 | 5/2010 | Nielsen et al. |
| 2010/0146454 A1 | 6/2010 | Sugahara |
| 2010/0170453 A1 | 7/2010 | Betzer-Zilevitch |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188245 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0201706 A1 | 8/2010 | Nielsen et al. |
| 2010/0205031 A1 | 8/2010 | Nielsen et al. |
| 2010/0205032 A1 | 8/2010 | Nielsen et al. |
| 2010/0205195 A1 | 8/2010 | Nielsen et al. |
| 2010/0205264 A1 | 8/2010 | Nielsen et al. |
| 2010/0205536 A1 | 8/2010 | Nielsen et al. |
| 2010/0205554 A1 | 8/2010 | Nielsen et al. |
| 2010/0205555 A1 | 8/2010 | Nielsen et al. |
| 2010/0228588 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0255182 A1 | 10/2010 | Nielsen et al. |
| 2010/0256825 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |
| 2010/0263591 A1 | 10/2010 | Nielsen et al. |
| 2010/0268786 A1 | 10/2010 | Nielsen et al. |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2010/0324967 A1 | 12/2010 | Nielsen et al. |
| 2011/0006772 A1 | 1/2011 | Olsson |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0060496 A1 | 3/2011 | Nielsen et al. |
| 2011/0060549 A1 | 3/2011 | Nielsen et al. |
| 2011/0093306 A1 | 4/2011 | Nielsen et al. |
| 2011/0095885 A9 | 4/2011 | Nielsen et al. |
| 2011/0117272 A1 | 5/2011 | Nielsen et al. |
| 2011/0131081 A1 | 6/2011 | Nielsen et al. |
| 2011/0135163 A1 | 6/2011 | Nielsen et al. |
| 2011/0137769 A1 | 6/2011 | Nielsen et al. |
| 2011/0236588 A1 | 9/2011 | Nielsen et al. |
| 2011/0249394 A1 | 10/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0282542 A9 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |
| 2012/0113244 A1 | 5/2012 | Nielsen et al. |
| 2012/0274476 A1 | 11/2012 | Nielsen et al. |
| 2012/0328162 A1 | 12/2012 | Nielsen et al. |
| 2012/0330849 A1 | 12/2012 | Nielsen et al. |
| 2013/0002854 A1 | 1/2013 | Nielsen et al. |
| 2013/0006718 A1 | 1/2013 | Nielsen et al. |
| 2013/0044918 A1 | 2/2013 | Nielsen et al. |
| 2013/0085670 A1 | 4/2013 | Nielsen et al. |
| 2013/0101180 A1 | 4/2013 | Nielsen et al. |
| 2013/0103318 A1 | 4/2013 | Nielsen et al. |
| 2013/0116855 A1 | 5/2013 | Nielsen et al. |
| 2013/0125042 A1 | 5/2013 | Nielsen et al. |
| 2013/0135343 A1 | 5/2013 | Nielsen et al. |

FOREIGN PATENT DOCUMENTS

| | | |
|---|---|---|
| CA | 2641355 | 8/2007 |
| JP | 2005327228 | 11/2005 |
| JP | 2006189930 | 7/2006 |
| WO | WO9516827 | 6/1995 |
| WO | WO0228541 | 4/2002 |

OTHER PUBLICATIONS

Alstete, Jeffrey W, Benchmarking in Higher Education: Adapting Best Practices to Improve Quality, ASHE-ERIC Higher Education Report No. 5, 1995.*
U.S. Appl. No. 12/204,454, filed Sep. 4, 2008, Nielsen et al.
U.S. Appl. No. 12/364,339, filed Feb. 2, 2009, Nielsen et al.
U.S. Appl. No. 12/432,849, filed Apr. 30, 2009, Nielsen et al.
U.S. Appl. No. 12/432,860, filed Apr. 30, 2009, Nielsen et al.
U.S. Appl. No. 12/432,870, filed Apr. 30, 2009, Nielsen et al.
U.S. Appl. No. 12/432,878, filed Apr. 30, 2009, Nielsen et al.
U.S. Appl. No. 12/432,909, filed Apr. 30, 2009, Nielsen et al.
U.S. Appl. No. 12/493,109, filed Jun. 26, 2009, Nielsen et al.
U.S. Appl. No. 12/537,732, filed Aug. 7, 2009, Nielsen et al.
U.S. Appl. No. 12/537,856, filed Aug. 7, 2009, Nielsen et al.
U.S. Appl. No. 12/537,894, filed Aug. 7, -2009, Nielsen et al.
U.S. Appl. No. 12/537,917, filed Aug. 7, 2009, Nielsen et al.
U.S. Appl. No. 12/571,356, filed Sep. 30, 2009, Nielsen et al.
U.S. Appl. No. 12/572,202, filed Oct. 1, 2009, Nielsen et al.
U.S. Appl. No. 12/572,260, filed Oct. 1, 2009, Nielsen et al.
U.S. Appl. No. 12/850,712, filed Aug. 5, 2010, Nielsen et al.
CGA, Common Ground Alliance, Best Practices, Version 1.0, Apr. 2003, 93 pages.
CGA, Common Ground Alliance, Best Practices, Version 3.0, Mar. 2006, 100 pages.
CGA, Common Ground Alliance, Best Practices, Version 5.0, Mar. 2008, http://web.archive.org/web/20101009040317/http://www.commongroundalliance.com/Content/NavigationMenu/Best_Practices/Best_Practices_2008/BP_5.0_March2008_Fial.pdf.
CGA, Common Ground, Study of One-Call Systems and Damage Prevention Best Practices, Aug. 1999, 262 pages.
Charlton, B.G. et al., "Auditing as a tool of public policy—The misuse of quality assurance techniques in the UK university expansion," Final draft of a paper published in European Political Science 2002; 2: 24-35.

(56) References Cited

OTHER PUBLICATIONS

GPS Visualizer: Free geocoder: Convert address to coordinates, http://web.archive.org/web/20070304090412/http://www.gpsvisualizer.com/geocoding.html, Mar. 2007, 1 page.
Haas, J. et al., "Feed the FLAME—Utility Integrates Field Applications," GeoWorld, Mar. 2007, 5 pages, online: Systems Integration Articles/Enspiria Solutions.
International Search Report and Written Opinion, Application No. PCT/2009/05416, Jun. 7, 2010.
International Search Report and Written Opinion, Application No. PCT/2009/05443, Apr. 5, 2010.
International Search Report and Written Opinion, Application No. PCT/US2009/03810, Aug. 17, 2010.
Office Action dated Apr. 28, 2011 from U.S. Appl. No. 12/204,454.
Office Action dated Sep. 26, 2011 from Canadian Application No. 2,739,090.
Office Action dated Sep. 26, 2011 from Canadian Application No. 2,739,110.
Office Action dated Sep. 27, 2011 from Canadian Application No. 2,739,094.
Office Action dated Oct. 11, 2011 from Canadian Application No. 2,691,780.
Office Action dated Oct. 11, 2011 from U.S. Appl. No. 12/432,849.
Office Action dated Oct. 11, 2011 from U.S. Appl. No. 12/432,878.
Office Action dated Oct. 11, 2011 from U.S. Appl. No. 12/432,909.
Office Action dated Nov. 21, 2011 from U.S. Appl. No. 12/204,454.
Office Action dated Dec. 6, 2011 from U.S. Appl. No. 12/432,870.
Office Action dated Dec. 7, 2011 from U.S. Appl. No. 12/537,856.
Office Action dated Dec. 9, 2011 from U.S. Appl. No. 12/493,109.
Office Action dated Dec. 12, 2011 from U.S. Appl. No. 12/537,917.
Office Action dated Dec. 13, 2011 from U.S. Appl. No. 12/537,894.
Office Action dated Dec. 19, 2011 from U.S. Appl. No. 12/571,356.
Office Action dated Dec. 22, 2011 from U.S. Appl. No. 12/537,732.
One Call Concepts Locating Services, Inc., Point Positive Utility Mapping & GIS, http://www.occls.com/Default.aspx?content=pointpositive, original publication date unknown, retrieved Sep. 21, 2011, 1 page.
Stahovich, David M. et al., "Automated and Integrated Call Before You Dig," Proceedings of GITA 2005, GITA's 18th Annual Conference, Mar. 6-9, 2005, Denver, CO, online: GIS for Oil & Gas Conference 2002 <http://www.gisdevelopment.net/proceedings/gita/2005/papers/76.pdf>.
Tetra Tech NUS, "Standard Operation Procedures," Dec. 2003 [retrieved on Jul. 27, 2010, http://htl.mclinc.org/%5CWillowGroveNASAdminRecord%5CPdfs%5CFinal21345_appendA.pdf>, 315 pages.
Whiting, P., "No role for quality scores in systematic reviews of diagnostic accuracy studies," BMC Medical Research Methodology, 2005, 5:19, 9 pages.
U.S. Appl. No. 12/571,408, filed Sep. 30, 2009, Nielsen et al.
Office Action dated Feb. 14, 2012 from U.S. Appl. No. 12/833,103.
Office Action dated Feb. 29. 2012 from U.S. Appl. No. 12/833,127.
Office Action dated Mar. 1, 2012 from U.S. Appl. No. 12/833,121.
Office Action dated Apr. 4, 2012 from U.S. Appl. No. 12/572,202.
Cardno Tbe, "Locating Underground Utilities Before Construction," Airport Facilities, Fall 2004, http://www.subsurfaceutilityengineering.com/articles/Locating_Utilities.asp, 2 pages.
Dockter, L., Development of an Underground Utility Damage Prevention Plan (UUDPP) for Company XYZ, The Graduate College, University of Wisconsin-Stout, 2008, http://www2.uwstout.edu/content/lib/thesis/2008/2008dockterl.pdf.
Notice of Allowance dated Apr. 17, 2012 from U.S. Appl. No. 12/432,870.
Notice of Allowance dated Aug. 1, 2012 from U.S. Appl. No. 12/364,339.
Office Action dated May 9, 2012 from U.S. Appl. No. 12/432,909.
Office Action dated May 11, 2012 from Australian Application No. 2009300343.
Office Action dated May 22, 2012 from U.S. Appl. No. 12/432,849.
Office Action dated May 22, 2012 from U.S. Appl. No. 12/572,260.
Office Action dated May 22, 2012 from U.S. Appl. 12/432,878.
Office Action dated May 31, 2012 from Australian Application No. 2009300323.
Office Action dated Jun. 1, 2012 from Australian Application No. 2009300342.
Office Action dated Jun. 14, 2012 from U.S. Appl. No. 12/432,860.
Office Action dated Jul. 9, 2012 from U.S. Appl. No. 12/493,109.
Office Action dated Jul. 12, 2012 from U.S. Appl. No. 12/537,856.
Office Action dated Jul. 16, 2012 from Canadian Application No. 2,691,780.
Office Action dated Jul. 26, 2012 from Canadian Application No. 2,712,126.
Office Action dated Jul. 31, 2012 from U.S. Appl. No. 12/204,454.
Office Action dated Aug. 21, 2012 from U.S. Appl. No. 12/537,894.
Office Action dated Aug. 21, 2012 from U.S. Appl. No. 12/537,917.
Office Action dated Sep. 25, 2012 from Australian Application No. 2010214066.
Office Action dated Oct. 15, 2012 from U.S. Appl. No. 12/850,712.
Office Action dated Feb. 4, 2013 from Canadian Application No. 2,729,590.
Office Action dated Feb. 6, 2013 from U.S. Appl. No. 12/833,121.
Office Action dated Feb. 12, 2013 from U.S. Appl. No. 12/833,103.
Office Action dated Feb. 12, 2013 from U.S. Appl. No. 12/833,117.
Office Action dated Feb. 12, 2013 from U.S. Appl. No. 12/833,127.
Cardno Tbe, "Subsurface Utility Engineering Services," retrieved from http://web.archive.org, Aug. 28, 2008, 38 pages.
Office Action dated Jan. 29, 2013 from U.S. Appl. No. 12/704,485.
Office Action dated Nov. 7, 2012 from U.S. Appl. No. 12/572,202.
Notice of Allowance dated May 20, 2013 from U.S. Appl. No. 12/432,860.
Office Action dated May 23, 2013 from U.S. Appl. No. 12/572,202.
Nielsen et al., co-pending U.S. Publication No. 2013-0006718, published Jan. 3, 2013.
Office Action dated Apr. 18, 2013 from U.S. Appl. No. 12/571,356.
Office Action dated Mar. 27, 2013 from U.S. Appl. No. 12/850,712.
Office Action dated Apr. 24, 2013 from U.S. Appl. No. 12/432,909.
Bauer, S. et al., "Quantification of groundwater contamination in an urban area using integral pumping tests," Journal of Contaminant Hydrology; vol. 75, Issues 3-4; Dec. 2004, pp. 183-213.
Holder, T. et al., A new approach for source zone characterization: the Neckar Valley study. Groundwater Quality: Remediation and Protection, IAHS Publication, vol. 250, IAHS Press, Wallingford, Oxfordshire, UK, pp. 49-55.
Maqsood, I et al., Simulation-based risk assessment of contaminated sites under remediation scenarios, planning periods, and land-use patterns-a Canadian case study, Stoch Environ Res Risk Assess 2005, 19:146-157.
Mike Herbert, Karel Kovar, Universitat Tubingen Geological Institute "Groundwater Quality: Remediation and Projection" IAHS Publication No. 250, Proceedings of the GQ conference held in Tubingen, German from Sep. 21 to 25 (1998).
Notice of Allowance dated Jun. 21, 2013 from U.S. Appl. No. 12/572,260.
Office Action dated Jun. 19, 2013 from U.S. Appl. No. 12/704,485.
Office Action dated Jun. 20, 2013 from U.S. Appl. No. 12/833,117.
Office Action dated Jun. 20, 2013 from U.S. Appl. No. 12/833,127.
Office Action dated Jun. 25, 2013 from U.S. Appl. No. 12/833,121.
Office Action dated Aug. 29, 2013 from U.S. Appl. No. 13/465,524.
Patent Examination Report No. 2, Australian Application No. 2009300342, Jul. 1, 2013.
Schwarz, R. et al., 1998 Groundwater risk assessment at contaminated sites: a new investigation approach. In: Herbert, M., Kovar, K. (Eds.), GQ'98 Groundwater Quality: Remediation and Protection, IAHS Publication, vol. 250, pp. 68-71.
Office Action dated Oct. 16, 2013 from Canadian Application No. 2,691,780.
Office Action dated Sep. 24, 2013 from Canadian Application No. 2,739,094.
Office Action dated Sep. 24, 2013 from Canadian Application No. 2,739,090.
Office Action dated Aug. 29, 2013 from Canadian Application No. 2,739,090.
Office Action dated Aug. 21, 2013 from Canadian Application No. 2,739,110.
Office Action dated Oct. 10, 2013 from U.S. Appl. No. 12/850,712.

* cited by examiner

| | |
|---|---|
| Timestamp (2005-10-20 09:43) | Facility Type Identifier (Power) |
| Facility Mark Location (N38° 51.40748, W077°20.27798;...; N38° 51 1.40784, W077°20.27865) | |
| Environmental Landmark Identifier (Curb) | |
| Environmental Landmark Location (N38° 51.40756, W077°20.27805;...; N38° 51 1.40733, W077°20.27858) | |
| Other Information (1.2 Meters Between Curb and Power Line) | |
| Facility Owner/Operator (ABC Corp) | Marking Method (Red Paint) |
| Property Address (555 Main Street, 22220) | Ticket Number (1234567) |
| Location Stamp (N38° 51.40752, W077°20.27840) | Certification (Joe Locator) |

FIG. 6

METHODS AND APPARATUS FOR ANALYZING LOCATE AND MARKING OPERATIONS BY COMPARING LOCATE INFORMATION AND MARKING INFORMATION

CROSS-REFERENCES TO RELATED APPLICATIONS

This application claims a priority benefit, under 35 U.S.C. §120, as a continuation-in-part (CIP) of U.S. Non-provisional patent application Ser. No. 12/572,202, entitled "Methods and Apparatus for Analyzing Locate and Marking Operation with Respect to Historical Information," filed Oct. 1, 2009.

The application claims a priority benefit, under 35 U.S.C. §120, as a continuation-in-part (CIP) of U.S. Non-provisional patent application Ser. No. 12/703,958, entitled "Marking Apparatus Having Enhanced Features for Underground Facility Marking Operations, and Associated Methods and Systems," filed Feb. 11, 2010.

Ser. No. 12/703,958 claims a priority benefit, under 35 U.S.C. §119(e), to U.S. Provisional Application Ser. No. 61/151,574, entitled "Marking Device that has Enhanced Features for Underground Facility Locate Operations," filed on Feb. 11, 2009.

Ser. No. 12/703,958 also claims a priority benefit, under 35 U.S.C. §119(e), to U.S. Provisional Application Ser. No. 61/232,112, entitled "Methods and Apparatus for Detecting and Monitoring Use of Locating Equipment for Out-Of-Tolerance Conditions," filed on Aug. 7, 2009.

Ser. No. 12/703,958 also claims a priority benefit, under 35 U.S.C. §119(e), to U.S. Patent Application Ser. No. 61/235,519, entitled "Marking Device With Accelerometer and Local Data Storage," filed Aug. 20, 2009.

This application claims a priority benefit, under 35 U.S.C. §120, as a continuation-in-part (CIP) of U.S. Non-provisional patent application Ser. No. 12/704,087, entitled "Locate Apparatus Having Enhanced Features for Underground Facility Locate Operations, and Associated Methods and Systems," filed on Feb. 11, 2010.

Ser. No. 12/704,087 claims a priority benefit, under 35 U.S.C. §119(e), to U.S. Provisional Application Ser. No. 61/151,578, entitled "Locating equipment that has enhanced features for underground facility locate operations," filed on Feb. 11, 2009.

This application claims a priority benefit, under 35 U.S.C. §120, as a continuation-in-part (CIP) of U.S. Non-provisional patent application Ser. No. 12/493,109, entitled "Methods and Apparatus for Quality Assessment of a Field Service Operation," filed Jun. 26, 2009.

Ser. No. 12/493,109 in turn claims the benefit, under 35 U.S.C. §119(e), to U.S. Provisional Application Ser. No. 61/102,151, entitled "Data Acquisition System For And Method Of Analyzing Locate Operations Based On Marking Device Actuations," filed Oct. 2, 2008.

Ser. No. 12/493,109 also claims the benefit, under 35 U.S.C. §119(e), to U.S. Provisional Application Ser. No. 61/102,169, entitled "Data Acquisition System For And Method Of Analyzing Locate Operations With Respect To Facilities Maps," filed Oct. 2, 2008.

Ser. No. 12/493,109 also claims the benefit, under 35 U.S.C. §119(e), to U.S. Provisional Application Ser. No. 61/102,186, entitled "Data Acquisition System For And Method Of Analyzing Locate Operations With Respect To Historical Tickets," filed Oct. 2, 2008.

Ser. No. 12/493,109 also claims the benefit, under 35 U.S.C. §119(e), to U.S. Provisional Application Ser. No. 61/102,205, entitled "Data Acquisition For And Method Of Analyzing Locate Operations With Respect To Environmental Landmarks," filed Oct. 2, 2008.

Ser. No. 12/493,109 also claims the benefit, under 35 U.S.C. §119(e), to U.S. Provisional Application Ser. No. 61/184,092, entitled "System For And Method Of Determining A Locate Operations Quality Assessment Score," filed Jun. 4, 2009.

Ser. No. 12/493,109 also claims the benefit, under 35 U.S.C. §119(e), to U.S. Provisional Application Ser. No. 61/220,491, entitled "Methods and Apparatus for Assessing Field Service Operation Tickets," filed Jun. 25, 2009.

This application also claims a priority benefit, under 35 U.S.C. §120, as a continuation-in-part (CIP) of U.S. Non-provisional application Ser. No. 12/569,192, entitled "Methods, Apparatus, and Systems for Generating Electronic Records of Locate and Marking Operations, and Combined Locate and Marking Apparatus for Same," filed on Sep. 29, 2009.

Ser. No. 12/569,192 in turn claims the benefit, under 35 U.S.C. §119(e), of U.S. Provisional Application Ser. No. 61/102,122, entitled "Combination Locate and Marking Device With a Data Acquisition System Installed Therein, and Associated Methods", filed on Oct. 2, 2008.

This application also claims a priority benefit, under 35 U.S.C. §120, as a continuation-in-part (CIP) of U.S. Non-provisional application Ser. No. 12/703,809, entitled "Marking Apparatus Equipped with Ticket Processing Software for Facilitating Marking Operations, and Associated Methods," filed on Feb. 11, 2010.

Ser. No. 12/703,809 in turn claims the benefit, under 35 U.S.C. §119(e), to U.S. Provisional Application Ser. No. 61/174,081, entitled "Methods and Apparatus for Generating and Processing Workflows in Connection with Locate Operations," filed on Apr. 30, 2009.

Ser. No. 12/703,809 also claims the benefit, under 35 U.S.C. §119(e), to U.S. Provisional Application Ser. No. 61/172,843, entitled "Locate Technician Checklist Integrated in a Marking Device and/or Locating Equipment and Methods of Using Same," filed on Apr. 27, 2009.

Ser. No. 12/703,809 also claims the benefit, under 35 U.S.C. §119(e), to U.S. Provisional Application Ser. No. 61/151,760, entitled "Locate Technician Checklist Integrated in a Marking Device and/or Locating Equipment and Methods of Using Same," filed on Feb. 11, 2009.

Ser. No. 12/703,809 also claims the benefit, under 35 U.S.C. §119(e), to U.S. Provisional Application Ser. No. 61/151,778, entitled "Marking Device that has a Ticket Management Mechanism Integrated Therein and Associated Methods," filed on Feb. 11, 2009.

Each of the above-identified applications is incorporated by reference herein in its entirety.

BACKGROUND

Field service operations may be any operation in which companies dispatch technicians and/or other staff to perform certain activities, for example, installations, services and/or repairs. Field service operations may exist in various industries, examples of which include, but are not limited to, network installations, utility installations, security systems, construction, medical equipment, heating, ventilating and air conditioning (HVAC) and the like.

An example of a field service operation in the construction industry is a so-called "locate and marking operation," also commonly referred to more simply as a "locate operation" (or sometimes merely as "a locate"). In a typical locate operation, a locate technician visits a work site in which there is a plan to disturb the ground (e.g., excavate, dig one or more holes and/or trenches, bore, etc.) so as to determine a presence or an absence of one or more underground facilities (such as various types of utility cables and pipes) in a dig area to be excavated or disturbed at the work site. In some instances, a locate operation may be requested for a "design" project, in which there may be no immediate plan to excavate or otherwise disturb the ground, but nonetheless information about a presence or absence of one or more underground facilities at a work site may be valuable to inform a planning, permitting and/or engineering design phase of a future construction project.

In many states, an excavator who plans to disturb ground at a work site is required by law to notify any potentially affected underground facility owners prior to undertaking an excavation activity. Advanced notice of excavation activities may be provided by an excavator (or another party) by contacting a "one-call center." One-call centers typically are operated by a consortium of underground facility owners for the purposes of receiving excavation notices and in turn notifying facility owners and/or their agents of a plan to excavate. As part of an advanced notification, excavators typically provide to the one-call center various information relating to the planned activity, including a location (e.g., address) of the work site and a description of the dig area to be excavated or otherwise disturbed at the work site.

FIG. 1 illustrates an example in which a locate operation is initiated as a result of an excavator 110 providing an excavation notice to a one-call center 120. An excavation notice also is commonly referred to as a "locate request," and may be provided by the excavator to the one-call center via an electronic mail message, information entry via a website maintained by the one-call center, or a telephone conversation between the excavator and a human operator at the one-call center. The locate request may include an address or some other location-related information describing the geographic location of a work site at which the excavation is to be performed, as well as a description of the dig area (e.g., a text description), such as its location relative to certain landmarks and/or its approximate dimensions, within which there is a plan to disturb the ground at the work site. One-call centers similarly may receive locate requests for design projects (for which, as discussed above, there may be no immediate plan to excavate or otherwise disturb the ground).

Using the information provided in a locate request for planned excavation or design projects, the one-call center identifies certain underground facilities that may be present at the indicated work site. For this purpose, many one-call centers typically maintain a collection "polygon maps" which indicate, within a given geographic area over which the one-call center has jurisdiction, generally where underground facilities may be found relative to some geographic reference frame or coordinate system.

Polygon maps typically are provided to the one-call centers by underground facilities owners within the jurisdiction of the one call center ("members" of the one-call center). A one-call center first provides the facility owner/member with one or more maps (e.g., street or property maps) within the jurisdiction, on which are superimposed some type of grid or coordinate system employed by the one-call center as a geographic frame of reference. Using the maps provided by the one-call center, the respective facilities owners/members draw one or more polygons on each map to indicate an area within which their facilities generally are disposed underground (without indicating the facilities themselves). These polygons themselves do not precisely indicate geographic locations of respective underground facilities; rather, the area enclosed by a given polygon generally provides an over-inclusive indication of where a given facilities owner's underground facilities are disposed. Different facilities owners/members may draw polygons of different sizes around areas including their underground facilities, and in some instances such polygons can cover appreciably large geographic regions (e.g., an entire subdivision of a residential area), which may further obfuscate the actual/precise location of respective underground facilities.

Based on the polygon maps collected from the facilities owners/members, the one-call center may in some instances create composite polygon maps to show polygons of multiple different members on a single map. Whether using single member or composite polygon maps, the one-call center examines the address or location information provided in the locate request and identifies a significant buffer zone around an identified work site so as to make an over-inclusive identification of facilities owners/members that may have underground facilities present (e.g., to err on the side of caution). In particular, based on this generally over-inclusive buffer zone around the identified work site (and in some instances significantly over-inclusive buffer zone), the one-call center consults the polygon maps to identify which member polygons intersect with all or a portion of the buffer zone so as to notify these underground facility owners/members and/or their agents of the proposed excavation or design project. Again, it should be appreciated that the buffer zones around an indicated work site utilized by one-call centers for this purpose typically embrace a geographic area that includes but goes well beyond the actual work site, and in many cases the geographic area enclosed by a buffer zone is significantly larger than the actual dig area in which excavation or other similar activities are planned. Similarly, as noted above, the area enclosed by a given member polygon generally does not provide a precise indication of where one or more underground facilities may in fact be found.

In some instances, one-call centers may also or alternatively have access to various existing maps of underground facilities in their jurisdiction, referred to as "facilities maps." Facilities maps typically are maintained by facilities owners/members within the jurisdiction and show, for respective different utility types, where underground facilities purportedly may be found relative to some geographic reference frame or coordinate system (e.g., a grid, a street or property map, GPS latitude and longitude coordinates, etc.). Facilities maps generally provide somewhat more detail than polygon maps provided by facilities owners/members; however, in some instances the information contained in facilities maps may not be accurate and/or complete. For at least this reason, whether using polygon maps or facilities maps, as noted above the one-call center utilizes a significant buffer zone around an identified work site so as to make an over-inclusive identification of facilities owners/members that may have underground facilities present.

Once facilities implicated by the locate request are identified by a one-call center (e.g., via the polygon map/buffer zone process), the one-call center generates a "locate request ticket" (also known as a "locate ticket," or simply a "ticket"). The locate request ticket essentially constitutes an instruction to inspect a work site and typically identifies the work site of the proposed excavation or design and a description of the dig area, typically lists on the ticket all of the underground facilities that may be present at the work site (e.g., by providing a member code for the facility owner whose polygon falls within a given buffer zone), and may also include various other information relevant to the proposed excavation or design (e.g., the name of the excavation company, a name of a property owner or party contracting the excavation company to perform the excavation, etc.). The one-call center sends the ticket to one or more underground facility owners 140 and/or one or more locate service providers 130 (who may be acting as contracted agents of the facility owners) so that they can conduct a locate and marking operation to verify a presence or absence of the underground facilities in the dig area. For example, in some instances, a given underground facility owner 140 may operate its own fleet of locate technicians (e.g., locate technician 145), in which case the one-call center 120 may send the ticket to the underground facility owner 140. In other instances, a given facility owner may contract with a locate service provider to receive locate request tickets and perform a locate and/or marking operation in response to received tickets on their behalf.

Upon receiving the locate ticket, a locate service provider or a facility owner (hereafter referred to as a "ticket recipient") may dispatch a locate technician to the work site of planned excavation to determine a presence or absence of one or more underground facilities in the dig area to be excavated or otherwise disturbed. A typical first step for the locate technician includes utilizing an underground facility "locate device," which is an instrument or set of instruments (also referred to commonly as a "locate set") for detecting facilities that are concealed in some manner, such as cables and pipes that are located underground. The locate device is employed by the technician to verify the presence or absence of underground facilities indicated in the locate request ticket as potentially present in the dig area (e.g., via the facility owner member codes listed in the ticket). This process is often referred to as a "locate operation."

In one example of a locate operation, an underground facility locate device is used to detect electromagnetic fields that are generated by an applied signal provided along a length of a target facility to be identified. In this example, a locate device may include both a signal transmitter to provide the applied signal (e.g., which is coupled by the locate technician to a tracer wire disposed along a length of a facility), and a signal receiver which is generally a hand-held apparatus carried by the locate technician as the technician walks around the dig area to search for underground facilities. The transmitter is connected via a connection point to a target object (in this example, underground facility) located in the ground, and generates the applied signal coupled to the underground facility via the connection point (e.g., to a tracer wire along the facility), resulting in the generation of a magnetic field. The magnetic field in turn is detected by the locate receiver, which itself may include one or more detection antenna. The locate receiver indicates a presence of a facility when it detects electromagnetic fields arising from the applied signal. Conversely, the absence of a signal detected by the locate receiver generally indicates the absence of the target facility.

In yet another example, a locate device employed for a locate operation may include a single instrument, similar in some respects to a conventional metal detector. In particular, such an instrument may include an oscillator to generate an alternating current that passes through a coil, which in turn produces a first magnetic field. If a piece of electrically conductive metal is in close proximity to the coil (e.g., if an underground facility having a metal component is below/near the coil of the instrument), eddy currents are induced in the metal and the metal produces its own magnetic field, which in turn affects the first magnetic field. The instrument may include a second coil to measure changes to the first magnetic field, thereby facilitating detection of metallic objects.

In addition to the locate operation, the locate technician also generally performs a "marking operation," in which the technician marks the presence (and in some cases the absence) of a given underground facility in the dig area based on the various signals detected (or not detected) during the locate operation. For this purpose, the locate technician conventionally utilizes a "marking device" to dispense a marking material on, for example, the ground, pavement, or other surface along a detected underground facility. Marking material may be any material, substance, compound, and/or element, used or which may be used separately or in combination to mark, signify, and/or indicate. Examples of marking materials may include, but are not limited to, paint, chalk, dye, and/or iron. Marking devices, such as paint marking wands and/or paint marking wheels, provide a convenient method of dispensing marking materials onto surfaces, such as onto the surface of the ground or pavement.

In some environments, arrows, flags, darts, or other types of physical marks may be used to mark the presence or absence of an underground facility in a dig area, in addition to or as an alternative to a material applied to the ground (such as paint, chalk, dye, tape) along the path of a detected utility. The marks resulting from any of a wide variety of materials and/or objects used to indicate a presence or absence of underground facilities generally are referred to as "locate marks." Often, different color materials and/or physical objects may be used for locate marks, wherein different colors correspond to different utility types. For example, the American Public Works Association (APWA) has established a standardized color-coding system for utility identification for use by public agencies, utilities, contractors and various groups involved in ground excavation (e.g., red=electric power lines and cables; blue=potable water; orange=telecommunication lines; yellow=gas, oil, steam). In some cases, the technician also may provide one or more marks to indicate that no facility was found in the dig area (sometimes referred to as a "clear").

As mentioned above, the foregoing activity of identifying and marking a presence or absence of one or more underground facilities generally is referred to for completeness as a "locate and marking operation." However, in light of common parlance adopted in the construction industry, and/or for the sake of brevity, one or both of the respective locate and marking functions may be referred to in some instances simply as a "locate operation" or a "locate" (i.e., without making any specific reference to the marking function). Accordingly, it should be appreciated that any reference in the relevant arts to the task of a locate technician simply as a "locate operation" or a "locate" does not necessarily exclude or include the marking portion of the overall process. At the same time, in some contexts a locate operation is identified separately from a marking operation, wherein the former relates more specifically to detection-related activities and the latter relates more specifically to marking-related activities.

Inaccurate locating and/or marking of underground facilities can result in physical damage to the facilities, property damage, and/or personal injury during the excavation process that, in turn, can expose a facility owner or contractor to significant legal liability. When underground facilities are damaged and/or when property damage or personal injury results from damaging an underground facility during an excavation, the excavator may assert that the facility was not accurately located and/or marked by a locate technician, while the locate contractor who dispatched the technician may in turn assert that the facility was indeed properly located and marked. Proving whether the underground facility was properly located and marked can be difficult after the excavation (or after some damage, e.g., a gas explosion), because in many cases the physical locate marks (e.g., the marking material or other physical marks used to mark the facility on the surface of the dig area) will have been disturbed or destroyed during the excavation process (and/or damage resulting from excavation).

SUMMARY

As discussed above, in various field service operations, a number of field technicians typically are dispatched to perform field operations at any given time, and over any given time period each technician may be assigned numerous work orders, or "tickets" specifying aspects of the field operations to be performed. The volume of tickets per technician may be particularly high in the construction industry, especially in connection with locate and marking operations. The inventors have recognized and appreciated that implementing and performing meaningful oversight and quality control activities in a timely fashion for several field technicians each performing several field operations in a given time period may present challenges, and that failure to perform meaningful oversight and quality control activities may adversely affect customer satisfaction.

Additionally, the inventors have appreciated that the time, effort, and cost that is associated with re-performing work in the field, or with correcting and/or improving poorly performed field calls, may be unacceptable. Consequently, the inventors have realized that a need exists for methods of providing oversight and quality control in field service operations in order to improve customer satisfaction, to identify and reduce the number of poorly performed tickets, and to improve visibility into distributed workforce operations.

In view of the foregoing, various inventive embodiments disclosed herein relate generally to methods, apparatus and systems for computer-aided determination of quality assessment for locate and/or marking operations. In some embodiments, a quality assessment decision may be solely under the discretion of a human reviewer, albeit facilitated in some respects by computer-aided display of information, and electronic record-keeping and communication functions associated with the quality assessment result(s). In other embodiments, information related to a locate and marking operation is electronically analyzed such that a quality assessment is not based solely on human discretion, but rather based at least in part on some predetermined criteria and/or metrics that facilitate an automated determination of quality assessment.

More specifically, in some embodiments, methods, apparatus and systems according to the present disclosure relate to at least partially automating oversight and quality assessment in underground facility locate and/or marking operations. For example, in some embodiments, an automated quality assessment system may receive information related to a locate and/or marking operation from one or more sources of electronic data (also referred to herein as "field information" or "field data"), analyze the contents of the received electronic data, and automatically assess the quality of the locate and/or marking operation based at least in part on the analysis. In other embodiments, automated analysis of at least some of the received electronic data relating to the locate and/or marking operation facilitates further analysis and/or quality assessment by a human, in which the quality assessment is not based solely on the discretion of the human, but is significantly informed in some manner by automated analysis of data.

In some exemplary implementations in which a quality of a locate and/or marking operation is assessed via an at least partially automated process, some or all of the available field information (e.g., which in some instances is derived from data contained in one or more electronic records of the locate and/or marking operation) is compared to "reference information" or "reference data" (which in some instances is derived from data contained in one or more "reference" electronic records). Examples of types of reference information/data used in a quality assessment process according to various embodiments discussed herein may include, but are not limited to: 1) information/data derived from or relating to one or more facilities maps that illustrate the presumed locations of underground facilities purportedly present in a geographic area proximate to or surrounding and subsuming the work site; 2) information/data derived from or relating to one or more previous locate and/or marking operations at or near the work site (referred to herein as "historical tickets" or "historical data"); 3) information/data relating to one or more environmental landmarks present in a geographic area proximate to or surrounding and subsuming the dig area (e.g., the work site and its environs), or within the dig area itself (referred to herein as "landmark information," which may be available, for example, from facilities maps, historical tickets, and/or field data collected at or around the time of the locate and/or marking operation being assessed); and/or 4) another type of field information (e.g., first field information may be compared with reference information in the form of second field information different from the first field information).

More specifically, in some embodiments, different types of field information may be compared to each other. For example, in some embodiments discussed in detail herein, first field information relating to a marking operation ("marking information") may be compared with reference information in the form of second field information relating to a locate operation ("locate information"). It should be appreciated that in embodiments in which different types of field information are compared with each other, the distinction between "field information" and "reference information" may not have any practical effect; however, for various reasons, in some implementations it may be desirable to designate one type of the field information as the "reference information" for purposes of comparison (e.g., it may be presumed a priori that a first type of field information is generally more reliable than a second type of field information, and that hence the first type of field information is taken as the "reference information" for purposes of comparative analysis).

In one aspect of embodiments in which marking information and locate information are compared with each other, the marking information and the locate information may pertain to the same work site/dig area and represent corresponding locate and marking operations both performed in response to the same locate request ticket (such that the marking information and locate information essentially are obtained concurrently). In another aspect, the marking information and the locate information may pertain to the same work site/dig area, but one of the marking information and the locate information may have been acquired in connection with performance of a different locate request ticket (e.g., one of the marking information and the locate information may be obtained from a "historical ticket"). With respect to one of the marking information and the locate information being obtained from a historical ticket, it should be appreciated that the same technician may or may not have been responsible for obtaining the respective marking information and locate information forming the basis of the comparative analysis.

In other aspects, the quality assessment of a locate and/or marking operation may be performed, in whole or in part, by one or more analysis components (e.g., one or more processors executing instructions) separate and/or remote from the locate and/or marking device used in connection with a locate and/or marking operation. Alternatively, the assessment may be performed, in whole or in part, by one or more analysis components incorporated within or otherwise coupled to a locate device, a marking device, and/or a combined locate and marking device. Depending on the nature of the assessment, it may be performed substantially in real time with respect to the generation of field information/data used in connection with the assessment (e.g., one or more of locate information, marking information and landmark information contained in electronic records of a locate and marking operation and/or an electronic manifest of same), otherwise during a locate and/or marking operation, or after completion of a locate and/or marking operation.

In some embodiments described herein, a notification may be generated based on the quality assessment performed. The notification may provide one or more indications of the quality of the locate and/or marking operation as a whole, or of some aspect thereof. For example, the notification may provide an indication of a degree of correspondence or discrepancy between different types of field data contained in one or more electronic records of the locate and/or marking operation (e.g., marking information compared with locate information), and/or between field data and reference data contained in one or more reference electronic records. Likewise, the notification may provide an indication that the locate and/or marking operation is or is not approved based on the comparison of different types of filed data, and/or the comparison of field data to selected reference data. The notification may be transmitted electronically or otherwise conveyed, for example, to one or more parties associated with one or more underground facilities within the dig area or in a geographic area proximate to or surrounding and subsuming the work site, one or more parties associated with the performance or oversight of the locate and/or marking operation, and/or one or more parties associated with excavation of the dig area, for example.

In some embodiments, a first electronic representation of first field information relating to a locate and/or marking operation (e.g., data in one or more electronic records, an electronic manifest, etc.), as well as a second electronic representation of either second field information or reference information (e.g., data in a reference electronic record from any of a variety of sources) to which the first electronic representation is compared, may be visually rendered (e.g., via a computer-generated visual representation in a display field) such that the electronic representations are overlaid to provide a visual aid to an automated assessment process. In some implementations, the visual aid may be viewed by a human to asses the quality of the locate and/or marking operation. In one exemplary implementation discussed in detail herein, a first electronic representation of first field information including marking information, and a second electronic representation of second field information including locate information, are visually rendered in a display field to facilitate comparative viewing of the marking information and the locate information.

In sum, one embodiment of the present invention is directed to a method, executed in a computer comprising at least one hardware processor, at least one tangible storage medium, and at least one input/output (I/O) interface, for evaluating a quality of a locate operation and/or a marking operation to identify a presence or an absence of at least one underground facility at a work site. The method comprises: A) comparing marking information relating to the marking operation to locate information relating to the locate operation; B) automatically generating, based on A), at least one indication of a quality assessment of the locate and/or marking operation; and C) electronically storing on the at least one tangible storage medium, and/or electronically transmitting via the at least one I/O interface, the at least one indication of the quality assessment so as to provide an electronic record of the quality assessment.

Another embodiment is directed to an apparatus for evaluating a quality of a locate and/or marking operation to identify a presence or an absence of at least one underground facility at a work site. The apparatus comprises: at least one input/output (I/O) interface; at least one memory storing processor-executable instructions; and a processor coupled to the memory and the at least one I/O interface, wherein upon execution of the processor-executable instructions by the processor, the processor: A) compares marking information relating to the marking operation to locate information relating to the locate operation; B) automatically generates, based on A), at least one indication of a quality assessment of the locate and/or marking operation; and C) controls the at least one memory so as to electronically store, and/or controls the at least one I/O interface so as to electronically transmit, the at least one indication of the quality assessment so as to provide an electronic record of the quality assessment.

Another embodiment is directed to at least one computer-readable storage medium encoded with instructions that, when executed by a processor in a computer comprising at least one input/output (I/O) interface, perform a method for evaluating a quality of a locate and/or marking operation to identify a presence or an absence of at least one underground facility within a work site. The method comprises: A) comparing marking information relating to the marking operation to locate information relating to the locate operation; B) automatically generating, based on A), at least one indication of a quality assessment of the locate and marking operation; and C) electronically storing on the at least one computer-readable storage medium, and/or electronically transmitting via the at least one I/O interface, the at least one indication of the quality assessment so as to provide an electronic record of the quality assessment.

Another embodiment is directed to an apparatus for automatically assessing a quality of a locate and/or marking operation. The apparatus comprises: a memory storing processor-executable instructions; at least one I/O interface; and a processor coupled to the memory and the at least one I/O interface, wherein upon execution of the processor-executable instructions, the processor: A) identifies at least one first geographic location at which at least one facility line of at least one underground facility was marked during the marking operation; B) obtains marking geo-location data based on A); C) identifies at least one first geographic location at which at least one facility line of at least one underground facility was detected during the locate operation; D) obtains locate geo-location data based C); E) determines a measure of distances between the marking geo-location data and the locate geo-location data; F) assesses the quality of the locate and/or marking operation based at least in part on E); and G) generates at least one indication of a quality assessment based on F).

Another embodiment is directed to a method, performed in a computer comprising at least one hardware processor, at least one tangible storage medium, and at least one input/output (I/O) interface, for assessing a locate operation and/or a marking operation to identify a presence or an absence of at least one underground facility at a work site. The method comprises: A) filtering at least one of marking information relating to the marking operation and locate information relating to the locate operation so as to provide filtered information; and B) comparing the marking information to the locate information, wherein at least one of the marking information and the locate information includes the filtered information.

Another embodiment is directed to an apparatus for assessing a locate and/or marking operation to identify a presence or an absence of at least one underground facility at a work site. The apparatus comprises: at least one input/output (I/O) interface; at least one memory storing processor-executable instructions; and a processor coupled to the memory and the at least one I/O interface. Upon execution of the processor-executable instructions by the processor, the processor: A) filters at least one of marking information relating to the marking operation and locate information relating to the locate operation so as to provide filtered information; and B) compares the marking information to the locate information, wherein at least one of the marking information and the locate information includes the filtered information.

Another embodiment is directed to at least one computer-readable storage medium encoded with instructions that, when executed by a processor in a computer comprising at least one input/output (I/O) interface, perform a method for assessing a locate and/or marking operation to identify a presence or an absence of at least one underground facility within a work site. The method comprises: A) filtering at least one of marking information relating to the marking operation and locate information relating to the locate operation so as to provide filtered information; and B) comparing the marking information to the locate information, wherein at least one of the marking information and the locate information includes the filtered information.

Another embodiment is directed to an apparatus for automatically assessing a quality of a locate and/or marking operation. The apparatus comprises: a memory storing processor-executable instructions; at least one I/O interface; and a processor coupled to the memory and the at least one I/O interface. Upon execution of the processor-executable instructions, the processor: A) identifies at least one first geographic location at which at least one facility line of at least one underground facility was marked during the marking operation; B) obtains marking geo-location data based on A); C) identifies at least one first geographic location at which at least one facility line of at least one underground facility was detected during the locate operation; D) obtains locate geo-location data based C); E) filters the locate geo-location data obtained in D); F) determines a measure of distances between the marking geo-location data and the filtered locate geo-location data; G) assesses the quality of the locate and/or marking operation based at least in part on F); and H) generates at least one indication of a quality assessment based on G).

For purposes of the present disclosure, the term "dig area" refers to a specified area of a work site within which there is a plan to disturb the ground (e.g., excavate, dig holes and/or trenches, bore, etc.), and beyond which there is no plan to excavate in the immediate surroundings. Thus, the metes and bounds of a dig area are intended to provide specificity as to where some disturbance to the ground is planned at a given work site. It should be appreciated that a given work site may include multiple dig areas.

The term "facility" refers to one or more lines, cables, fibers, conduits, transmitters, receivers, or other physical objects or structures capable of or used for carrying, transmitting, receiving, storing, and providing utilities, energy, data, substances, and/or services, and/or any combination thereof. The term "underground facility" means any facility beneath the surface of the ground. Examples of facilities include, but are not limited to, oil, gas, water, sewer, power, telephone, data transmission, cable television (TV), and/or internet services.

The term "locate device" refers to any apparatus and/or device, used alone or in combination with any other device, for detecting and/or inferring the presence or absence of any facility, including without limitation, any underground facility. In various examples, a locate device often includes both a locate transmitter and a locate receiver (which in some instances may also be referred to collectively as a "locate instrument set," or simply "locate set").

The term "marking device" refers to any apparatus, mechanism, or other device that employs a marking dispenser for causing a marking material and/or marking object to be dispensed, or any apparatus, mechanism, or other device for electronically indicating (e.g., logging in memory) a location, such as a location of an underground facility. Additionally, the term "marking dispenser" refers to any apparatus, mechanism, or other device for dispensing and/or otherwise using, separately or in combination, a marking material and/or a marking object. An example of a marking dispenser may include, but is not limited to, a pressurized can of marking paint. The term "marking material" means any material, substance, compound, and/or element, used or which may be used separately or in combination to mark, signify, and/or indicate. Examples of marking materials may include, but are not limited to, paint, chalk, dye, and/or iron. The term "marking object" means any object and/or objects used or which may be used separately or in combination to mark, signify, and/or indicate. Examples of marking objects may include, but are not limited to, a flag, a dart, and arrow, and/or an RFID marking ball. It is contemplated that marking material may include marking objects. It is further contemplated that the terms "marking materials" or "marking objects" may be used interchangeably in accordance with the present disclosure.

The term "locate mark" means any mark, sign, and/or object employed to indicate the presence or absence of any underground facility. Examples of locate marks may include, but are not limited to, marks made with marking materials, marking objects, global positioning or other information, and/or any other means. Locate marks may be represented in any form including, without limitation, physical, visible, electronic, and/or any combination thereof.

The terms "actuate" or "trigger" (verb form) are used interchangeably to refer to starting or causing any device, program, system, and/or any combination thereof to work, operate, and/or function in response to some type of signal or stimulus. Examples of actuation signals or stimuli may include, but are not limited to, any local or remote, physical, audible, inaudible, visual, non-visual, electronic, mechanical, electromechanical, biomechanical, biosensing or other signal, instruction, or event. The terms "actuator" or "trigger" (noun form) are used interchangeably to refer to any method or device used to generate one or more signals or stimuli to cause or causing actuation. Examples of an actuator/trigger may include, but are not limited to, any form or combination of a lever, switch, program, processor, screen, microphone for capturing audible commands, and/or other device or method. An actuator/trigger may also include, but is not limited to, a device, software, or program that responds to any movement and/or condition of a user, such as, but not limited to, eye movement, brain activity, heart rate, other data, and/or the like, and generates one or more signals or stimuli in response thereto. In the case of a marking device or other marking mechanism (e.g., to physically or electronically mark a facility or other feature), actuation may cause marking material to be dispensed, as well as various data relating to the marking operation (e.g., geographic location, time stamps, characteristics of material dispensed, etc.) to be logged in an electronic file stored in memory. In the case of a locate device or other locate mechanism (e.g., to physically locate a facility or other feature), actuation may cause a detected signal strength, signal frequency, depth, or other information relating to the locate operation to be logged in an electronic file stored in memory.

The terms "locate and marking operation," "locate operation," and "locate" generally are used interchangeably and refer to any activity to detect, infer, and/or mark the presence or absence of an underground facility. In some contexts, the term "locate operation" is used to more specifically refer to detection of one or more underground facilities, and the term "marking operation" is used to more specifically refer to using a marking device, marking material and/or one or more marking objects to mark a presence or an absence of one or more underground facilities. The term "locate technician" refers to an individual performing a locate operation. A locate and marking operation often is specified in connection with a dig area, at least a portion of which may be excavated or otherwise disturbed during excavation activities.

The term "user" refers to an individual utilizing a locate device and/or a marking device and may include, but is not limited to, land surveyors, locate technicians, and support personnel.

The terms "locate request" and "excavation notice" are used interchangeably to refer to any communication to request a locate and/or marking operation. The term "locate request ticket" (or simply "ticket") refers to any communication or instruction to perform a locate operation. A ticket might specify, for example, the address or description of a dig area to be marked, the day and/or time that the dig area is to be marked, and/or whether the user is to mark the excavation area for certain gas, water, sewer, power, telephone, cable television, and/or some other underground facility. The term "historical ticket" refers to past tickets that have been completed.

The term "complex event processing (CEP)" refers to a software and/or hardware-implemented (e.g., facilitated by a computer system, distributed computer system, computational analysis coded in software, and/or a combination thereof) technique relating to recognizing one or more events, patterns of events, or the absence of an event or pattern of events, within one or more input streams of information and performing one or more actions and/or computations in response to such recognition, in accordance with specified rules, criteria, algorithms, or logic. CEP generally involves detection of relationships between information contained in input streams (which input streams may include indications of previously recognized events), such as causality, membership, timing, event-driven processes, detection of complex patterns of one or more events, event streams processing, event correlation and abstraction, and/or event hierarchies. CEP may complement and contribute to technologies such as, but not limited to, service oriented architecture (SOA), event driven architecture (EDA), and/or business process management (BPM). CEP allows the information contained in the events flowing through all of the layers of a service business, an enterprise information technology infrastructure and/or management operation to be discovered, analyzed, and understood in terms of its impact on management goals and business processes, and acted upon in real time or as a management process.

The following U.S. published application are hereby incorporated herein by reference:

U.S. Pat. No. 7,640,105, issued Dec. 29, 2009, filed Mar. 13, 2007, and entitled "Marking System and Method With Location and/or Time Tracking;"

U.S. publication no. 2010-0094553-A1, published Apr. 15, 2010, filed Dec. 16, 2009, and entitled "Systems and Methods for Using Location Data and/or Time Data to Electronically Display Dispensing of Markers by A Marking System or Marking Tool;"

U.S. publication no. 2008-0245299-A1, published Oct. 9, 2008, filed Apr. 4, 2007, and entitled "Marking System and Method;"

U.S. publication no. 2009-0013928-A1, published Jan. 15, 2009, filed Sep. 24, 2008, and entitled "Marking System and Method;"

U.S. publication no. 2010-0090858-A1, published Apr. 15, 2010, filed Dec. 16, 2009, and entitled "Systems and Methods for Using Marking Information to Electronically Display Dispensing of Markers by a Marking System or Marking Tool;"

U.S. publication no. 2009-0238414-A1, published Sep. 24, 2009, filed Mar. 18, 2008, and entitled "Virtual White Lines for Delimiting Planned Excavation Sites;"

U.S. publication no. 2009-0241045-A1, published Sep. 24, 2009, filed Sep. 26, 2008, and entitled "Virtual White Lines for Delimiting Planned Excavation Sites;"

U.S. publication no. 2009-0238415-A1, published Sep. 24, 2009, filed Sep. 26, 2008, and entitled "Virtual White Lines for Delimiting Planned Excavation Sites;"

U.S. publication no. 2009-0241046-A1, published Sep. 24, 2009, filed Jan. 16, 2009, and entitled "Virtual White Lines for Delimiting Planned Excavation Sites;"

U.S. publication no. 2009-0238416-A1, published Sep. 24, 2009, filed Jan. 16, 2009, and entitled "Virtual White Lines for Delimiting Planned Excavation Sites;"

U.S. publication no. 2009-0237408-A1, published Sep. 24, 2009, filed Jan. 16, 2009, and entitled "Virtual White Lines for Delimiting Planned Excavation Sites;"

U.S. publication no. 2009-0202101-A1, published Aug. 13, 2009, filed Feb. 12, 2008, and entitled "Electronic Manifest of Underground Facility Locate Marks;"

U.S. publication no. 2009-0202110-A1, published Aug. 13, 2009, filed Sep. 11, 2008, and entitled "Electronic Manifest of Underground Facility Locate Marks;"

U.S. publication no. 2009-0201311-A1, published Aug. 13, 2009, filed Jan. 30, 2009, and entitled "Electronic Manifest of Underground Facility Locate Marks;"

U.S. publication no. 2009-0202111-A1, published Aug. 13, 2009, filed Jan. 30, 2009, and entitled "Electronic Manifest of Underground Facility Locate Marks;"

U.S. publication no. 2009-0204625-A1, published Aug. 13, 2009, filed Feb. 5, 2009, and entitled "Electronic Manifest of Underground Facility Locate Operation;"

U.S. publication no. 2009-0204466-A1, published Aug. 13, 2009, filed Sep. 4, 2008, and entitled "Ticket Approval System For and Method of Performing Quality Control In Field Service Applications;"

U.S. publication no. 2009-0207019-A1, published Aug. 20, 2009, filed Apr. 30, 2009, and entitled "Ticket Approval System For and Method of Performing Quality Control In Field Service Applications;"

U.S. publication no. 2009-0210284-A1, published Aug. 20, 2009, filed Apr. 30, 2009, and entitled "Ticket Approval System For and Method of Performing Quality Control In Field Service Applications;"

U.S. publication no. 2009-0210297-A1, published Aug. 20, 2009, filed Apr. 30, 2009, and entitled "Ticket Approval System For and Method of Performing Quality Control In Field Service Applications;"

U.S. publication no. 2009-0210298-A1, published Aug. 20, 2009, filed Apr. 30, 2009, and entitled "Ticket Approval System For and Method of Performing Quality Control In Field Service Applications;"

U.S. publication no. 2009-0210285-A1, published Aug. 20, 2009, filed Apr. 30, 2009, and entitled "Ticket Approval System For and Method of Performing Quality Control In Field Service Applications;"

U.S. publication no. 2009-0324815-A1, published Dec. 31, 2009, filed Apr. 24, 2009, and entitled "Marking Apparatus and Marking Methods Using Marking Dispenser with Machine-Readable ID Mechanism;"

U.S. publication no. 2010-0006667-A1, published Jan. 14, 2010, filed Apr. 24, 2009, and entitled, "Marker Detection Mechanisms for use in Marking Devices And Methods of Using Same;"

U.S. publication no. 2010-0085694 A1, published Apr. 8, 2010, filed Sep. 30, 2009, and entitled, "Marking Device Docking Stations and Methods of Using Same;"

U.S. publication no. 2010-0085701 A1, published Apr. 8, 2010, filed Sep. 30, 2009, and entitled, "Marking Device Docking Stations Having Security Features and Methods of Using Same;"

U.S. publication no. 2010-0084532 A1, published Apr. 8, 2010, filed Sep. 30, 2009, and entitled, "Marking Device Docking Stations Having Mechanical Docking and Methods of Using Same;"

U.S. publication no. 2010-0088032-A1, published Apr. 8, 2010, filed Sep. 29, 2009, and entitled, "Methods, Apparatus and Systems for Generating Electronic Records of Locate And Marking Operations, and Combined Locate and Marking Apparatus for Same;"

U.S. publication no. 2010-0117654 A1, published May 13, 2010, filed Dec. 30, 2009, and entitled, "Methods and Apparatus for Displaying an Electronic Rendering of a Locate and/or Marking Operation Using Display Layers;"

U.S. publication no. 2010-0086677 A1, published Apr. 8, 2010, filed Aug. 11, 2009, and entitled, "Methods and Apparatus for Generating an Electronic Record of a Marking Operation Including Service-Related Information and Ticket Information;"

U.S. publication no. 2010-0086671 A1, published Apr. 8, 2010, filed Nov. 20, 2009, and entitled, "Methods and Apparatus for Generating an Electronic Record of A Marking Operation Including Service-Related Information and Ticket Information;"

U.S. publication no. 2010-0085376 A1, published Apr. 8, 2010, filed Oct. 28, 2009, and entitled, "Methods and Apparatus for Displaying an Electronic Rendering of a Marking Operation Based on an Electronic Record of Marking Information;"

U.S. publication no. 2010-0088164-A1, published Apr. 8, 2010, filed Sep. 30, 2009, and entitled, "Methods and Apparatus for Analyzing Locate and Marking Operations with Respect to Facilities Maps;"

U.S. publication no. 2010-0088134 A1, published Apr. 8, 2010, filed Oct. 1, 2009, and entitled, "Methods and Apparatus for Analyzing Locate and Marking Operations with Respect to Historical Information;"

U.S. publication no. 2010-0088031 A1, published Apr. 8, 2010, filed Sep. 28, 2009, and entitled, "Methods and Apparatus for Generating an Electronic Record of Environmental Landmarks Based on Marking Device Actuations;"

U.S. publication no. 2010-0188407 A1, published Jul. 29, 2010, filed Feb. 5, 2010, and entitled "Methods and Apparatus for Displaying and Processing Facilities Map Information and/or Other Image Information on a Marking Device;"

U.S. publication no. 2010-0188215 A1, published Jul. 29, 2010, filed Feb. 5, 2010, and entitled "Methods and Apparatus for Generating Alerts on a Marking Device, Based on Comparing Electronic Marking Information to Facilities Map Information and/or Other Image Information;"

U.S. publication no. 2010-0188088 A1, published Jul. 29, 2010, filed Feb. 5, 2010, and entitled "Methods and Apparatus for Displaying and Processing Facilities Map Information and/or Other Image Information on a Locate Device;"

U.S. publication no. 2010-0189312 A1, published Jul. 29, 2010, filed Feb. 5, 2010, and entitled "Methods and Apparatus for Overlaying Electronic Locate Information on Facilities Map Information and/or Other Image Information Displayed on a Locate Device;"

U.S. publication no. 2010-0188216 A1, published Jul. 29, 2010, filed Feb. 5, 2010, and entitled "Methods and Apparatus for Generating Alerts on a Locate Device, Based ON Comparing Electronic Locate Information TO Facilities Map Information and/or Other Image Information;"

U.S. publication no. 2010-0189887 A1, published Jul. 29, 2010, filed Feb. 11, 2010, and entitled "Marking Apparatus Having Enhanced Features for Underground Facility Marking Operations, and Associated Methods and Systems;"

U.S. publication no. 2010-0188245 A1, published Jul. 29, 2010, filed Feb. 11, 2010, and entitled "Locate Apparatus Having Enhanced Features for Underground Facility Locate Operations, and Associated Methods and Systems;"

U.S. publication no. 2009-0204238-A1, published Aug. 13, 2009, filed Feb. 2, 2009, and entitled "Electronically Controlled Marking Apparatus and Methods;"

U.S. publication no. 2009-0208642-A1, published Aug. 20, 2009, filed Feb. 2, 2009, and entitled "Marking Apparatus and Methods For Creating an Electronic Record of Marking Operations;"

U.S. publication no. 2009-0210098-A1, published Aug. 20, 2009, filed Feb. 2, 2009, and entitled "Marking Apparatus and Methods For Creating an Electronic Record of Marking Apparatus Operations;"

U.S. publication no. 2009-0201178-A1, published Aug. 13, 2009, filed Feb. 2, 2009, and entitled "Methods For Evaluating Operation of Marking Apparatus;"

U.S. publication no. 2009-0238417-A1, published Sep. 24, 2009, filed Feb. 6, 2009, and entitled "Virtual White Lines for Indicating Planned Excavation Sites on Electronic Images;"

U.S. publication no. 2009-0202112-A1, published Aug. 13, 2009, filed Feb. 11, 2009, and entitled "Searchable Electronic Records of Underground Facility Locate Marking Operations;"

U.S. publication no. 2009-0204614-A1, published Aug. 13, 2009, filed Feb. 11, 2009, and entitled "Searchable Electronic Records of Underground Facility Locate Marking Operations;"

U.S. publication no. 2009-0327024-A1, published Dec. 31, 2009, filed Jun. 26, 2009, and entitled "Methods and Apparatus for Quality Assessment of a Field Service Operation;"

U.S. publication no. 2010-0010862-A1, published Jan. 14, 2010, filed Aug. 7, 2009, and entitled, "Methods and Apparatus for Quality Assessment of a Field Service Operation Based on Geographic Information;"

U.S. publication No. 2010-0010863-A1, published Jan. 14, 2010, filed Aug. 7, 2009, and entitled, "Methods and Apparatus for Quality Assessment of a Field Service Operation Based on Multiple Scoring Categories;"

U.S. publication no. 2010-0010882-A1, published Jan. 14, 2010, filed Aug. 7, 2009, and entitled, "Methods and Apparatus for Quality Assessment of a Field Service Operation Based on Dynamic Assessment Parameters;"

U.S. publication no. 2010-0010883-A1, published Jan. 14, 2010, filed Aug. 7, 2009, and entitled, "Methods and Apparatus for Quality Assessment of a Field Service Operation Based on Multiple Quality Assessment Criteria;"

U.S. publication no. 2010-0088135 A1, published Apr. 8, 2010, filed Oct. 1, 2009, and entitled, "Methods and Apparatus for Analyzing Locate and Marking Operations with Respect to Environmental Landmarks;"

U.S. publication no. 2010-0085185 A1, published Apr. 8, 2010, filed Sep. 30, 2009, and entitled, "Methods and Apparatus for Generating Electronic Records of Locate Operations;"

U.S. publication no. 2010-0090700-A1, published Apr. 15, 2010, filed Oct. 30, 2009, and entitled "Methods and Apparatus for Displaying an Electronic Rendering of a Locate Operation Based on an Electronic Record of Locate Information;" and U.S. publication no. 2010-0085054 A1, published Apr. 8, 2010, filed Sep. 30, 2009, and entitled, "Systems and Methods for Generating Electronic Records of Locate And Marking Operations."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The drawings are not necessarily to scale, emphasis instead generally being placed upon illustrating the principles of the invention.

FIG. 6 illustrates a data set that may be associated with an electronic manifest from which information may be obtained for a quality assessment, in accordance with some embodiments of the present disclosure.

DETAILED DESCRIPTION

Figure 1:
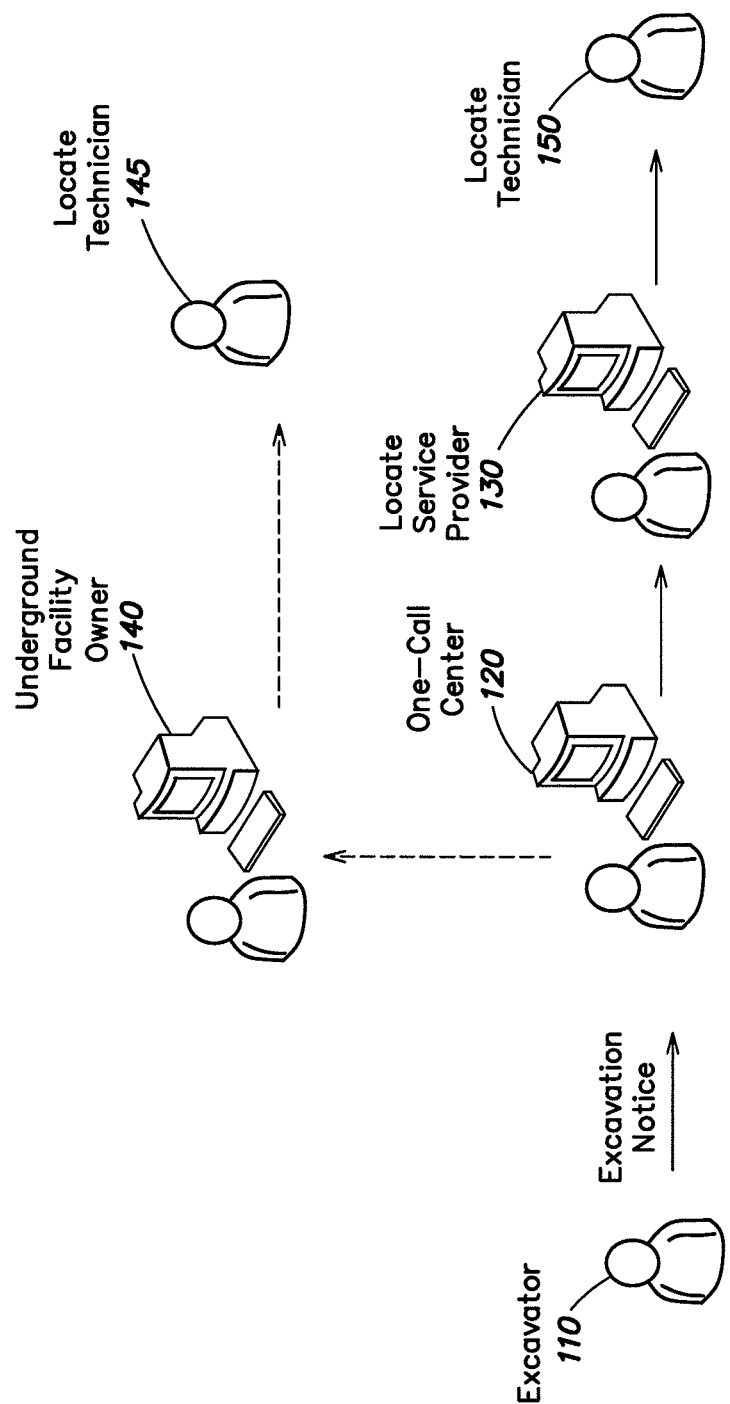
FIG. 1 shows an example in which a locate and marking operation is initiated as a result of an excavator providing an excavation notice to a one-call center.

Following below are more detailed descriptions of various concepts related to, and embodiments of, inventive systems, methods and apparatus for analyzing and assessing the quality of locate and/or marking operations. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

I. OVERVIEW

Various inventive embodiments disclosed herein relate to methods, apparatus and systems for performing oversight and quality control in field service operations, such as locate and marking operations. In general, approvers and/or managers may review the quality of these locate and marking operations in real time and/or within a certain amount of time (e.g., within one day) of completion of the operation. The review of a locate and marking operation by a human (e.g., an approver or manager) and the determination of a quality assessment for the operation based solely on the discretion of the human is referred to herein as a "manual quality assessment."

Some embodiments described herein are related to methods, apparatus and systems for at least partially automating oversight and quality assessment in underground facility locate and marking operations and/or other field service operations. For example, in some embodiments, an automated quality assessment system may receive "field information" (also referred to as "field data") related to a locate and/or marking operation from one or more sources of electronic data (e.g., electronic records of locate and/or marking operations generated by various locate equipment, an electronic manifest for same, ticket information, service-related information, etc.), electronically analyze the contents of the field information/data by comparing locate and/or marking information (e.g., locate device data, marking device data) to "reference information" (also referred to as "reference data"), and automatically assess the quality of the operation based at least in part on the analysis (e.g., according to predetermined criteria on which the comparison is based and metrics for the criteria).

In some embodiments, the reference information itself may include field information; for example, in some implementations, different types of field information may be compared to each other. In one example, first field information relating to a marking operation ("marking information") may be compared with reference information in the form of second field information relating to a locate operation ("locate information"). It should be appreciated that in embodiments in which different types of field information are compared with each other, the distinction between "field information" and "reference information" may not have any practical effect; however, for various reasons, in some implementations it may be desirable to designate one type of the field information as the "reference information" for purposes of comparison (e.g., it may be presumed a priori that a first type of field information is generally more reliable than a second type of field information, and that hence the first type of field information is taken as the "reference information" for purposes of comparative analysis). Accordingly, in examples of these embodiments, either one of the marking information and locate information may serve as the reference information in various scenarios.

In other embodiments, automated analysis of field information/data facilitates further analysis and/or quality assessment by a human, in which the quality assessment is not based solely on the discretion of the human, but is significantly informed in some manner by automated analysis of data. As contrasted with the above-discussed "manual quality assessment" of a locate and marking operation by a human, this type of assessment (e.g., based on some degree of electronic analysis of data relating to a locate and/or marking operation) is referred to herein as "automated quality assessment."

In some embodiments, methods, apparatus and systems according to the present invention may automatically output one or more of a variety of indications of the assessed quality of a locate and/or marking operation. In one aspect, the indication of the assessed quality of a locate and/or marking operation may be categorized into one or more of a plurality of quality categories. Any suitable number and type of categories may be used, as the invention is not limited in this respect. For example, in some embodiments, a locate and/or marking operation may be automatically categorized as either, (a) approved—no further action needed; (b) satisfactory, but the locate technician needs coaching or training; (c) unsatisfactory—the ticket needs quality control (QC) action; or (d) real-time prompt—an aspect of the assessment may be suitable for prompting the locate technician in real time with respect to, for example, performing an immediate verification and/or corrective action. In other implementations, a score, grade, or other graduated indication (e.g., based on some maximum range or scale) may be provided as an indication of quality assessment in connection with a locate and/or marking operation.

II. AUTOMATED QUALITY ASSESSMENT

Figure 2:
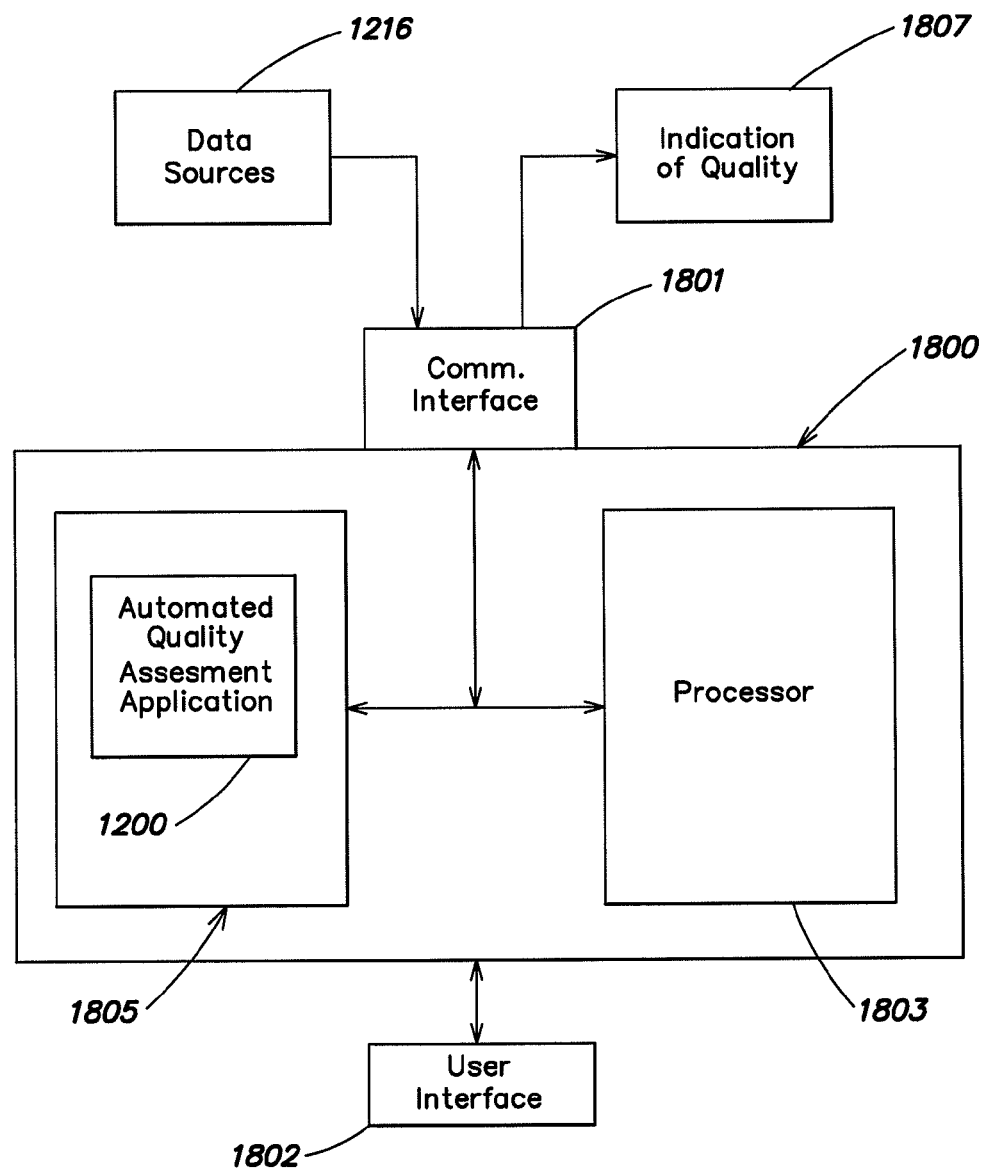
FIG. 2 illustrates a block diagram of an automated quality assessment system for assessing the quality of a field service operation, in accordance with some embodiments of the present disclosure.

FIG. 2 is a block diagram of an automated quality assessment system 1800. Automated quality assessment system 1800 may be, for example, a computer system having at least one hardware processor 1803, a memory 1805 that comprises at least one tangible storage medium (e.g., RAM, ROM, Flash memory, one or more magnetic storage devices, one or more optical storage devices, or any other type of tangible storage medium), and at least one communications interface 1801. Memory 1805 may store computer-readable (processor-executable) instructions of an automated quality assessment application 1200, which may be executed by processor 1803. When executed by processor 1803, automated quality assessment application 1200 may obtain information associated with a field service operation (e.g., a locate and/or marking operation) from data sources 1216 via communication interface 1801, analyze the data to assess the quality of the field service operation and may output (e.g., via communication interface 1801) one or more indications of the quality assessment of the field service operation. In some implementations, one or more indications of the quality assessment may be stored in the memory and/or transmitted via the communication interface to provide an electronic record of the quality assessment. The communication interface 1801 may be coupled to a wired or wireless network, bus, or other communication means and may therefore allow the system 1800 to transmit communications to and/or receive communications from other devices.

The computer system of FIG. 2 serving as an automated quality assessment system 1800 may further comprise one or more user interfaces 1802, which may include one or more display units (not shown) The display unit(s) may be provided, for example, to allow a user to view various information in connection with execution of the instructions and/or the indication(s) of quality assessment. In general, the user interface allows a user to communicate with the processor 1803, make manual adjustments, make selections, enter data or various other information, receive information, and/or interact in any of a variety of manners with the processor during execution of the instructions.

Figure 3:
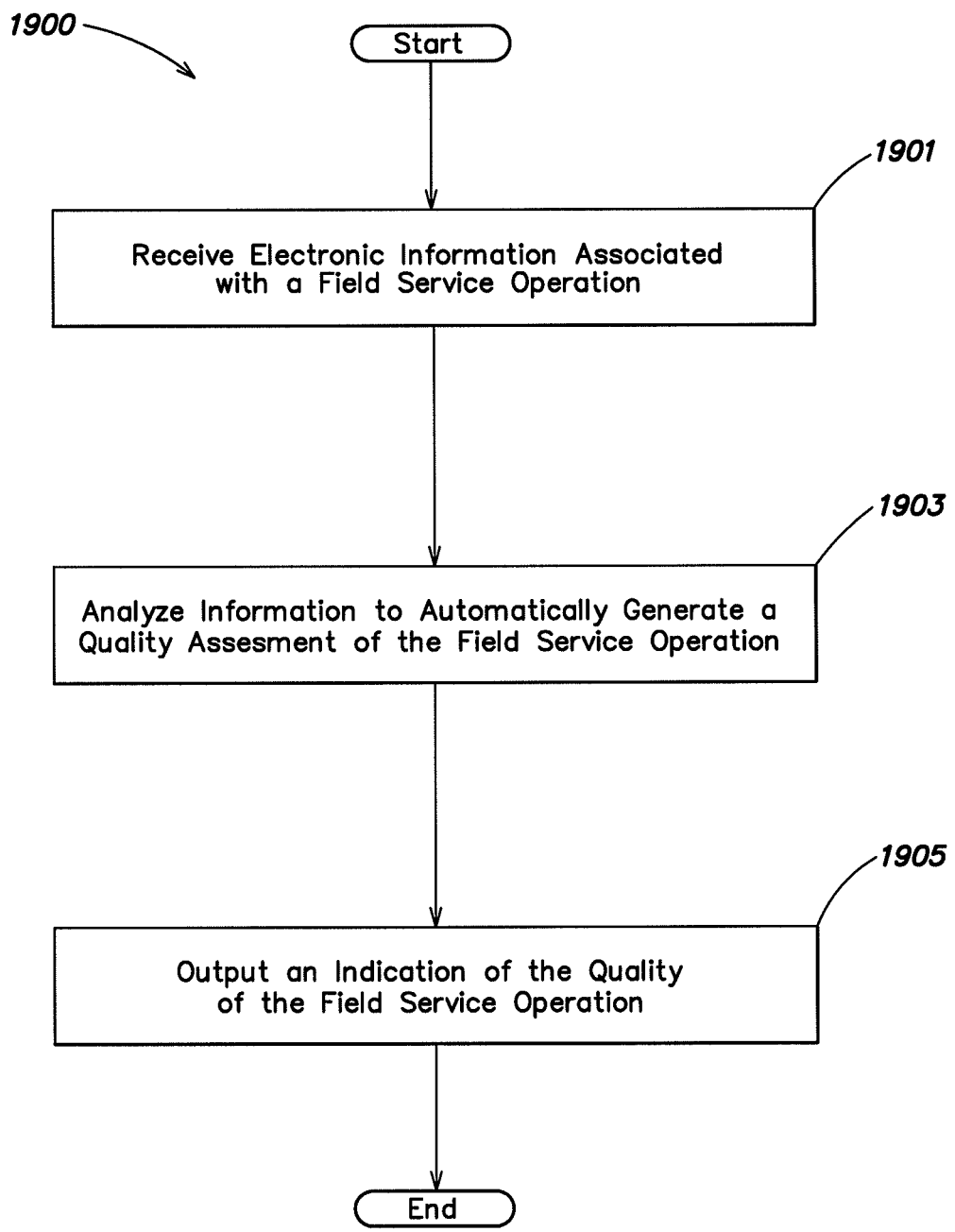
FIG. 3 illustrates a flow diagram of an example of a process for automatically assessing the quality of a field service operation, in accordance with some embodiments of the present disclosure.

FIG. 3 is a flow chart of process 1900 that may be performed by quality assessment application 1200 to automatically assess the quality of a field service operation, such as, for example, a locate and/or marking operation. Process 1900 begins at act 1901, where the automated quality assessment application receives electronic information associated with a field service operation. The process next continues to act 1903, where the automated quality assessment application analyzes at least some of the received information to automatically generate a quality assessment of the field service operation. The process next continues to act 1905, where the automated quality assessment application outputs an indication of the quality of the field service operation that is based on the assessment generated in the act 1903.

Figure 4:
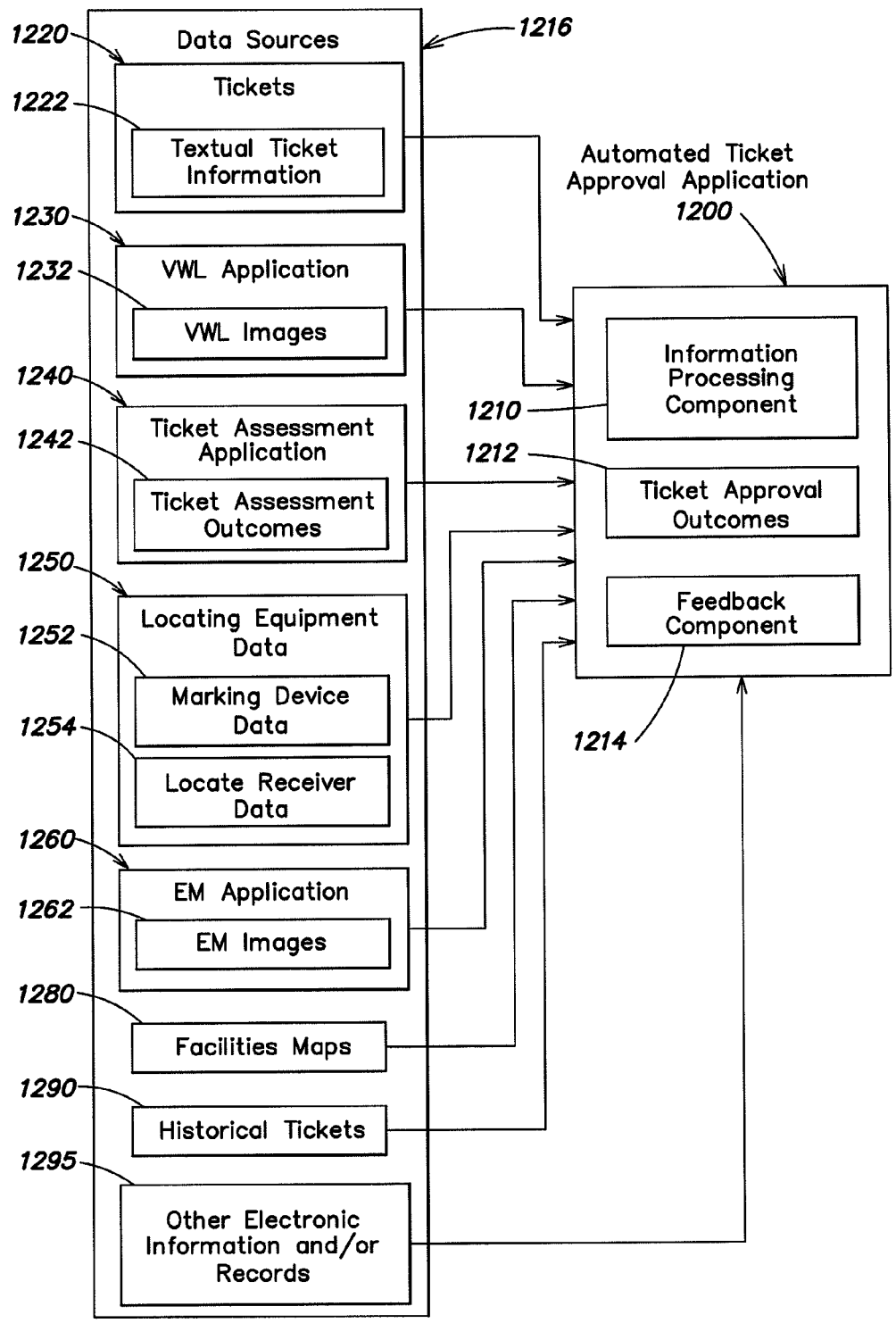
FIG. 4 illustrates a functional block diagram of an example of an automated quality assessment application and various data sources for automatically performing quality control in connection with underground facility locate and/or marking operations, in accordance with some embodiments of the present disclosure.

Referring to FIG. 4, a more detailed block diagram of automated quality assessment application 1200 and data sources 1216 is presented. Automated quality assessment application 1200 may be, for example, a rules-based computer software application that includes, for example, an information processing component 1210, quality assessment outcomes 1212 (e.g., one or more indications of the quality assessment), and a feedback component 1214. Automated quality assessment application 1200 may be fed by any number of data sources 1216, which may include various types of electronic information and/or records of data associated with locate and/or marking operations performed in the field (e.g., both "field information/data" and "reference information/data").

For example, the automated quality assessment application 1200 of the present disclosure may automatically review a variety of field information, which may include "closed" or completed tickets (i.e., tickets pursuant to which a locate and/or marking operation has been performed) and their associated manifests (which may or may not include digital images relating to the locate operation), and/or any information relating thereto, in essentially real time and/or within a specified amount of time, such as within one day, from the ticket being closed. In some embodiments discussed in further detail below, closed tickets may be reviewed by automatically interrogating received data associated with a locate and/or marking operation, and comparing selected received data against various metrics, such as reference information/data.

In some embodiments, information processing component 1210 of automated quality assessment application 1200 may be, for example, a rules-based software component for analyzing the contents of any information that is available in data sources 1216 and then automatically performing an assessment with respect to the quality of a locate and/or marking operation that is performed in the field. For each locate and/or marking operation that is assessed, information processing component 1210 may automatically generate a quality assessment outcome 1212 that corresponds to the results of the automatic quality assessment.

Any suitable type of outcome may be generated. For example, in some embodiments, the outcome generated may be a categorization of the locate operation into one of a plurality of quality categories (also referred to herein as "scoring" categories or "grading" categories). For example, based on the automatic quality assessment, a locate and/or marking operation may be categorized as:

APPROVED—the locate and/or marking operation is approved, no further action needed;
SATISFACTORY—the locate and/or marking operation is approved, but the locate technician needs coaching or training;
UNSATISFACTORY—the locate and/or marking operation is not approved, the ticket needs QC action; or
PROMPT—an aspect of the locate and/or marking operation assessment may be suitable for transmitting a real-time prompt to the locate technician with respect to, for example, performing a substantially immediate verification and/or corrective action.

Other examples of possible outcomes generated by automated ticket application 1200 include, but are not limited to, a numerical score (e.g., a score of 0-100%), a grade (e.g., a grade of A-F), or other graduated indicator, based on some range, scale and/or resolution (granularity), that is indicative of the quality of the assessed locate operation.

Feedback component 1214 of automated quality assessment application 1200 generates the real-time prompts. For example, once the nature of the real-time prompt is determined, feedback component 1214 queries the ticket information in order to ensure that the prompt is directed to the proper originating locate technician. Additional details of the operation of automated quality assessment application 1200 are described with reference to the method of FIG. 6.

III. EXEMPLARY DATA SOURCES FOR USE IN QUALITY ASSESSMENT

Examples of data sources 1216 that may be processed by information processing component 1210 of automated quality assessment application 100 may include, but are not limited to, one or more tickets 1220, a virtual white lines (VWL) application 1230, a ticket assessment application 1240, locating equipment data 1250, an electronic manifest (EM) application 1260, one or more facilities maps 1280, an archive of historical tickets 1290, and any other electronic information and/or records 1295. In exemplary implementations, the various data sources 1216 may be supplied by multiple entities (not shown) and accessible to automated quality assessment application 1200 via, for example, a networked computing system for supporting locate and/or marking operations, an example of which is depicted in FIG. 1.

In various embodiments of automated quality assessment based on information/data derived from the data sources 1216, it should be appreciated that some of this information/data may be treated as "field information/data" and some of this information/data may be treated as "reference information/data" to which the field information/data is compared during the assessment process. Additionally, it should be appreciated that some of the information/data available from the data sources 1216 may be used to "pre-process" or filter one or both of the field information/data and the reference information/data prior to comparison for some types of assessments.

A. Tickets

Tickets 1220 of data sources 1216 are locate request tickets that may be submitted by excavators and processed by one-call centers. Tickets 1220 may include textual ticket information 1222 that comprises instructions with respect to performing a locate and/or marking operation, such as, but not limited to, a ticket and/or work order number, date information, geographic location information (e.g., address information), excavation information, excavator information, site information (e.g., a description of the dig area, which may include a description of one or more environmental landmarks in or near the dig area/work site), locate operations instructions information, caller information, remarks information, task information, and any combinations thereof.

Historical tickets 1290 of data sources 1216 may include any records of prior locate and/or marking operations performed pursuant to previous locate request tickets. These historical records may relate in some instances, but not necessarily, to locate and/or marking operations performed in the past for the same work site/dig area specified in the present ticket 1220 subject to quality assessment. In the process of performing the automatic quality assessment of a present ticket 1220, information processing component 1210 may aggregate the information that is contained in one or more historical tickets 1290 (which in some cases may relate to the same work site/dig area) in order to determine the facilities that have been located and/or marked during past locate operations at that site, and/or the presence of one or more environmental landmarks. Some of the information types discussed in further detail below may form part of a historical ticket and may be derived from records associated with such tickets for purposes of an assessment. For example, records associated with historical tickets may include digital images having one or more of dig area indicators, electronic locate marks and symbols or icons for environmental landmarks overlaid thereon; additionally, or alternatively, such records may include a variety of data provided by one or more pieces of locating and/or marking equipment used to perform the locate and/or marking operation (see sections B, C, and D below).

B. Dig Area Indicators and Associated Information

VWL application 1230 of data sources 1216 is a computer software application that provides an electronic drawing tool that may be used by excavators for electronically marking up, for example, a digital aerial image of the dig area. In this manner, instead of (or in addition to) physically visiting the site of the dig area and marking white lines on the ground at that site, an excavator may electronically draw markings (e.g., white lines) on an aerial image of the site, indicating where digging is planned. These marked up digital images may be saved as, for example, VWL images 1232, which may include accompanied with metadata pertaining to various information in the images. One or more VWL images 1232 in turn may be associated with, for example, tickets 1220 and transmitted to locate companies.

VWL application 1230 may be implemented, for example, as described in U.S. patent application Ser. No. 12/366,853 filed Feb. 6, 2009, entitled "Virtual white lines for delimiting planned excavation sites;" U.S. patent application Ser. No. 12/475,905 filed Jun. 1, 2009, entitled "Virtual white lines for delimiting planned excavation sites of staged excavation projects;" U.S. patent application Ser. No. 12/422,364 filed Apr. 13, 2009, entitled "Virtual white lines (VWL) application for indicating a planned excavation or locate path." Each of these patent applications is hereby incorporated by reference herein in its entirety.

In one example, the dig area indicators in a VWL image may include two-dimensional (2D) drawing shapes, shades, points, symbols, coordinates, data sets, or other indicators to indicate on a digital image the dig area in which excavation is to occur. To generate the electronic image having dig area indicators, an image (e.g., an aerial image) of the work site may be sent to an excavator via a network, the excavator may use a computing device executing the VWL application 1230 to create a VWL image by marking up the image to include one or more dig area indicators precisely delimiting one or more dig areas within the work site and, in response, the marked-up VWL image may be received from the excavator via the network.

As noted above, a VWL image 1232 may include metadata corresponding to any markings or content in the image; in particular, geographic information including geographic coordinates (e.g., latitude and longitude values) for any dig area indicators marked on the image may accompany or be included in an image file as metadata, and these geographic coordinates may be employed in some manner as part of a quality assessment process. For example, as discussed further below, in one embodiment geographic information derived from a virtual white lines (VWL) application 1230 (e.g., geographic coordinates associated with one or more dig area indicators contained in a VLW image 1232) may be used by automated quality assessment application 1200 to filter or limit the contents of either field data or reference data prior to analysis/comparison of data for quality assessment.

In particular, in one exemplary implementation, geographic coordinates associated with a dig area indicator may be used to select contents that relate only to a geographic area including the geographic coordinates for the dig area indicator, or contents that fall within a predetermined radius of the geographic coordinates for the dig area indicator or a polygon-shaped buffer zone around the geographic coordinates for the dig area indicator. In yet another example, geographic coordinates associated with a dig area indicator may be used to filter out some contents that do not relate to a specifically delimited dig area within a work site as defined by the VWL application (e.g., first geographic information or another portion of information may be selected from the field data, and/or second geographic information or another portion of information may be selected from the reference data, that relates only to a geographic area delimited by the VWL geographic information). Accordingly, it should be appreciated that in some embodiments, the dig area indicator coordinates may identify a plurality of points along a perimeter of the delimited dig area, and these coordinates may be used to select specific geographic information (e.g., filter out geographic information outside of the delimited dig area). In other embodiments, the dig area indicator coordinates may identify a single point, in which case the coordinates may be used to select particular information based at least in part on the coordinates for the single point.

C. Locating Equipment Data

With respect to locating equipment data 1250, as noted above, a locate technician may use locating equipment, such as a locate instrument set (including a locate receiver device), a marking device, or a combined locate and marking device, so as to perform a locate and marking operation. Locating equipment data 1250 of data sources 1216 may be any information that is collected and/or generated (e.g., one or more electronic records) by any type of locating and/or marking equipment equipped with components that are capable of collecting electronic information and/or creating electronic records about locate and/or marking operations that are performed in the field.

In some examples, locating equipment data 1250 is constituted by "marking information" or marking device data 1252 that is associated generally with the marking functionality of a locate and marking operation. Examples of marking information relating to a marking operation that may be logged into an electronic record may include, but are not limited to:

- timing information (e.g., one or more time stamps) associated with one or more actuations of the marking device and/or one or more events occurring during a given actuation;
- geographic information (e.g., one or more geographic coordinates) associated with one or more actuations of the marking device (in some instances, the geographic information may be accompanied by timing information, such as a time stamp, for each acquisition of geographic information); and/or geographic diagnostics information (e.g., GPS diagnostics information, such as, but not limited to, the quality of a GPS signal, the number of satellites in view of the GPS receiver, etc.);
- marking material information: one or more aspects/characteristics of a marking material (e.g., a color, brand, type, serial number, UPC code, weight, inventory information, etc. associated with the marking material) dispensed in response to one or more actuations of the marking device;
- service-related information: one or more identifiers for the locate technician performing the marking operation, the marking device itself (e.g., a serial number of the marking device), and/or the locate contractor dispatching the locate technician;
- ticket information: information relating to one or more facilities to be marked, location information (e.g., an address, geo-coordinates, and/or text description) relating to the work site and/or dig area in which the locate and marking operation is performed, ground type information (e.g., a description of the ground at which marking material is dispensed), excavator information, other text-based information, etc.;
- environmental information: information derived from one or more environmental sensors associated with the marking device, examples of which sensors include, but are not limited to, temperature sensors, humidity sensors, light sensors, altitude sensors, image capture devices and audio recorders;
- operational information: information derived from one or more operational sensors associated with the marking device, examples of which sensors include, but are not limited to, operational temperature sensors, a compass, an inclinometer, an accelerometer, a yaw rate sensor, a proximity sensor, a pressure sensor, one or more device health sensors, image capture devices, and audio devices; and device health information: information about the status of one or more components of a locate device, such as battery status, WiFi connectivity status, GPS receiver status (e.g., GPS signal strength/quality, number of satellites in view), etc.

Marking information including any or all of the foregoing types of information may be logged/stored in local memory of a marking device, formatted in various manners, processed and/or analyzed at the marking device itself, and/or transmitted to another device (e.g., a remote computer/server) for storage, processing and/or analysis.

Similarly, locating equipment data 1250 may include "locate information" or locate receiver data 1254 that is associated generally with the locating/detection functionality of a locate and marking operation. Examples of locate information relating to the locate operation that may be logged into an electronic record may include, but are not limited to, any of the following types of information or any suitable combinations of such information:

timing information (e.g., one or more time stamps) associated with one or more events occurring during a given locate operation;

geographic information (e.g., one or more geographic coordinates) associated with one or more events of a locate operation (in some instances, the geographic information may be accompanied by timing information, such as a time stamp, for each acquisition of geographic information); and/or geographic diagnostics information (e.g., GPS diagnostics information, such as, but not limited to, the quality of a GPS signal, the number of satellites in view of the GPS receiver, etc.);

service-related information: one or more identifiers for the locate technician performing the locate operation, the locate contractor (service provider) dispatching the locate technician, and/or the party requesting the locate operation;

ticket information: information relating to one or more facilities to be located, location information (e.g., an address, geo-coordinates, and/or text description) relating to the work site and/or dig area in which the locate and marking operation is performed, ground type information (e.g., a description of the ground at which the locate is performed), excavator information, other text-based information, etc.

target object information: information about the target object (e.g., facility) to be located, such as the type of object, expected depth of object, etc.;

locate signal information: information entered, detected and/or sensed as part of performing the locate operation relating to one or more signals representing a presence or absence of one or more underground facilities, such as magnetic field strength and frequency, electric current magnitude, depth of the located object, the mode of operation of the locate receiver (e.g., peak v. null detection modes), the gain of the locate receiver, etc. With respect to locate receivers, the "gain" is typically a measure of the degree of sensitivity of a locate receiver antenna that is picking up a signal emanating from along an underground facility (alternatively, "gain" may be viewed as a degree of amplification being applied to a received signal). Gain may be expressed in terms of any scale (e.g., 0-100), as a numeric value or percentage. "Signal strength" (or "magnetic field strength") refers to the strength of a received signal at a given gain value; signal strength similarly may be expressed in terms of any scale, as a numeric value or percentage. Generally speaking, higher signal strengths at lower gains typically indicate more reliable information from a locate receiver, but this may not necessarily be the case for all locate operations;

locate receiver information: information about the locate receiver, such as identification of the locate receiver (e.g., serial number), make and model of the locate receiver, mode of operation (e.g., passive or active, and peak or null), battery level, etc.;

transmitter information: information about any transmitter and transmitter signal (also referred to herein as an applied signal) utilized for the locate operation, such as transmitter type, identification of the transmitter (e.g., serial number), make and model of the transmitter, mode of operation (e.g., inductive and conductive), battery level, connection type, electrical ground type, electrical ground position, moisture content of physical ground to which electrical ground contact is made, pH of physical ground, applied signal frequency, available signal frequencies, transmitter power, whether a continuity indication is provided for the applied signal, etc.;

tracer wire information: information about a tracer wire provided along the underground facility, such as tracer wire material (e.g., aluminum, tin/steel, copper/stainless steel, etc.), gauge of the tracer wire, condition of the tracer wire (e.g., whether intact, broken, corroded, etc.), etc.;

environmental information: information derived from one or more environmental sensors associated with the locate device, examples of which sensors include, but are not limited to, temperature sensors, humidity sensors, light sensors, altitude sensors, image capture devices and audio recorders, as well as information that may be manually entered (e.g., by a technician) relating to environmental conditions (e.g., ground type in the area of the locate operation, which could also or alternatively be indicated in ticket information);

operational information: information derived from one or more operational sensors associated with the locate device, examples of which sensors include, but are not limited to, operational temperature sensors, a compass, an inclinometer, one or more accelerometers, a yaw rate sensor, a proximity sensor, a pressure sensor, one or more device health sensors, image capture devices, and audio devices; and Device health information: information about the status of one or more components of a locate device, such as battery status, WiFi connectivity status, GPS receiver status (e.g., GPS signal strength/quality, number of satellites in view), etc.

Locate information including any or all of the foregoing types of information may be logged/stored in local memory of a locate device, formatted in various manners, processed and/or analyzed at the locate device itself, and/or transmitted to another device (e.g., a remote computer/server) for storage, processing and/or analysis.

Locating equipment data 1250 also may include "landmark information" that may be acquired by suitably configured locating equipment (e.g., a marking device, a locate device, or a combined locate and marking device capable of operating in a "landmark mode"), which information may be acquired either independently or as part of (e.g., during or proximate in time to) a locate and/or marking operation.

In one example, marking device data 1252 of locating equipment data 1250 may be electronic information and/or one or more electronic records of data that is provided by electronic marking devices and/or marking systems. Examples of electronic marking devices and/or marking systems that may provide marking device data 1252 may include, but are not limited, to those described in reference to U.S. patent application Ser. No. 11/696,606, filed Apr. 4, 2007 and published Oct. 9, 2008, entitled "Marking system and method;" U.S. patent application Ser. No. 11/685,602, filed Mar. 13, 2007 and published Sep. 18, 2008, entitled "Marking system and method;" U.S. Non-provisional application Ser. No. 12/568,087, filed on September 28, entitled "Methods and Apparatus for Generating an Electronic Record of Environmental Landmarks Based on Marking Device Actuations;" U.S. Non-provisional application Ser. No. 12/539,497, filed on Aug. 11, 2009, entitled "Methods and Apparatus for Generating an Electronic Record of a Marking Operation based on Marking Device Actuations;" U.S. Provisional Patent Application Ser. No. 61/102,151 filed Oct. 2, 2008, entitled "Data acquisition system for and methods of analyzing locate activities based on marking device actuations;" and U.S. Non-provisional patent application Ser. No. 12/703,958, entitled "Marking Apparatus Having Enhanced Features for Underground Facility Marking Operations, and Associated Methods and Systems," filed Feb. 11, 2010. Each of these applications is incorporated herein by reference in its entirety.

Table 1 shows one example of a sample of marking device data 1252 of locating equipment data 1250 that may be captured as the result of, for example, an actuation of a marking device. In some exemplary implementations, an electronic record of a marking operation may include multiple data entries as shown in the example of Table 1 for respective actuations of a marking device to dispense a marking material (e.g., in some cases there may be one set of data as shown in Table 1 for each actuation). In this manner, each time a marker is dispensed (so as to indicate a presence or absence of a given underground facility), data is collected relating to the geographic location of the dispensed marker (e.g., geo-location data). Additionally, data relating to a characteristic of the dispensed marker (e.g., color and/or brand) may be included in the data entries of the electronic record, as well as other data germane to the marking operation.

TABLE 1

Example marking device data 1252 of locating equipment data 1250

| | |
|---|---|
| Service provider ID | 0482 |
| Locate technician ID | 4815 |
| Marking Device ID | 7362 |
| Timestamp data | 12-Jul-2008; 09:35:15.2 |
| Geo-location data | N35° 43.57518, W078° 49.78314 (deg. and dec. min.) |
| Marking material data | Color = Red, Brand = ABC |
| Temperature data | 73 degrees F. |
| Humidity data | 30% |
| Light data | 4.3 volts |
| Compass data | 213 degrees |
| Inclinometer data | −40 |
| Accelerometer data | 0.275 g |
| Battery strength data | 73% |

Table 2 below shows another example of marking device data 1252 of locating equipment data 1250 that may be captured as the result of, for example, one or more actuations of a marking device. Specifically, Table 2 illustrates multiple "actuation data sets" of an electronic record of a marking operation as generated by a marking device, in which each actuation data set includes information associated with multiple actuation event entries logged during a corresponding actuation and dispensing of a locate mark. Table 2 shows three actuation data sets of an electronic record, corresponding to three actuations of the marking device (e.g., act-1, act-2, and act-3). As may be appreciated from the information shown in Table 2, multiple pieces of geo-location data are logged for each actuation of a marking device (in addition to various other information).

TABLE 2

| | | |
|---|---|---|
| Example actuation data set for act-1 | | |
| act-1 | Service provider ID | 0482 |
| | User ID | 4815 |
| | Device ID | 7362 |
| | T1 timestamp data | 12-Jul-2008; 09:35:15.2 |
| | T2 timestamp data | 12-Jul-2008; 09:35:16.1 |
| | Duration (Δt) | 00:00:00.9 |
| | T1 geo-location data | 2650.9348, N, 08003.5057, W |
| | $1^{st}$ interval location data | 2650.9353, N, 08003.5055, W |
| | $2^{nd}$ interval location data | 2650.9356, N, 08003.5055, W |
| | . | . |
| | . | . |
| | . | . |
| | Nth interval location data | 2650.9246, N, 08003.5240, W |
| | T2 geo-location data | 2650.9255, N, 08003.5236, W |
| | Product data | Color = Red, Brand = ABC, Type/Batch = 224B-1 |
| | Locate request data | Requestor: XYZ Construction Company, Requested service address: 222 Main St, Orlando, FL |
| Example actuation data set for act-2 | | |
| act-2 | Service provider ID | 0482 |
| | User ID | 4815 |
| | Device ID | 7362 |
| | T1 timestamp data | 12-Jul-2008; 09:35:17.5 |
| | T2 timestamp data | 12-Jul-2008; 09:35:18.7 |
| | Duration (Δt) | 00:00:01.2 |
| | T1 geo-location data | 2650.9256, N, 08003.5234, W |
| | 1st interval location data | 2650.9256, N, 08003.5226, W |
| | $2^{nd}$ interval location data | 2650.9256, N, 08003.5217, W |
| | . | . |
| | . | . |
| | . | . |
| | Nth interval location data | 2650.9260, N, 08003.5199, W |
| | T2 geo-location data | 2650.9266, N, 08003.5196, W |
| | Product data | Color = Red, Brand = ABC, Type/Batch = 224B-1 |
| | Locate request data | Requestor: XYZ Construction Company, Requested service address: 222 Main St, Orlando, FL |
| Example actuation data set for act-3 | | |
| act-3 | Service provider ID | 0482 |
| | User ID | 4815 |
| | Device ID | 7362 |
| | T1 timestamp data | 12-Jul-2008; 09:35:18.7 |
| | T2 timestamp data | 12-Jul-2008; 09:35:19.8 |
| | duration (Δt) | 00:00:01.1 |
| | T1 geo-location data | 2650.9273, N, 08003.5193, W |
| | 1st interval location data | 2650.9281, N, 08003.5190, W |
| | $2^{nd}$ interval | 2650.9288, N, 08003.5188, W |

TABLE 2-continued

| | location data | |
|---|---|---|
| | . | . |
| | . | . |
| | . | . |
| | Nth interval location data | 2650.9321, N, 08003.5177, W |
| | T2 geo-location data | 2650.9325, N, 08003.5176, W |
| | Product data | Color = Red, Brand = ABC, Type/Batch = 224B-1 |
| | Locate request data | Requestor: XYZ Construction Company, Requested service address: 222 Main St, Orlando, FL |

With regard to the marking material color information that may be included in marking device data 1252 as exemplified in Tables 1 and 2, Table 3 shows an example of the correlation of marking material color to the type of facility to be marked.

TABLE 3

Correlation of color to facility type

| Marking material color | Facility Type |
|---|---|
| White | Proposed excavation |
| Pink | Temporary survey markings |
| Red | Electric power lines, cables or conduits, and lighting cables |
| Yellow | Gas, oil, steam, petroleum, or other hazardous liquid or gaseous materials |
| Orange | Communications, cable TV, alarm or signal lines, cables, or conduits |
| Blue | Water, irrigation, and slurry lines |
| Purple | Reclaimed water, irrigation and slurry lines |
| Green | Sewers, storm sewer facilities, or other drain lines |
| Black | Mark-out for errant lines |

In another example, locate receiver data 1254 of locating equipment data 1250 may be electronic information (e.g., one or more electronic records) of data that is provided by electronic locate receiver devices and/or systems. Examples of a locate receiver device that may provide locate receiver data 1254 are described in U.S. Non-provisional patent application Ser. No. 12/704,087, entitled "Locate Apparatus Having Enhanced Features for Underground Facility Locate Operations, and Associated Methods and Systems," filed on Feb. 11, 2010, which application is incorporated herein by reference in its entirety.

Table 4 below shows an example of a sample of locate receiver data 1254 of locating equipment data 1250 that may be captured, for example, at one or more times during operation/use of an appropriately configured locate receiver. Different models of locate receivers and transmitters are available from a variety of manufacturers and have different features; accordingly, it should be appreciated that the information content and type provided in Table 4 is exemplary of possible information relating to locate receivers on which a quality assessment of a locate operation may be based, and that other types and values for information are possible. With respect to information potentially provided by a given locate receiver as shown in Table 4 below, the "gain" is typically a measure of the degree of sensitivity of a locate receiver antenna that is picking up a signal emanating from along an underground facility (alternatively, "gain" may be viewed as a degree of amplification being applied to a received signal). Gain may be expressed in terms of any scale (e.g., 0-100), as a numeric value or percentage. "Signal strength" refers to the strength of a received signal at a given gain value; signal strength similarly may be expressed in terms of any scale, as a numeric value or percentage. Generally speaking, higher signal strengths at lower gains typically indicate more reliable information from a locate receiver, but this may not necessarily be the case for all locate operations.

TABLE 4

Example locate receiver data 1254 of locating equipment data 1250

| | |
|---|---|
| Service provider ID | 0482 |
| Locate technician ID | 4815 |
| Locate Device ID | 7345 |
| Timestamp data | 12-Jul-2008; 09:35:15.2 |
| Geo-location data | N35° 43.57518, W078° 49.78314 (deg. And dec. min.) |
| Locate mode | Mode = PASSIVE; PEAK |
| Facility type | Gas (yellow) |
| Ground type | Pavement |
| Signal frequency | 60 Hz |
| Facility depth | 3.4 feet |
| Temperature data | 73 degrees F. |
| Humidity data | 30% |
| Light data | 4.3 volts |
| Compass data | 213 degrees |
| Inclinometer data | −40 |
| Accelerometer data | 0.275 g |
| Battery strength data | 85% |

In some exemplary implementations, an electronic record of a locate operation as obtained from a locate receiver may include multiple data entries as shown in the example of Table 4. Each such entry may not only include information about various operating parameters of the locate receiver (e.g., signal strength, gain), but may additionally include location information (geo-location data) associated with detected facilities, as well as various environmental data. The logging of a given entry by a locate receiver may automatically result from one or more conditions (e.g., signal strength exceeding a particular threshold) and/or respective data entries may be manually logged by a technician using the locate receiver (e.g., via a push button, touch screen, trigger actuation, or other interaction facilitated by a user interface of the locate receiver). In this manner, multiple pieces of data may be collected for an electronic record of a locate operation, including multiple pieces of geo-location data for a given underground facility detected via the locate receiver.

It should be appreciated that Table 4 represents only one non-limiting example of an electronic record of locate information which may be generated in accordance with the operation of a locate receiver, according to one embodiment. In particular, a single electronic record of locate information collected in connection with operation of a locate receiver may include multiple entries of a given data type. For example, while Table 4 illustrates an electronic record including a single GPS data point in connection with the detection of a gas facility, it should be appreciated that multiple GPS data points may be taken and stored within a single electronic record, for a single type of facility or for multiple different types of facilities detected during a locate operation. The multiple GPS data points may be taken in response to a single actuation event (e.g., single actuator pull by a technician), in response to multiple actuation events (e.g., multiple actuator pulls by a technician), or in other manners. Thus, multiple pieces of data may be collected for an electronic record of a locate operation, and it should be appreciated that any single electronic record may include multiple entries.

In another example, both marking device data 1252 and locate receiver data 1254 of locating equipment data 1250 may be electronic information (e.g., one or more electronic records) of data that is provided by a combined locate and marking device. An example of such a combined locate and marking device is described in U.S. Non-provisional application Ser. No. 12/569,192, filed on Sep. 29, 2009, entitled "Methods, Apparatus, and Systems for Generating Electronic Records of Locate and Marking Operations, and Combined Locate and Marking Apparatus for Same," and U.S. Provisional Patent Application Ser. No. 61/102,122, filed on Oct. 2, 2008, entitled "Combination Locate and Marking Device With a Data Acquisition System Installed Therein, and Associated Methods," which applications are both hereby incorporated herein by reference in their entirety. In some exemplary implementations, such devices may provide respective data sets of geographic information for the marking functionality and the locate functionality, while in other implementations such devices may provide only a single data set of geographic information representing both detection and marking of a given facility (e.g., presuming that, via use of a combined locate and marking device, marks are dispensed directly in response to detection of a facility at a given geographic location).

Table 5 below illustrates one non-limiting example of four actuation data sets that may be collected in an electronic record generated by a combined locate and marking device, in which each data set corresponds, for example, to a separate actuation event to dispense marking material. It should be appreciated, however, that these are merely examples, and that various alternative electronic records may be generated according to the aspects of the invention, for example reflecting different types of information associated with operation of a combination locate and marking device.

Each of the four records of Table 5 includes general information not limited to either the locate receiver functionality or marking functionality of the combination device, such as an identification of the service provider (Service provided ID), an identification of the user (User ID), an identification of the device (Device ID), and information about the requestor of the locate operation and the requested address (Locate request data). In addition, an entry describing the mode of data collection (e.g., Manual) for the device is also collected, which may indicate that information is logged into the record(s) upon actuation of the combined locate and marking device. Information about the actuation itself, such as the time of actuation (Timestamp data), actuation duration, and geographical location (geo-location data) at the start, during, and/or at and end of the actuation may also be included. The data sets also include information relating to the locate receiver functionality of the combination locate and marking device, including the receiver detection mode (i.e., PEAK in Table 5), the strength of a detected signal, and the frequency of the detected signal. Information relating to a depth measurement (Facility depth) is also included, as is information about the marking material to be dispensed by the combination locate and marking device. Again, it should be appreciated that Table 5 is an illustration of one electronic record including multiple data sets that may be generated in association with operation of a combination locate and marking device, and that other forms of electronic records are also possible.

TABLE 5

Electronic Record for Combination Locate and Marking Device

| | | |
|---|---|---|
| Record #1001 | Service provider ID | 0482 |
| | User ID | 4815 |
| | Device ID | 7362 |
| | Device mode | Mode = MANUAL |
| | Timestamp data | 12-Jul-2008; 09:35:15 |
| | Actuation duration | 0.5 sec |
| | Start actuation location data | 2650.9348, N, 08003.5057, W |
| | End actuation location data | 2650.9353, N, 08003.5055, W |
| | Locate mode | Mode = PEAK |
| | Signal strength (% of maximum) | 85% |
| | Signal frequency | 1 kHz |
| | Facility depth | 3.4 meters |
| | Marking material data | Color = RED, Brand = ABC |
| | Locate request data | Requestor = XYZ Construction Company, Requested service address = 222 Main St, Orlando, FL |
| Record #1002 | Service provider ID | 0482 |
| | User ID | 4815 |
| | Device ID | 7362 |
| | Device mode | Mode = MANUAL |
| | Timestamp data | 12-Jul-2008; 09:35:18 |
| | Actuation duration | 0.4 sec |
| | Start actuation location data | 2650.9256, N, 08003.5234, W |
| | End actuation location data | 2650.9256, N, 08003.5226, W |
| | Locate mode | Mode = PEAK |
| | Signal strength (% of maximum) | 85% |
| | Signal frequency | 1 kHz |
| | Facility depth | 3.4 meters |
| | Marking material data | Color = RED, Brand = ABC |
| | Locate request data | Requestor = XYZ Construction Company, Requested service address = 222 Main St, Orlando, FL |
| Record #1003 | Service provider ID | 0482 |
| | User ID | 4815 |
| | Device ID | 7362 |
| | Device mode | Mode = MANUAL |
| | Timestamp data | 12-Jul-2008; 09:35:21 |
| | Trigger pull duration | 0.5 sec |
| | Start actuation location data | 2650.9273, N, 08003.5193, W |
| | End actuation location data | 2650.9281, N, 08003.5190, W |
| | Locate mode | Mode = PEAK |
| | Signal strength (% of maximum) | 85% |
| | Signal frequency | 1 kHz |
| | Facility depth | 3.4 meters |
| | Marking material data | Color = RED, Brand = ABC |
| | Locate request data | Requestor = XYZ Construction Company, Requested service address = 222 Main St, Orlando, FL |
| Record #1004 | Service provider ID | 0482 |
| | User ID | 4815 |
| | Device ID | 7362 |
| | Device mode | Mode = MANUAL |
| | Timestamp data | 12-Jul-2008; 09:35:25 |
| | Actuation (actuation) duration | 0.5 sec |
| | Start actuation location data | 2650.9321, N, 08003.5177, W |
| | End actuation location data | 2650.9325, N, 08003.5176, W |
| | Locate mode | Mode = PEAK |

TABLE 5-continued

Electronic Record for Combination Locate and Marking Device

| | |
|---|---|
| Signal strength (% of maximum) | 85% |
| Signal frequency | 1 kHz |
| Facility depth | 3.4 meters |
| Marking material data | Color = RED, Brand = ABC |
| Locate request data | Requestor = XYZ Construction Company, Requested service address = 222 Main St, Orlando, FL |

While the collection and logging of locate information and marking information to generate an electronic record is discussed in some aspects, for purposes of illustration, in terms of actuation data sets (i.e., a set of data that is associated and logged with a corresponding actuation of a locate device, marking device, or combined locate and marking device), it should be appreciated that electronic records as discussed herein are not limited in this respect. More generally, an electronic record of a locate and/or marking operation may be generated in any of a variety of manners, have a variety of file formats and/or data structures, and include any of a variety of locate information and/or marking information (some of which may be germane to one or more actuations of a device, some of which may be common to multiple actuations or the overall locate and/or marking operation in general, and some of which may not be related to specific actuations). For example, in some exemplary implementations electronic records may be a "flat files" including a succession of time stamped "event entries" of various locate information and/or marking information (logged automatically as a result of one or more particular conditions, e.g., exceeded thresholds for various signals, or manually as a result of user actuation of a device), or a differently formatted file (e.g., an ASCII file, an XML file) having a data structure that segregates or separates in some manner the locate information and/or marking information into multiple different fields.

It should also be appreciated that one or both of the marking device data 1252 and locate receiver data 1254 of locating equipment data 1250, received from any of the marking devices, locate devices, or combined locate and marking devices referenced above, may include landmark information (in addition to, or alternatively to, locate information and marking information). Landmark information may include any information relating to one or more environmental landmarks of interest (e.g., in and around the work site/dig area and/or generally in the vicinity of the locate and marking operation). Examples of landmark information include, but are not limited to, geo-location data of an environmental landmark, type of environmental landmark, and a time stamp for any acquired information relating to an environmental landmark. In some instances, landmark information may be acquired from locate equipment particularly configured to operate in a landmark mode so as to acquire such information, as well as one or more other modes (e.g., "locate mode" or "marking mode") to accomplish functions relating to detection and/or marking of underground facilities.

Tables 6A and 6B below show examples of landmark information that may be included in an electronic record forming part of either marking device data 1252 or locate receiver data 1254 of locating equipment data 1250. Table 6A shows the format and content of an electronic record entry for a utility pole, which includes one geo-location data point, and Table 6B shows the format and content of an electronic record entry for a pedestal, which includes four geo-location data points (i.e., one for each corner of the pedestal). As noted above, it should be appreciated that the format and content shown below in Tables 6A and 6B is provided primarily for purposes of illustration, and that a variety of formats and content may be employed for an electronic record entry for landmark information.

TABLE 6A

Example record of landmark information acquired for a utility pole

| | | |
|---|---|---|
| Record #1 | Service provider ID | 0482 |
| | User ID | 4815 |
| | Device ID | 7362 |
| | Type of EL | Type = utility pole |
| | timestamp data | 12-Jul-2008; 09:35:17.5 |
| | geo-location data | 2650.9256, N, 08003.5234, W |
| | Locate request data | Requestor: XYZ Construction Company, Requested service address: 222 Main St, Orlando, FL |

TABLE 6B

Example record of landmark information acquired for a pedestal

| | | |
|---|---|---|
| Record #2 | Service provider ID | 0482 |
| | User ID | 4815 |
| | Device ID | 7362 |
| | Type of EL | Type = pedestal |
| | Timestamp data | 12-Jul-2008; 09:35:17.5 |
| | geo-location data | 2650.9256, N, 08003.5234, W |
| | Type of EL | Type = pedestal |
| | Timestamp data | 12-Jul-2008; 09:35:21.2 |
| | geo-location data | 2650.9256, N, 08003.5226, W |
| | Type of EL | Type = pedestal |
| | Timestamp data | 12-Jul-2008; 09:35:26.7 |
| | geo-location data | 2650.9288, N, 08003.5188, W |
| | Type of EL | Type = pedestal |
| | Timestamp data | 12-Jul-2008; 09:35:33.5 |
| | geo-location data | 2650.9321, N, 08003.5177, W |
| | Locate request data | Requestor: XYZ Construction Company, Requested service address: 222 Main St, Orlando, FL |

D. Electronic Manifests

Electronic Manifest (EM) application 1260 of data sources 1216 is a computer software application that may be used to create an electronic manifest of a locate and/or marking operation. As discussed above, an electronic manifest may include a digital (e.g., aerial) image of the work site/dig area and its surroundings, upon which may be overlaid any of a variety of information relating to a locate and/or marking operation (e.g., derived from any of the information discussed above in connection with electronic records generated by various locate equipment). In one example of an electronic manifest, one or more "electronic locate marks" are overlaid on a digital image for indicating corresponding physical locate marks that have been placed on the ground, pavement or other surface at the site, thereby indicating the geo-locations and types of facilities present. One or more detection marks corresponding to detected facilities, as well as one or more landmarks, also may be indicated on the digital image together with the electronic locate marks. Via the EM application 1260, the digital images may be marked up "manually" by a technician (e.g., using a stylus or other type of user interface in conjunction with the digital image displayed in a display field) to include one or more electronic locate marks, detection marks and/or one or more identifiers for environmental landmarks. Alternatively, a digital image may be marked up "automatically" by importing data, for example, from one or more pieces of locate equipment (e.g., a locate device, a marking device, or a combined locate and marking device) and overlaying the imported data on the digital image.

In one example, the starting digital images to be marked up using EM application 1260 may be VWL images 1232 that are associated with tickets 1220. In this manner, the resulting EM image may contain the original dig area indicator (e.g., from the VWL image) to indicate or delimit the dig area for the locate and marking operation, together with any electronic locate marks and/or landmarks added to the image via the EM application. The marked up digital images may be saved as, for example, EM images 1262, which may be associated with, for example, tickets 1220 and may be used by locate companies to support proof of work compliance. In some embodiments, EM application 1260 may be implemented as described in U.S. patent application Ser. No. 12/831,330, filed Jul. 7, 2010, and entitled "METHODS, APPARATUS AND SYSTEMS FOR GENERATING SEARCHABLE ELECTRONIC RECORDS OF UNDERGROUND FACILITY LOCATE AND/OR MARKING OPERATIONS," which application is incorporated by reference herein in its entirety.

As noted above in connection with VWL images 1232 provided by VWL application 1230, an EM image 1262 may include metadata corresponding to any markings or content in the image; in particular, geographic coordinates (e.g., latitude and longitude values) for any dig area indicator, electronic locate marks, detection marks, and/or landmarks marked on the image may accompany or be included in an image file as metadata. Accordingly, these geographic coordinates, as well as any other information provided by EM application, may be employed in some manner as part of a quality assessment process (e.g., as field information/data, or in some instances as reference information/data, or in some instances to pre-process or filter one or both of field information/data and reference information/data prior to comparison).

Figure 5:
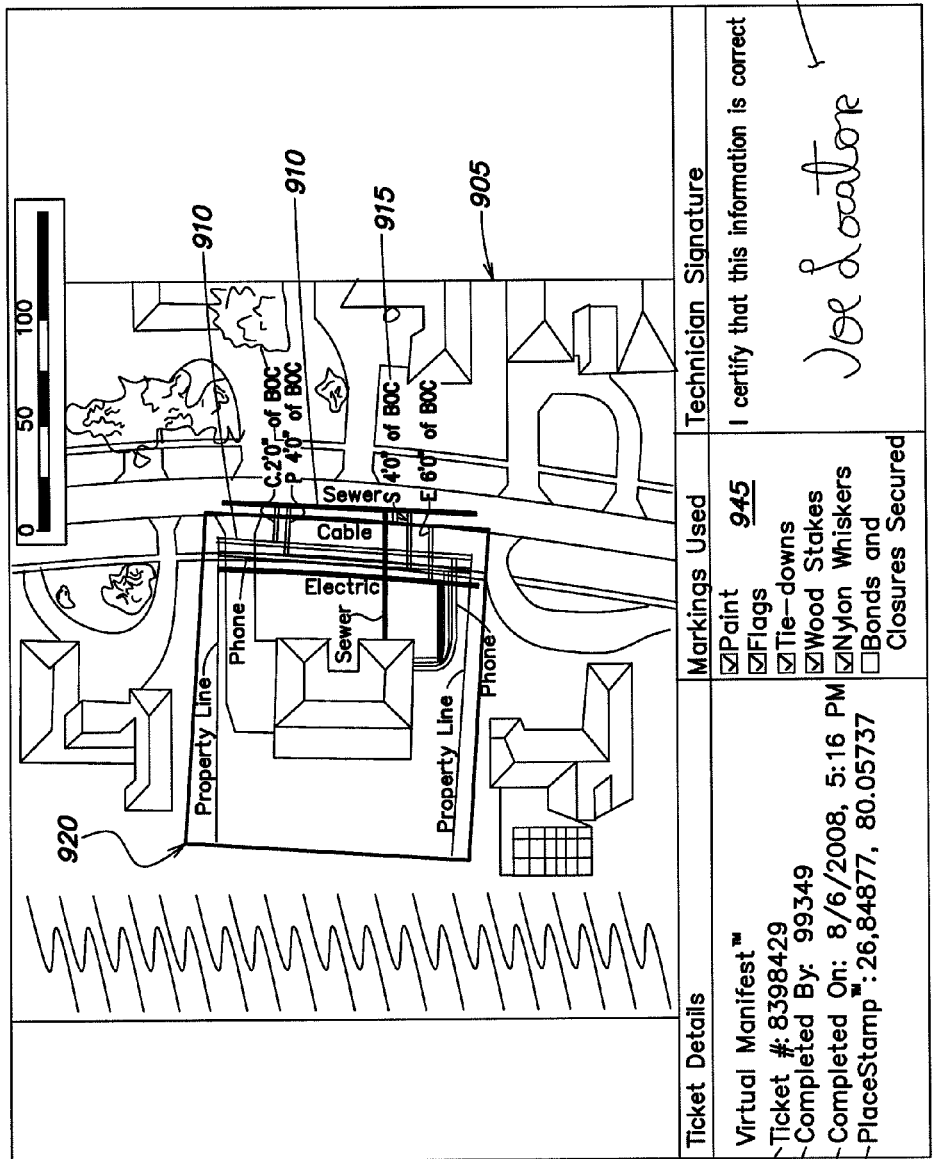
FIG. 5 illustrates an electronic manifest comprising both image data and non-image data relating to a locate and/or marking operation, in accordance with some embodiments of the present disclosure.

FIG. 5 shows an example of an electronic manifest 900 that comprises both image data and non-image data. In this example, the electronic manifest 900 comprises a marked-up image 905 showing locate mark indicators 910 (e.g., to indicate locations of physical locate marks), offset indicia 915 (e.g., to indicate distances between physical locate marks and certain environmental landmarks) and dig area indicators 920 (e.g., as provided by an excavator on a VWL image). In addition, the electronic manifest 900 comprises non-image information relating to the locate and/or marking operation, such as a ticket number or identifier 925, a name or identifier 930 associated with the locate technician (which may indicate facility owner/operator, or locate company/technician), a time and date stamp 935 indicating when the electronic manifest was created, a location stamp 940 indicating where the electronic manifest was created, a completed checklist 945 of markings used in the locate and/or marking operation, and a locate technician signature 950 certifying that the information of the electronic manifest is correct.

Although FIG. 5 shows an example of an electronic manifest including specific types of ticket information, it should be appreciated that an electronic manifest as described herein is not limited in this regard, and may alternatively include other combinations of ticket information. Also, an electronic manifest may be displayed and/or formatted in manners different from the example shown in FIG. 5.

The underlying electronic data used to generate an electronic manifest (e.g., the electronic manifest 900 shown in FIG. 5) may be represented and/or stored in any suitable manner, as the present disclosure is not limited in this respect. In some embodiments, the marked-up image(s) and the non-image information may be stored as a single file. For example, the non-image information may be included as metadata associated with the marked-up image(s). In other embodiments, the marked-up image(s) and the non-image information may be formatted as separate data sets and may be transmitted and/or stored separately. In another aspect, whether transmitted/stored separately or together, the marked-up image(s) and the non-image information may be linked together in some manner as relating to a common electronic record.

FIG. 6 shows an example of a data set 1000 that may be used to generate an electronic manifest. In this example, the data set 1000 may include a timestamp field 1010, a facility type identifier field 1020, a facility mark location field 1030, an environmental landmark identifier field 1040, an environmental landmark location field 1050, an other information field 1060, a facility owner/operator field 1065, a marking method field 1070, a property address field 1080, a ticket number field 1090, a location stamp field 1015, and a certification field 1025.

Although FIG. 6 shows specific examples of information fields, it should be appreciated that the present disclosure is not limited in this regard. In other implementations, the data set 1000 may include additional, fewer, or different fields. Some exemplary information fields are discussed briefly below.

The timestamp field 1010 may include time data that identifies the day and/or time that a locate and/or marking operation is performed. This may coincide with a time at which an environmental landmark location is identified in connection with the dig area. The time data in the timestamp field 1010 is shown in FIG. 6 as 9:43 a.m. on Oct. 20, 2005, although any type of date and/or time code may be used. The information in timestamp field 1010 may be useful in establishing when a locate and/or marking operation occurred.

Figure 10:
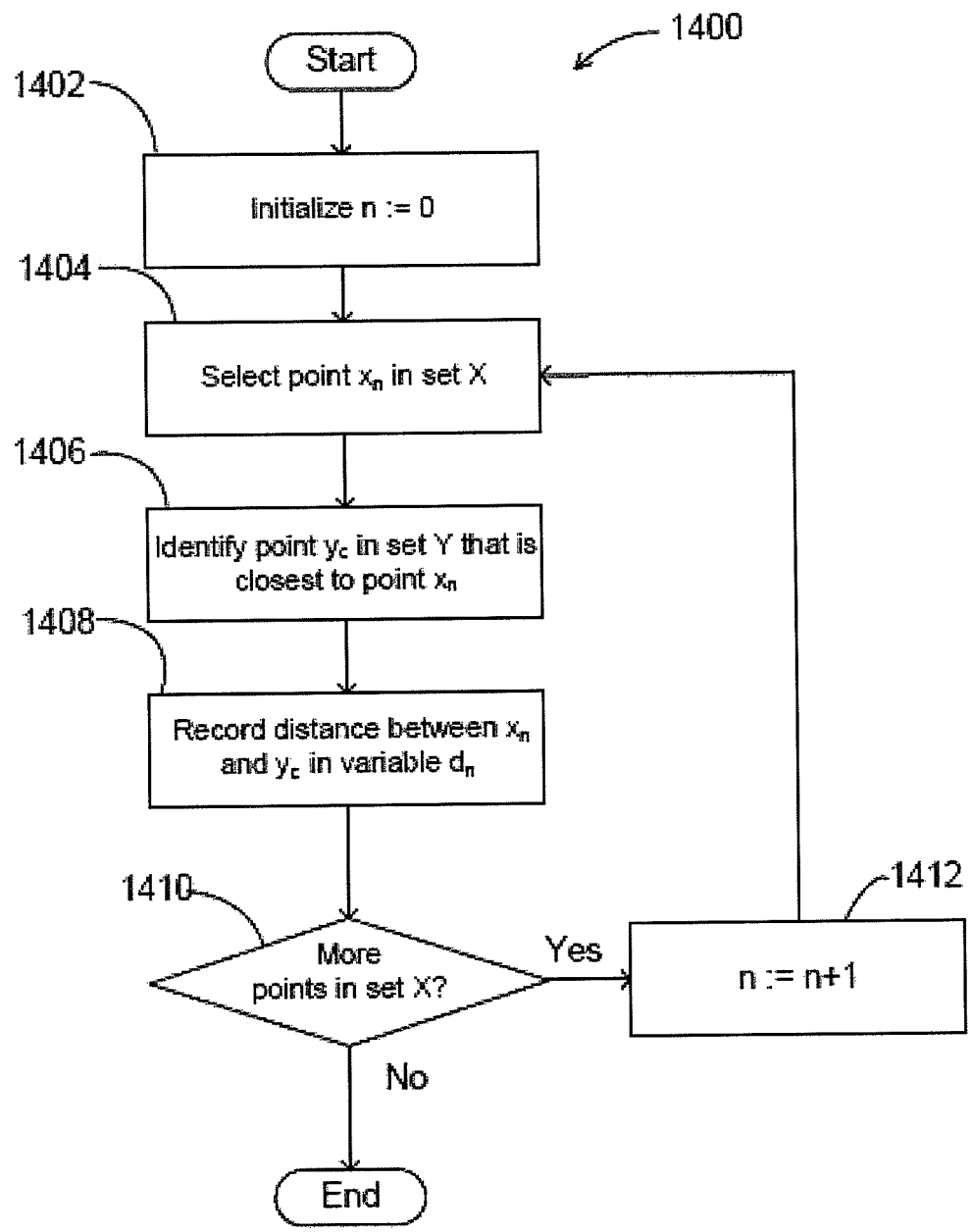
FIG. 10 illustrates flow diagram outlining a process for determining a distance between two sets of geographical points, in accordance with some embodiments of the present disclosure.

The facility type identifier field 1020 may include an identifier that identifies a type of underground facility that is being marked. The identifier in the facility type identifier field 1020 is shown in FIG. 6 as "power," although any type of identifier may be used. The facility mark location field 1030 may include geographical information corresponding to a physical locate mark. In some implementations, the geographical information may identify a set of geographical points along a marking path of a located facility line. The geographical information in the facility mark location field 1030 is shown in FIG. 10 as N38°51.40748, W077°20.27798; . . . ; N38°51.40784, W077°20.27865, although any type of geographical information may be used.

The information in the facility mark location field 1030 may be useful in graphically presenting the facility locate marks on a map, and/or to verify that the locate and/or marking operation was actually and accurately performed. Additionally, or alternatively, the facility mark location field 1030 may include geographical information for multiple facility locate marks.

The environmental landmark identifier field 1040 may include an identifier that identifies a type of environmental landmark being marked. The identifier in environmental landmark identifier field 1040 is shown in FIG. 6 as "curb," although any type of identifier may be used. The environmental landmark location field 1050 may include geographical information corresponding to the environmental landmark identified in the environmental landmark identifier field 1040. The geographical information in the environmental landmark location field 1050 is shown in FIG. 6 as N38°51.40756, W077°20.27805; . . . ; N38°51.40773, W077°20.27858, although any type of geographical information may be used.

The other information field 1060 may store any other data that may be useful, including user notes, such as offset or distance information that identifies a distance between one or more environmental landmarks and one or more facility locate marks. The other information field 1060 is shown in FIG. 6 as including "1.2 meters between curb and power line," although any other data may be used. Additionally, or alternatively, the other information field 1060 may include audio/voice data, transcribed voice-recognition data, or the like to incorporate user notes.

E. Facilities Maps

Facilities maps 1280 of data sources 1216 are any physical, electronic, or other representation of the geographic location, type, number, and/or other attributes of a facility or facilities. Facilities maps 1280 may be supplied by the various facility owners and may indicate the geographic location of the facility lines (e.g., pipes, cables, and the like) owned and/or operated by the facility owner. For example, facilities maps 1280 may be supplied by the owner of the gas facilities, power facilities, telecommunications facilities, water and sewer facilities, and so on. In the process of performing the automatic quality assessment, information processing component 1210 may aggregate the information that is contained in multiple facilities maps 1280 in order to determine all the facilities that are present in and around a certain work site/dig area.

As indicated above, facilities maps may be provided in any of a variety of different formats. As facilities maps often are provided by facility owners of a given type of facility, typically a set of facilities maps includes a group of maps covering a particular geographic region and directed to showing a particular type of facility disposed/deployed throughout the geographic region. One facilities map of the set of maps is sometimes referred to in the relevant arts as a "plat."

Perhaps the simplest form of facilities maps is a set of paper maps that cover a particular geographic region. In addition, some facilities maps may be provided in electronic form. An electronic facilities map may in some instances simply be an electronic conversion (i.e., a scan) of a paper facilities map that includes no other information (e.g., electronic information) describing the content of the map, other than what is printed on the paper maps.

Alternatively, however, more sophisticated facilities maps also are available which include a variety of electronic information, including geographic information and other detailed information, regarding the contents of various features included in the maps. In particular, facilities maps may be formatted as geographic information system (GIS) map files, in which map features (e.g., facility lines and other features) are represented as shapes and/or lines, and the file provides metadata describing the geographic locations and types of map features. In some examples, a GIS map file may indicate a facility line using a straight line, and may include some symbol or other annotation (e.g., a diamond shape) at each endpoint of the line to indicate where the line begins and terminates. From the foregoing, it should be appreciated that in some instances, given that the geo-locations of two termination or end-points of a given facility line may be provided by the map, the geo-location of any point on the facility line may be determined from these two end-points.

Examples of a wide variety of environmental landmarks that may be represented in a GIS facilities map file include, but are not limited to: landmarks relating to facilities such as pedestal boxes, utility poles, fire hydrants, manhole covers and the like; one or more architectural elements (e.g., buildings); and/or one or more traffic infrastructure elements (e.g., streets, intersections, curbs, ramps, bridges, tunnels, etc.). A GIS facilities map file may also include various shapes or symbols indicating different environmental landmarks relating to facilities, architectural elements, and/or traffic infrastructure elements.

Examples of information provided by metadata for the map file (i.e., included as part of the electronic file for the map) include, but are not limited to, information about the geo-location of various points along a given line, the termination points of a given line (e.g., the diamond shapes indicating the start and end of the line), the type of facility line (e.g., facility type and whether the line is a service line or main), geo-location of various shapes and/or symbols for other features represented in the map (environmental landmarks relating to facilities, architectural elements, and/or traffic infrastructure elements), and type information relating to shapes and/or symbols for such other features.

Facilities maps may include additional information that may be useful to a quality assessment process. For example, various information that may be included in a legend of the facilities map, or otherwise associated with the facilities map (e.g., included in the metadata or otherwise represented on the map), and available for use in a quality assessment process, may include, but is not limited to, a date of the facilities map (e.g., when the map was first generated/created, and/or additional dates corresponding to updates/revisions), a number of revisions to the facilities map (e.g., revision number, which may in some instances be associated with a date), one or more identifiers for a source, creator, owner and/or custodian of the facilities map (e.g., the owner of the facility type represented in the map), various text information (e.g., annotations to update one or more aspects or elements of the map), and any other legend information that may be included or represented in the map.

Figure 7:
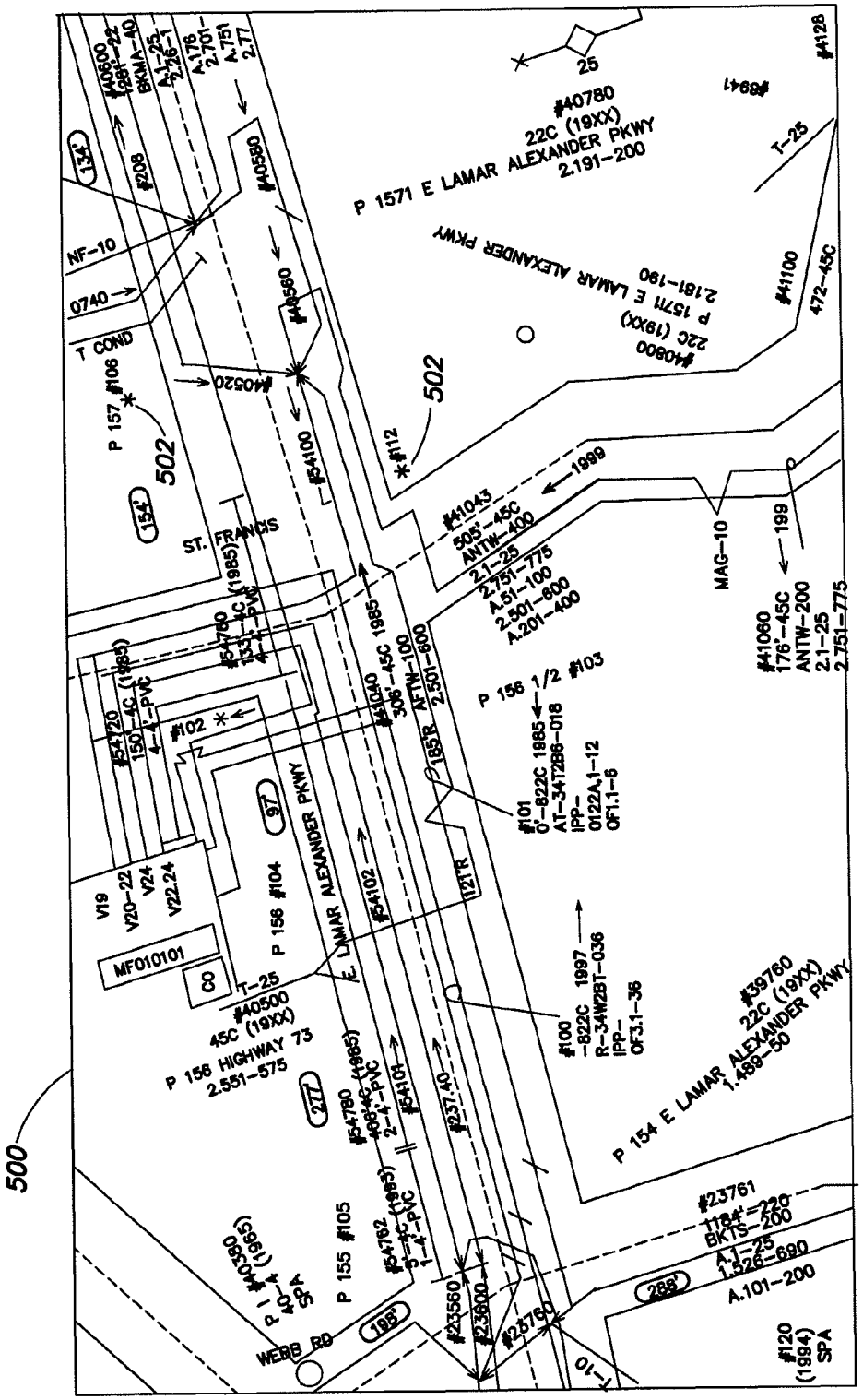
FIG. 7 is an example of a facilities map from which information may be obtained for a quality assessment, in accordance with some embodiments of the present disclosure.

FIG. 7 shows an example of a visual representation of a portion of an electronic facilities map 500. In this example, facilities map 500 is a telecommunications facilities map that is supplied by a telecommunications company. Facilities map 500 shows telecommunications facilities in relation to certain landmarks, such as streets and roads, using lines and shapes. As discussed above, the electronic facilities map may include metadata indicating what various lines, symbols and/or shapes represent, and indicating the geo-location of these lines, symbols and/or shapes. With respect to exemplary environmental landmarks, facilities map 500 may include both visual information and metadata relating to utility poles 502, manhole 504, and any of a variety of other landmarks that may fall within the geographic area covered by the facilities map 500.

Additional details regarding the use of information derived from one or more facility maps as part of an automated quality assessment process for locate and/or marking operations is discussed in U.S. Non-provisional application Ser. No. 12/571,356, filed Sep. 30, 2009, entitled "METHODS AND APPARATUS FOR ANALYZING LOCATE AND MARKING OPERATIONS WITH RESPECT TO FACILITIES MAPS," which application is hereby incorporated herein by reference.

IV. EXEMPLARY AUTOMATED ASSESSMENT METHODS

Figure 8:
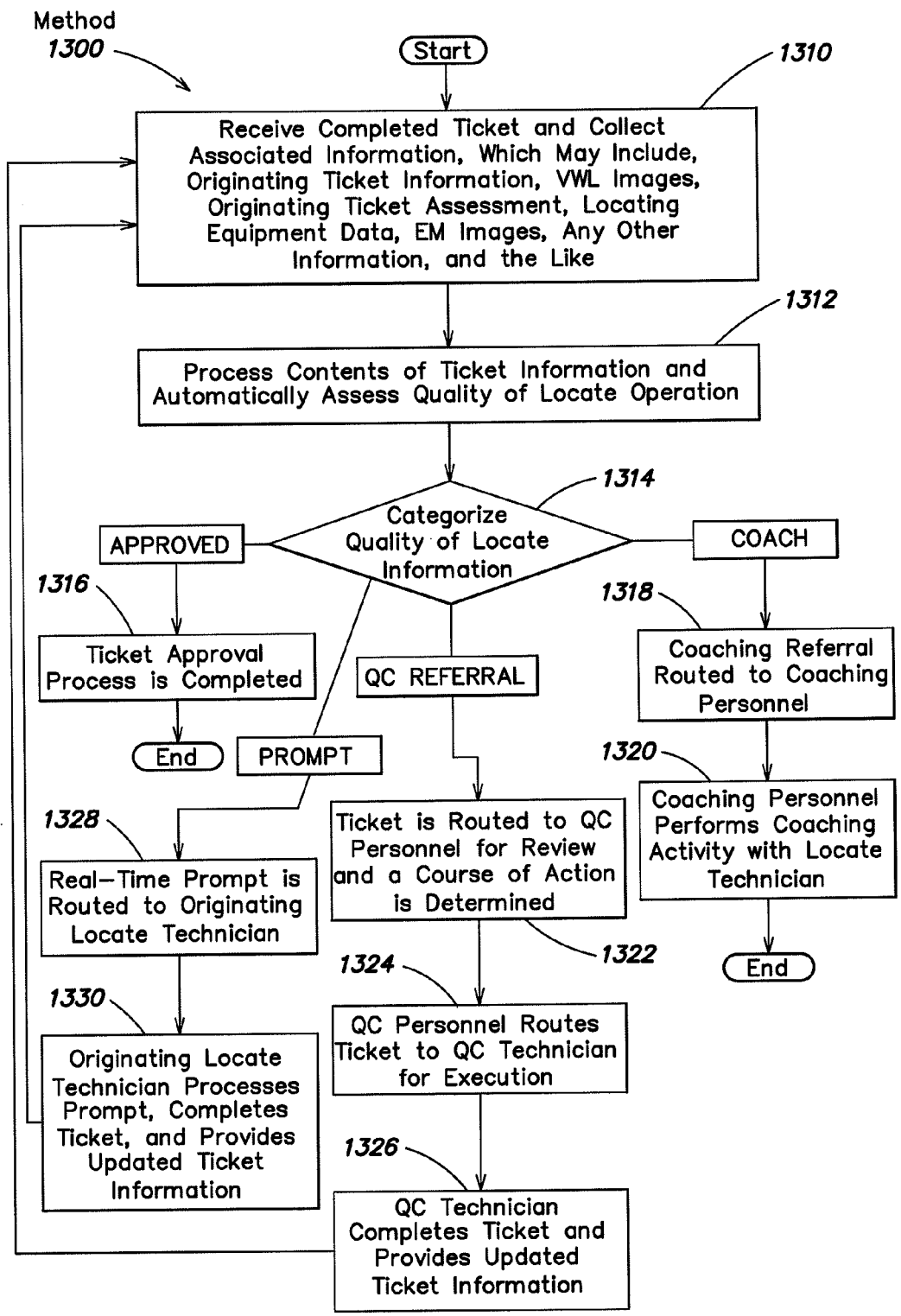
FIG. 8 illustrates a flow diagram of an exemplary method for automatically performing a quality assessment regarding an underground facility locate and/or marking operation using the automated quality assessment system shown in FIG. 2, in accordance with some embodiments of the present disclosure.

FIG. 8 shows a flow diagram of an exemplary process 1300 for performing a quality assessment of an underground facility locate and/or marking operation, as implemented by automated quality assessment application 1200. While the example provided in FIG. 8 is a more specific example of the generic process 1900 discussed above in connection with FIG. 3, and describes an automated quality assessment based on a completed or closed ticket for which it is presumed that a locate and/or marking operation was actually performed by a technician, it should be appreciated that the concepts generally outlined in the process 1300 may be applied to various types of available information relating to a requested locate operation and marking operation, whether performed separately or in tandem, and irrespective of actual performance of the locate operation and/or the marking operation, so as to assess the quality of the requested operation.

Process 1300 begins at act 1310, where a completed (i.e., closed) ticket is received and associated information to be used in assessing the quality of a locate and/or marking operation, for example, performed in connection with the ticket is collected by automated quality assessment application 1200. The associated ticket information may include, for example, the originating ticket information (e.g., textual ticket information 1222 of a certain ticket 1220), and one or more of the VWL images (e.g., a VWL image 1232 of a certain ticket 1220), the originating ticket assessment (e.g., a ticket assessment outcome 1242 of a certain ticket 1220), the locating equipment data (e.g., marking device data 1252 and/or locate receiver data 1254 of a certain ticket 1220), the EM images (e.g., a EM image 1262 of a certain ticket 1220), and any other information (e.g., from other electronic information and/or records 1295).

The process then continues to act 1312, where the received information is used to automatically assess the quality of the locate and/or marking operation. In the example of FIG. 8, a locate and/or marking operation is categorized as either (a) APPROVED—the operation is approved, no further action needed; (b) SATISFACTORY—the operation is approved, but the locate technician needs coaching or training; (c) UNSATISFACTORY—the operation is not approved, the ticket needs QC action; or (d) PROMPT—an aspect of the operation assessment may be suitable for transmitting a real-time prompt to the locate technician with respect to, for example, performing a substantially immediate verification and/or corrective action. However, the invention is not limited in this respect, as any suitable indication of quality may be provided as a result of an automatic quality assessment, such as, a numerical score (e.g., a score from 0-100%), a letter grade, another type of graduated indictor based on some scale or range, or any other indication of quality. Additional details and examples of how quality may be automatically assessed at act 1312 and an indication (e.g., a categorization) of quality may be automatically generated at act 1314 are discussed below. It should be appreciated that the invention is not limited to these particular examples, and that such examples are provided primarily for the purposes of illustration.

In some implementations, the process 1300 of automated assessment may be carried out on a partially completed ticket (i.e., a ticket which has not been closed). As an example, the process 1300 may be executed in real-time, or near real-time, as locating equipment data 1250 (e.g., marking information, locate information, landmark information) is generated and received by a system executing the process 1300. In one embodiment, as discussed further below, locate receiver data 1254 ("locate information") and marking device data 1252 ("marking information") received as locating equipment data may be compared to each other as part of an automated assessment process. Additionally or alternatively, in one aspect, the system may have access to certain data (e.g., historical data) that can serve as reference information, and one or both of marking information and locate information received as locating equipment data may be compared to the reference information. For example, in one embodiment of process 1300, marking device data 1252 may be compared to historical marking data, historical locate receiver data 1254, or historical landmark data in real-time or near real-time as a technician marks a facility.

V. QUALITY ASSESSMENTS BASED ON COMPARISON OF MARKING INFORMATION AND LOCATE INFORMATION

In some embodiments, a quality assessment of a locate and/or marking operation may be based on a comparison of different types of field information, in which one type of the field information itself serves as reference information for another type of the field information. For example, in one embodiment, first field information relating to a marking operation ("marking information") may be compared with reference information in the form of second field information relating to a locate operation ("locate information"). It should be appreciated that in embodiments in which different types of field information are compared with each other, in some situations the distinction between "field information" and "reference information" may not have any practical effect; however, in other situations, it may be desirable to designate one type of the field information as the "reference information" for purposes of comparison (e.g., for various reasons, it may be presumed a priori that a first type of field information is generally more reliable than a second type of field information, and that hence the first type of field information is taken as the "reference information" for purposes of comparative analysis).

In one aspect of embodiments in which marking information and locate information are compared with each other, the marking information and the locate information may pertain to the same work site/dig area and represent corresponding locate and marking operations both performed in response to the same locate request ticket (such that the marking information and locate information essentially are obtained concurrently). In another aspect, the marking information and the locate information may pertain to the same work site/dig area, but one of the marking information and the locate information may have been acquired in connection with performance of a different locate request ticket (e.g., one of the marking information and the locate information may be obtained from a "historical ticket"). With respect to one of the marking information and the locate information being obtained from a historical ticket, it should be appreciated that the same technician may or may not have been responsible for obtaining the respective marking information and locate information forming the basis of the comparative analysis. Additional details regarding the use of historical information as part of an automated quality assessment process for locate and/or marking operations is discussed in U.S. Non-provisional patent application Ser. No. 12/572,202, filed Oct. 1, 2009, and entitled "Methods and Apparatus for Analyzing Locate and Marking Operation with Respect to Historical Information," which application is incorporated herein by reference.

In various embodiments of the present invention, it should be appreciated that any constituent portion of marking information (e.g., as discussed above in Section III.C) may be compared to any constituent portion of locate information (e.g., as discussed above in Section III.C), based on any of a variety of criteria and metrics, to assess a quality of the locate and/or marking operation. In one example discussed in detail below, geographic information contained in marking information and locate information, respectively, provides a basis of comparison on which quality is assessed. However, in other exemplary implementations, alternatively to or in addition to geographic information, other information such as timing information, ticket information, service-related information, environmental information, operational information, etc., may be utilized in some manner, from one or both of the marking information and the locate information, to facilitate a quality assessment.

More specifically, in some exemplary embodiments "marking geo-location data" (e.g., one or more sets of latitude and longitude coordinates) relating to the marking of a given underground facility during a marking operation are compared to "locate geo-location data" relating to the detection of that facility during a locate operation. In this manner, a correspondence or discrepancy (or degree of correspondence) may be ascertained between the marking geo-location data and the locate geo-location data. As discussed in greater detail below, a first set of marking latitude and longitude coordinates constituting lines or curves representing underground facilities marked during a marking operation may be compared to a second set of locate latitude and longitude coordinates constituting lines or curves representing underground facilities detected during a locate operation to determine a degree of matching between the two sets, in a manner akin to pattern matching. This may be useful in determining how closely the physical locate marks formed by the technician during a marking operation correspond to the presumed physical location(s) of the underground facilities as detected during a locate operation.

Figure 9:
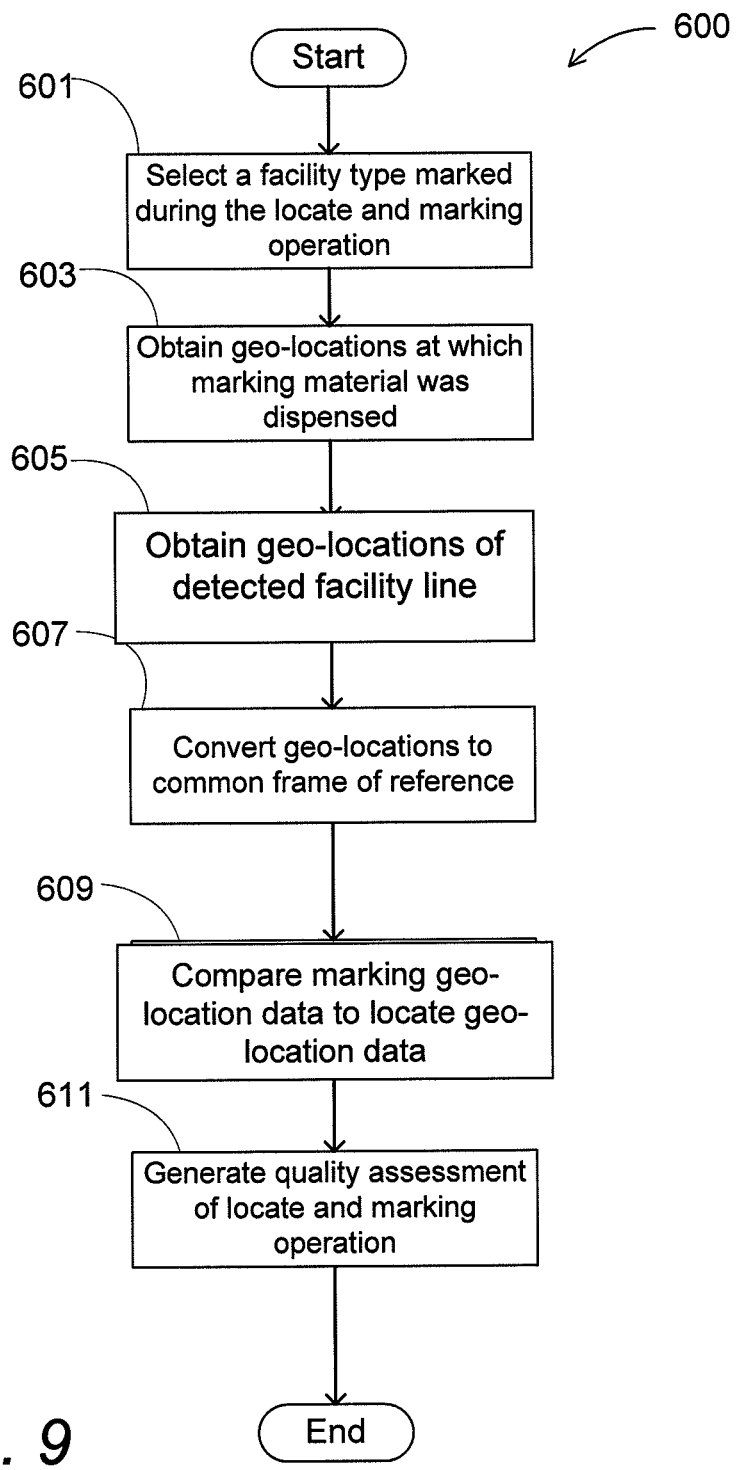
FIG. 9 illustrates a flow diagram of an exemplary method for performing a quality assessment based on a comparison of marking information and locate information, in accordance with some embodiments of the present disclosure.

FIG. 9 is a flow chart of an exemplary process 600 for performing the act 1312 of the process 1300 shown in FIG. 8, according to one embodiment, and illustrates one technique that may be used to perform an assessment based on a comparison of marking information and locate information. In the exemplary method outlined in FIG. 9, the reference data is constituted by locate geo-location data. In one aspect, the locate geo-location data may be from a corresponding locate operation conducted at essentially the same time at the same work site/dig area by the same technician. Alternatively, in another aspect the locate geo-location data may be historical locate receiver data relating to the same work site/dig area. Although the method of FIG. 9 presumes that locate information serves as the reference information, it should be appreciated that in other exemplary methods, marking information may serve as the reference information to which locate information is compared; i.e., locate geo-location data generated pursuant to a locate operation (e.g., locate receiver data) may be compared to reference data constituted by marking geo-location data (e.g., from a corresponding marking operation or historical marking data). It should also be appreciated that the geographic information on which comparisons are based may be obtained, for example, from one or more of locating equipment data (e.g., various types of electronic records given in Tables 1-6 above), an EM application or EM image, historical tickets, and/or other sources of geographic information relating to the locate and/or marking operation.

At act 601 of the process 600, a particular facility type that has been marked during a marking operation may be selected for comparison to locate information corresponding to a same facility type at the same work site/dig area. For example, if it is determined (e.g., from available electronic records of a marking operation) that a locate technician has marked electric lines, gas lines, and sewer lines during the marking operation, one of these facility types may be selected initially for comparison to corresponding locate information. It should be understood that the process 600 may be repeated to perform one or more additional comparisons for one or more of the other facility types; for example, if electric lines are the facility type that is selected at act 601, process 600 may be performed again (e.g., subsequently or in parallel) to select one of the other facility types that has been marked.

In one aspect of this embodiment, as part of act 601, all of the different facility types marked and represented in the available electronic record of the marking operation are first determined from data in the electronic record indicating the color(s) of marking material used during the marking operation. As explained above in connection with Table 3, each marking material color corresponds to a particular facility type. Thus, if actuation data in an electronic record of a marking operation indicates that red, yellow, and green marking material were each used during the marking operation, then it may be determined that electric lines, gas lines, and sewer lines were marked.

Once it is determined what types of a facilities were marked during the marking operation, a particular type of facility marked may be selected as the subject for assessment by comparison to corresponding locate information in any of a variety of ways. For example, in some embodiments, a type of facility for which such a comparison has not yet been performed may be selected. In situations where there are multiple facility types for which the comparison has not yet been performed, the facility type may be selected via user input pursuant to a selection query, may be selected based on a risk assessment associated with each facility type, or alternatively may be selected randomly or based on some other factor (e.g., the time at which the facility was marked relative to the other facilities, the number or length of locate marks used to mark the facility).

Once a particular facility type is selected at act 601, the process continues to act 603, where particular marking information regarding the locate marks for the selected facility type is extracted as necessary from the available electronic record to provide the marking geo-location data for comparison to corresponding locate information. For example, if the selected facility type is electric lines, then the actuation data sets of an electronic record generated by the marking device (e.g., of the type shown in Table 2 above) indicating that red marking material was dispensed during the locate and/or marking operation may be used to provide the marking geo-location data.

More specifically, as a result of act 603, a set of marking geo-location data points (e.g., coordinate pairs of GPS latitude and longitude values) are identified that are indicative of geographical locations at which marking material of the color of the selected facility type was dispensed. For example, as shown in Table 2, an actuation data set for a marking device actuation includes a set of geo-location data points at which the marking device was actuated (and dispensed marking material). In the example of Table 2, the geo-location data set for act-1 includes the data points 2650.9348N,08003.5057W, 2650.9353N,08003.5055W, and 2650.9356N,08003.5055W. At act 603, any one or more of these points (along with the other geo-location data points at which the marking device was actuated using the same color) may be selected to be included in the marking geo-location data. In one example, all geo-location data points from the marking device actuation data sets for the selected facility type (i.e., all geo-location data from all actuation data sets indicating the marker color corresponding to the selected facility type) are selected to be in the set of marking geo-location data points that is compared to locate geo-location data. However, the invention is not limited in this respect, as in some embodiments, only a subset of the marking geo-location data points may be selected for comparison.

For example, in some embodiments, geo-location data points at which marking material was dispensed as part of a dotting pattern may be disregarded and not included in the marking geo-location data, while geo-location data points dispensed as part of a lines pattern may be included in the marking geo-location data. As known in the relevant art, there are multiple types of marking patterns that may be used in a marking operation. For example, a "dotting" pattern may be utilized to quickly mark the location of the target facility. Often the dotting pattern is used in conjunction with the initial locate operation to detect the target facility. A "lines" pattern is typically the end product of the marking operation. This pattern extends the dotting pattern in order to create locate marks in the form of dashed lines that indicate the presence or absence of an underground facility.

Because the locate marks for the dotting pattern are initial marks that may be "revised" by the marks from the lines pattern, in some embodiments it may be desirable to exclude the geo-location points of marks from the dotting pattern from the marking geo-location data used for comparison to locate geo-location data. To this end, geo-location points of marks from a dotting pattern may be identified and distinguished from geo-location points of marks from a lines pattern in a variety of ways. An example of one such way is described below, though a variety other techniques could be used.

In some embodiments, geo-location points from a marking device actuation data set corresponding to a dotting pattern may be distinguished from geo-location points corresponding to a lines pattern based on information in the actuation data set for the marking device actuation that identifies the duration of the actuation (see Table 2). If the duration of the marking device actuation is less than a threshold amount of time, the actuation may be considered to correspond to a dotting pattern, and the geo-location points from this actuation data set may be excluded from the marking geo-location data used for comparison to locate geo-location data. If, on the other hand, the duration is equal to or greater than the threshold, the actuation may be considered to correspond to a lines pattern, and the geo-location points from this actuation data set may be included in the set of marking geo-location data points to be compared to the locate geo-location data.

After act 603, process 600 continues to act 605, where one or more electronic records of locate operations in the same work site/dig area and corresponding to the selected type of facility are accessed, and locate geo-location data is extracted from the one or more electronic records for comparison with the marking geo-location data. Accordingly, as a result of act 605, a set of "locate geo-location data points" indicating the detected physical location of a facility line of the type of the selected facility is obtained for comparison to the set of marking geo-location data points obtained in act 603.

One or more appropriate electronic records of locate operations (either "current" or "historical") from which locate geo-location data is extracted may be selected in a variety of ways, as the invention is not limited in this respect. For example, with reference again to the discussion above in connection with Tables 1-6, exemplary electronic records of locate operations generally include information that may be searched based on a variety of criteria for some type of correspondence to the marking geo-location data (e.g., electronic records of locate operations generally include type(s) of facilities detected to which geo-location data in the record(s) corresponds, various service information such as user ID, device ID, and/or ticket information such as an address, description, and/or other indicia of the work site/dig area, including geographic coordinates for the dig area, etc., any of which may be searched to determine appropriate correspondence to the marking geo-location data).

In some implementations, electronic records of locate operations and corresponding marking operations performed pursuant to the same locate request ticket may include one or more identifiers that link the respective records of locate and marking operations (e.g., related file identifiers, user IDs, device IDs, etc.) to facilitate ready identification of marking geo-location data and locate geo-location data for comparison. For situations in which a combined locate and marking device is employed for performance of a locate and marking operation, locate geo-location data and marking geo-location data already may be organized, coded and/or tagged as related records, or form part of the same electronic record.

In other exemplary implementations, geo-location coordinates of a point that constitutes the centroid of the set of marking geo-location data points obtained in act 603 may be determined, and an appropriate set of locate geo-location data points may be selected that corresponds to the selected facility type and includes the geo-location coordinates corresponding to this centroid. In yet other implementations in which a VWL image provided by an excavator is available (e.g., as part of a locate request ticket), the geo-locations for the boundary of the dig area in which work is planned (e.g., latitude and longitude coordinates for the dig area indicator in the VWL image that denotes/delimits the dig area) may be determined from the VWL image and/or included in the locate request ticket. Accordingly, an appropriate set of locate geo-location data points may be selected that corresponds to the selected facility type and is within the area delimited by the geo-locations for the dig area boundary.

After act 605, the process next continues to act 607, in which it is determined if any conversion is required of either or both of the set of marking geo-location data points obtained at act 603 and the set of locate geo-location data points obtained at act 605 and, if so, conversion to a common reference frame (e.g., a common coordinate system) is performed.

As known in the relevant art, a geographic or "global" coordinate system (i.e., a coordinate system in which geographic locations on Earth are identified by a latitude and a longitude value, e.g., (LAT,LON)) may be used to identify geographic locations of locate marks and detected facilities. In a "geocentric" global coordinate system (i.e., a coordinate system in which the Earth is modeled as a sphere), latitude is defined as the angle from a point on the surface of a sphere to the equatorial plane of the sphere, whereas longitude is defined as the angle east or west of a reference meridian between two geographical poles of the sphere to another meridian that passes through an arbitrary point on the surface of the sphere. Thus, in a geocentric coordinate system, the center of the Earth serves as a reference point that is the origin of the coordinate system. However, in actuality the Earth is not perfectly spherical, as it is compressed towards the center at the poles. Consequently, using a geocentric coordinate system can result in inaccuracies.

In view of the foregoing, the Earth is typically modeled as an ellipsoid for purposes of establishing a global coordinate system. The shape of the ellipsoid that is used to model the Earth and the way that the ellipsoid is fitted to the geoid of the Earth is called a "geodetic datum." In a "geodetic" global coordinate system, the latitude of a point on the surface of the ellipsoid is defined as the angle from the equatorial plane to a line normal to the reference ellipsoid passing through the point, whereas the longitude of a point is defined as the angle between a reference plane perpendicular to the equatorial plane and a plane perpendicular to the equatorial plane that passes through the point. Thus, geodetic latitude and longitude of a particular point depends on the geodetic datum used.

A number of different geodetic global coordinate systems exist that use different geodetic datums, examples of which include WGS84, NAD83, NAD27, OS GB36, and ED50. As such, a geographic point on the surface of Earth may have a different latitude and longitude values in different coordinate systems. For example, a stop sign at the corner Maple St. and Main St. may have a latitude and longitude of $(LAT_1, LON_1)$ in the WGS84 coordinate system, but may have a latitude and longitude of $(LAT_2, LON_2)$ in the NAD83 coordinate system (where $LAT_1 \neq LAT_2$ and/or $LON_1 \neq LON_2$). Thus, when comparing one geographic point to another geographic point to determine the distance between them, it is desirable to have both geographic points in the same global coordinate system.

Additionally, it should be appreciated that geo-location data included in electronic records may in some instances be referenced to a map-based or "projected" coordinate system. As appreciated in the relevant art, representing the curved surface of the Earth on a flat surface or plane is known as a "map projection." Representing a curved surface in two dimensions causes distortion in shape, area, distance, and/or direction. Different map projections cause different types of distortions. For example, a projection could maintain the area of a feature but alter its shape. A map projection defines a relation between spherical coordinates on the globe (i.e., longitude and latitude in a global coordinate system) and flat planar x,y coordinates (i.e., a horizontal and vertical distance from a point of origin) in a projected coordinate system.

Thus, comparisons of a first geographic location expressed in x,y coordinates to a second geographic location expressed as LAT,LON coordinates in some geodetic global coordinate system also need to be considered in connection with act 607 or the process 600. In such a situation, it is desirable to have respective coordinate pairs for the first location and the second location either in the same geodetic global coordinate system or projected coordinate system (projected from the same geodetic geographical coordinate system). As such, at act 607 of the process 600, if the set of marking geo-location data points and the set of locate geo-location data points are in different coordinate systems, one or both of these sets of geo-location data points may be converted (e.g., transformed) so that they are in a common frame of reference (e.g., the same global coordinate system or the same projected coordinate system projected from the same global coordinate system).

For example, in some embodiments, one of the sets of geo-location data points may be geo-locations in the WGS84 coordinate system (i.e., the coordinate system typically used by GPS equipment), whereas the other of the sets of geo-location data points may be stored with reference to the NAD83 coordinate system. Thus, at act 607, the coordinates from the respective data sets may be put in a common frame of reference; for example, the NAD83 coordinates may be converted to the WGS84 coordinate system, the WGS84 coordinates may be converted to the NAD83 coordinate system, or the coordinates from the respective sets may both be converted to a third common coordinate system.

Process 600 then continues to act 609, where the set of marking geo-location data points are compared to the set of locate geo-location data points in the common reference frame to assess the quality of the locate and/or marking operation. A variety of different techniques may be used to compare the two sets of geo-location data points, examples of which are provided below. However, the invention is not limited to using the particular technique described in connection with FIG. 9, as various embodiments may use different techniques.

In some embodiments, an overall shape of a detected facility line as indicated by the locate geo-location data may be qualitatively compared (e.g., by visual inspection, as discussed below in Section VI) to an overall shape of a line constituted by respective locate marks dispensed during the locate and/or marking operation as represented by the marking geo-location data, irrespective of their relative geo-locations, such that quality is assessed based on how close these shapes are to each other.

In other embodiments, the set of marking geo-location data points may be compared to the set of locate geo-location data points to determine geographic distance between them. FIG. 10 shows an illustrative process 1400 for determining distance between points in two sets, X and Y, of geo-location data points, that may be performed in the act 609 of process 600. Each of these sets may include a plurality of geo-location data points (e.g., latitude and longitude values or x,y coordinate pairs), and the geo-location data points in set X typically are in the same reference frame (e.g., coordinate system) as the geo-location data points in set Y. In embodiments in which the process 1400 is used to compare a set of marking geo-location data points to a set of locate geo-location data points, set X may include the marking points and set Y may include the locate points; however, it should be appreciated that this assignment is provided primarily for purposes of illustration. Process 1400 defines the distance between the two sets X and Y as a vector d of distances $d_0 \ldots d_n$ (i.e., $d=[d_0 \ldots d_n]$), where each distance $d_i$ indicates the distance between a point $x_i$ in set X and the point $y_c$ in set Y that is closest to $x_i$. Accordingly, it should be appreciated that the vector d is indexed to the set X, and thus there is one element in the vector d for every data point in the set X.

Referring to FIG. 10, the illustrative process 1400 begins at act 1402 by initializing a variable n to zero, where n serves as an index for the points in the set X. The process 1400 continues to act 1404, where a point $x_n$ in the set X is selected. The process 1400 next continues to act 1406, where a point in set Y that is closest to the point $x_n$ is identified and is stored in a variable $y_c$. That is, among all the points in the set Y, the selected point $y_c$ has the smallest distance from the point $x_n$. The process 1400 then continues to act 1408, where a distance between $x_n$ and $y_c$ is recorded and stored in the variable $d_n$. The process next continues to act 1410, where it is determined whether there are any more points in the set X to process. When it is determined that the set X contains one or more points yet to be processed, the process 1400 continues to act 1412, where the value of n is incremented by one. The process then returns to act 1404 to select a next point in the set X. If, on the other hand, it is determined at act 1410 that there are no more points in the set X to process, the process 1400 ends.

It should be appreciated that each of the sets X and Y may include any number of points, as the present disclosure is not limited in this respect. For example, in some embodiments, one or both of the sets may have only one geo-location point specifying a single point on Earth. In other embodiments, one or both sets may have multiple geo-location points specifying multiple points on Earth.

Additionally, the process 1400 may be applied to determine a measure of distance between any two sets of points in any space in which a measure of distance can be defined between two points. Thus, the application of the process 1400 is not limited to geo-location data expressed in an absolute frame of reference that ties the geo-location data to specific points on Earth. For example, in some embodiments, the geo-location points in set X and Y may not be expressed in latitude and longitude. Rather they may be expressed as locations (e.g., distance and/or direction) relative to some other reference point (e.g., an arbitrary reference point, a reference point defined by one or more facilities maps, and/or a reference point defined by some environmental landmark, a reference point defined by one or more physical markers placed at the work site such as property boundary markers). In some further embodiments, the process 1400 may even be applied to determine a measure of distance between two sets of points expressed in terms of display coordinates for some field of display (e.g., a computer screen).

The process 1400 is also not limited to any particular technique for determining the distance between two points, as any of numerous techniques may be used. For example, in an embodiment where the geo-location data is expressed in latitudinal and longitudinal coordinates, a distance between two points may be calculated according to the great-circle distance in spherical geometry, using Vincenty's inverse method for computing geographical distance between two points, and/or using some other suitable method. In some embodiments in which the coordinates for the two points are each two-dimensional Cartesian coordinates in a common grid system, the straight line distance between these two points may be determined using the following formula: $d=\sqrt{(x_2-x_1)^2+(y_2-y_i)^2}$. In some implementations, a geographical center of a marking may be determined and compared against a geographical center of a located facility.

In alternative embodiments based on the process 1400 shown in FIG. 10, one or both of the data sets X and Y may be processed in some manner to filter (e.g., remove, interpolate, extrapolate, smooth, curve fit) all or some portion of the data. For example, either of the data sets may include some geo-location data points that are less accurate and/or less reliable than other points in the set, and/or constitute random or spurious data points (noise) in the set. In this manner, some portion of the data set viewed as a whole may resemble a random distribution of points, and/or there may be larger gaps between some groups of points than other groups of points. In some instances, some locate geo-location data points may be less reliable than others due to variations in received signal strength at particular gain and/or frequency settings. Additionally, rapid and/or disjointed movements of a marking device and/or locate device by a technician may result in local fluctuations of the geo-location data points that are inconsistent with the overall pattern of detection and/or marking. In sum, for any of a variety of reasons, it may be desirable to process a given data set in some manner to improve one or more characteristics of the data set to facilitate a more meaningful comparison with one or more other data sets.

To this end, in one embodiment relating particularly to the filtering of a locate geo-location data set, a "confidence rating" may be attributed to one or more data points of the locate geo-location data set based, for example, on a reliability of the data, and one or more points of the data set may be removed based on a confidence rating that falls below some predetermined threshold. In various aspects, attributes such as gain setting, frequency setting, and signal strength (e.g., peak amplitude, null amplitude) at the time of acquiring a given locate geo-location data point may be considered, respectively or in various combinations, in deriving a confidence rating for that data point. In general, the reliability of a data point may be lower for higher gain settings (e.g., gain above 60-70% full scale, for which spurious signals may be registered that do not actually correspond to a presence of an underground facility) and/or for higher frequency settings (at which there is a higher likelihood that the locate receiver may "hop lines," i.e., detect other nearby underground facilities but not necessarily the closest one to the locate receiver), and/or for peak/null amplitudes that are inconsistent and/or below some predetermined percentage of full scale value.

A confidence rating may be determined on any of a variety of scales (e.g., 0 to 100%, with 100% representing greatest reliability; 0-10, with 10 representing greatest reliability, etc.), based on any of a variety of criteria (e.g., any signal received at a gain setting of 75% full scale is assigned a confidence rating of 50%; signals received with a peak amplitude of 75% full scale at a gain setting of 50% full scale or less are assigned a confidence rating of 80%; etc.). Furthermore, various "confidence threshold values" for confidence ratings may be established as a basis for comparison for the confidence ratings; for example, a confidence threshold value may be established, and data points having a confidence rating below the confidence threshold value may be removed from the locate geo-location data set (e.g., set a confidence threshold value at 30%, such that all points with a confidence rating of 30% or below may removed from the data set).

In other exemplary implementations, in addition to or as an alternative to filtering of locate geo-location data based on a confidence rating, curve fitting may be employed to process a data set, in which a mathematical function (e.g., a polynomial function) is constructed to best fit the geo-location data points in the set. Curve fitting may involve interpolation, in which essentially an exact fit to the data is desired, or "smoothing," in which an approximating function is constructed that attempts to capture important patterns in the data, while leaving out noise or other fine-scale structures. Various known algorithms may be employed for data smoothing, one common example of which includes the "moving average" algorithm. Other examples of curve fitting may employ a "spline," which is a special function defined piecewise by polynomials (i.e., a piecewise polynomial parametric curve). Cubic splines are also referred to in the relevant arts as "Bezier curves." A generalized class of splines is referred to in the relevant arts as "non-uniform rational basis splines" (NURBS), which offer great flexibility for handling both analytic and freeform shapes. Fitted curves can be used not only to render data sets more uniform, but also to infer values between discrete points of a data set. Extrapolation refers to the use of a fitted curve beyond the range of the data in a data set.

In one exemplary embodiment in which it is presumed for purposes of illustration that the data set X includes a set of discrete coordinates representing marking geo-location data and the data set Y includes a set of discrete coordinates representing locate geo-location data, the data set Y is subjected to a filtering algorithm (e.g., performed by the processor 1803 of the system 1800 shown in FIG. 2, executing processor-executable instructions corresponding to the filtering algorithm) so as to construct a best fit function or a smoothing function (e.g., employing various types of splines) representing the data set Y (as discussed above, the data set Y representing locate geo-location data may or may not have been "pre-filtered" based on a confidence rating or reliability factor associated with respective data points in the set). In one aspect of this embodiment, the best fit function or the smoothing function is then sampled to form a new data set Y' of discrete data points. The sampling may be performed at any of a variety of sampling rates/intervals to render the new data set Y'. In one example, the sampling rate may be based on the number of discrete data points in the data set X, such that there is essentially (or approximately) a one-to-one correspondence between points in the data set X and points in the data set Y'; in other examples, however, significantly higher sampling rates may be employed such that the number of points in the data set Y' exceeds the number of points in the data set X. The data set Y' may then be employed in place of the data set Y in act 1406 of the process 1400 as outlined in FIG. 10. As such, the resulting distance values $d_0 \ldots d_n$ constituting the vector d may represent respective distances between each of the marking geo-location data points and a discrete version of the best fit function or the smoothing function for the set of locate geo-location data points.

In another aspect of this embodiment, the vector d of distance values $d_0 \ldots d_n$ may be calculated as an alternative to acts 1406 and 1408 of FIG. 10 by using the best fit function or the smoothing function itself as a reference for comparison with the discrete marking geo-location data points of the set X. More specifically, various techniques are known for computing the minimum distance between a point and a fitted curve (e.g., see "Computing the Minimum Distance Between a Point and a NURBS Curb," Xiao-Diao Chen et al., Computer-Aided Design, Vol. 40, Issue 10-11, October 2008, pages 1051-1054; "Finding the Minimum Distance Between a Point and a Cubic Spline," Don Lancaster, Synergetics, Thatcher, Ariz., 2007, http://www.tinaja.com/glib/cmindist-.pdf; Andersson, F., "Bézier and B-spline technology," Frederik Andersson, Master's thesis, Department of Computing Science, UMEA University (Sweden), Jun. 11, 2003; each of the three foregoing publications is incorporated herein by reference in its entirety). Any of various known techniques may be employed to compare the respective points in the set X to the best fit function or the smoothing function. Accordingly, the resulting distance values $d_0 \ldots d_n$ constituting the vector d may represent respective minimum distances between each of the marking geo-location data points and the best fit function or the smoothing function itself for the set of locate geo-location data points.

While in the example above filtering was applied to the set Y of locate geo-location data points, it should be appreciated that a similar filtering process may be applied to either or both of the marking geo-location data points and the locate geo-location data points for purposes of comparing marking information with locate information, and that either of filtered marking geo-location data or filtered locate geo-location data may serve as a basis of comparison with the other (whether filtered or unfiltered).

Referring back to FIG. 9, after the comparison in act 609, the process continues to act 611, where a quality assessment of the locate and/or marking operation that is based, at least in part, on the comparison in act 609 is generated. The quality assessment may be generated in any of a variety of ways, including, for example, in the manner discussed above in connection with act 1312 of FIG. 8. Several examples of techniques for generating a quality assessment are described below. However, the invention is not limited to any particular technique for generating a quality assessment.

In embodiments in which the process illustrated in FIG. 10 is used to perform the comparison in act 609, in some exemplary implementations the quality assessment may be based on the percentage of points in the distance vector d that are below (or above) some threshold value. For example, in one implementation, the quality assessment may be based on the percentage of locate marks that are within a threshold distance of any point in the locate geo-location data set, or within a threshold distance of a discrete or continuous best fit function or smoothing function representing the locate geo-location data set.

Table 7 below shows one possible technique for generating a quality assessment of a marking operation via comparison to locate information (or vice versa) using a scoring table. Techniques for generating a scoring table and computing a score using a scoring table are described in greater detail in U.S. Non-provisional patent application Ser. No. 12/493,109, filed Jun. 26, 2009, entitled "Methods and Apparatus for Quality Assessment of a Field Service Operation," incorporated by reference herein. While the examples below discuss assessment of a marking operation based on locate information serving as the reference information, as discussed above it should be appreciated that the reverse (assessing a locate operation based on marking information serving as the reference information) also is possible according to the concepts discussed herein. As shown in Table 7, the criterion on which the quality of marking operation is being assessed is listed in the leftmost column. For this criterion, the table includes one or more expected or reference values or ranges for the criterion, also referred to as "metrics," against which information about the marking operation is measured/compared. The metrics are divided into several "scoring categories," namely, value(s)/condition(s) that, if met, result in a particular score.

For purposes of the analysis illustrated in Table 7, marking information/data is referred to as ACTUAL DATA (ACT), and locate information/data is referred to as EXPECT DATA (EXP). A quality assessment for the indicated criterion is based on a comparison of the ACTUAL DATA to the EXPECT DATA (e.g., so as to determine in what scoring category the ACTUAL DATA falls as a result of the comparison). For purposes of the discussion that follows, although examples based on numeric scores are provided, the term "score" as used herein is intended to more generally denote any of a variety of graduated indicators for a quality assessment (which in turn may be based on a variety of ranges, scales and resolutions/granularity for the indicators).

TABLE 7

| Criterion | Expected value or range (metrics) | | |
| --- | --- | --- | --- |
|  | Preferred | Marginal | Unacceptable |
| EXP: Percentage of points in distance vector within threshold distance | 75% or more of points are within 1 foot. | Less than 75% of points are within 1 foot, but 50% or more of points are within 2 feet. | 50% or more of points are outside 2 foot. |
| ACT: Percentage of points in distance vector within threshold distance | 90% of points are within 1 foot. |  |  |

In the example of Table 7, the criterion on which the quality of the marking operation is being assessed is the percentage of points at which locate marks were placed that are within some threshold distance of the closest corresponding point in the locate geo-location data, or within some threshold distance of a discrete or continuous best fit function or smoothing function for the locate geo-location data. Additionally, in this example, there are three scoring categories: Preferred; Marginal; and Unacceptable. For each scoring category, there is a metric used to evaluate the contents of the distance vector $d=[d_0 \ldots d_n]$ resulting from the comparison of the marking data and the locate data to determine in which scoring category the results of the comparison fall. In the example of Table 7, an evaluation of the distance vector shows that 90% of the points at which locate marks were placed were within one foot of the corresponding closest point in the locate data (or the discrete or continuous best fit function or smoothing function for the locate geo-location data). As such, the marking operation falls into the preferred category.

Figure 11:
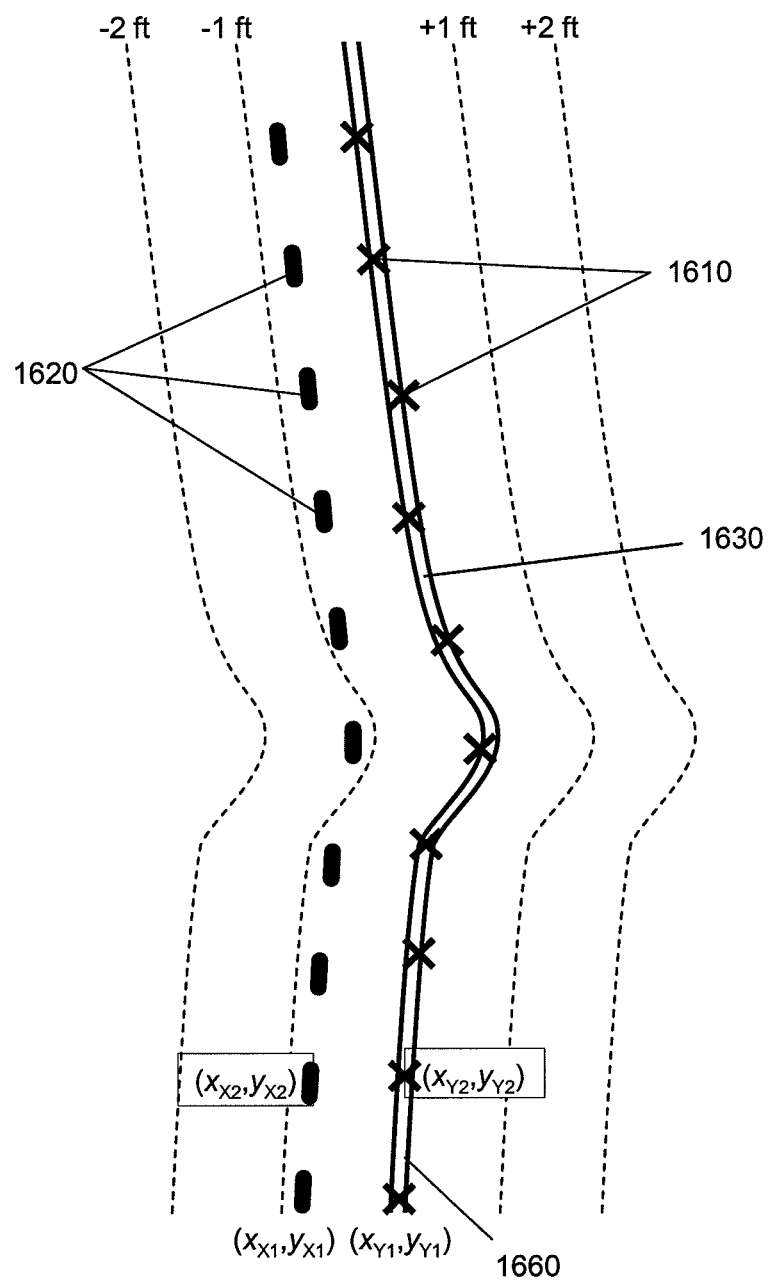
FIG. 11 illustrates exemplary sets of geographical data points for comparison respectively corresponding to a locate operation and an associated marking operation, in accordance with some embodiments of the present invention.

The data of Table 7 may correspond, as an example, to a marking operation as depicted in FIG. 11. In FIG. 11, the set "X" of points is denoted with the reference numeral 1620 and includes marking geo-location data points (provided, for purposes of illustration, as x,y coordinates) and the set "Y" of points is denoted with the reference numeral 1610 and includes locate geo-location data points (also provided as x,y coordinates) representing detected locations of an underground facility 1660. Additionally, the line 1630 represents an example of a best fit function for the locate geo-location data points. As can be seen in FIG. 11, 90% of the points in the set 1620 lie within 1 foot of the detected facility, as represented in Table 7.

With reference again to act 611 of FIG. 9, in some embodiments a score, grade, or categorization may be assigned as an output to categorize the quality assessment process based on into which scoring category the assessment falls. For example, in some embodiments, each scoring category may be associated with a number of points (e.g., 2 points for Preferred, 1 point for Marginal, and 0 points for Unacceptable), and the quality assessment may be awarded the number of points associated with the scoring category into which it falls. Thus, for example, in the example of Table 7, 2 points may be awarded, because the operation falls in the "Preferred" scoring category.

In some embodiments, the number of points awarded may be converted to a percent score that is based on the number of points awarded and a maximum possible number of points. Thus, for example, in the example of Table 7, the marking operation received two points out of a maximum possible two points. As such, the marking operation may be assigned a score of 2/2 or 100%. If the assessment results were to fall in the "Marginal" category and receive only one point, then the marking operation may be assigned a score of 1/2 or 50%. Similarly, if the assessment results were to fall in the unacceptable category and receive zero points, then it may be assigned a score of 0/2 or 0%.

In some embodiments, a range of percent scores may be converted to letter scores to provide an indication of quality. For example, a percent score of 100-90% may be converted to a letter score of A, 89-80% may be converted to a letter score of B, 79-70% may be converted to a letter score of C, 69-60% may be converted to a letter score of D, and <60% may be converted to a letter score of F. In yet another example, a range of percent scores may be converted to a simple PASS/FAIL score. For example, a percent score of 100-60% may be converted to a score of PASS and a percent score of <60% may be converted to a score of FAIL.

In some embodiments, the quality assessment illustrated in Table 7 may be used in the process of FIG. 8 or 9 to categorize a marking operation as either "Approved," "Coach" or "QC Referral. For example, data analysis as depicted in Table 7 may be used to assess the quality of the marking operation. Based on this assessment, the quality of the marking operation may be categorized, for example at act 1314 of FIG. 8. For example, if the operation falls in the "Preferred" scoring category in Table 7 it may be categorized as "Approved"; if the operation falls in the "Marginal" scoring category, it may be categorized as "Coach;" and if the operation falls in the "Unacceptable" scoring category it may be categorized as "QC Referral."

In the example of Table 7, three scoring categories are used, such that the marking operation is classified as either Preferred, Marginal, and Unacceptable. However, the number of scoring categories is merely illustrative, as any number of scoring categories could be used, and various mutually exclusive metrics may be assigned to these scoring categories. For example, in some embodiments, five scoring categories may be used (e.g., Excellent, Good, Average, Poor, Unacceptable), while in other embodiments more than five scoring categories may be used.

In addition, it should be appreciated that the percentage values and distance threshold values used in the metrics in Table 7 (and in Tables 8 and 9 described below) are merely illustrative and that a variety of different percentage values and distance threshold values may be used. In some embodiments, the distance threshold values may be based on legal requirements pertaining to locate and/or marking operations. For example, some governments (e.g., state governments) may dictate that a locate mark placed on the ground is within a certain "tolerance zone" around the underground facility (e.g., 12 inches, 18 inches, 24 inches, 30 inches, 36 inches, etc.). Thus, in some embodiments, one or more of the metrics used in a scoring table may be based on a tolerance zone dictated by government regulations.

In the example provided by Table 7, a single criterion is provided for all of the facility lines marked. However, in some embodiments, a separate criterion may be used for each facility line marked. For example, as shown in Table 8 below, if during a marking operation, a gas line, a power line, and a water line were marked, then a separate criterion may be provided for each of these facility lines. This enables the accuracy of each facility line that was marked during the locate and/or marking operation to be assessed independently of the other facility lines.

As discussed above, in some embodiments, each scoring category may be associated with a number of points (e.g., 2 points for Preferred, 1 point for Marginal, and 0 points for Unacceptable), and the quality assessment may be awarded the number of points associated with the scoring category into which it falls. Thus, for example, in the example of Table 8, 2 points may be awarded for marking of the gas line(s), 1 point may be awarded for the marking of the electric line(s), and 0 points may be awarded for the marking of the water line(s). Thus, the operation may receive a score of three points out of a maximum possible total of six points, for a score of 3/6 or 50%.

In the example provided by Table 7 for generating a quality assessment of the marking operation, the sole criterion for assessing quality may be based on a comparison of the marking geo-location data representative of marks placed during a locate and/or marking operation and the locate geo-location data representative of one or more facilities detected during one or more current or historical locate operations. However, the invention is not limited in this respect, as in some embodiments, this criterion may be one of a number of criteria that is used at act 611 of FIG. 9 to generate/update a quality assessment. There are variety of techniques by which this criterion may be used in combination with other criteria to generate a quality assessment, one example of which is provided below. However, the invention is not limited to using the particular technique described below or any other particular technique.

TABLE 8

| | Expected value or range (metrics) | | |
|---|---|---|---|
| Criterion | Preferred | Marginal | Unacceptable |
| EXP: Type = Gas; Percentage of points within threshold distance of any facility line point (as indicated in historical reference data) | 95% or more of points are within 1 foot. | Less than 95% of points are within 1 foot, but 50% or more of points are within 2 feet. | 50% or more of points are outside 2 feet. |
| ACT: Type = Gas; Percentage of | 98% of points are | | |

TABLE 8-continued

| Criterion | Expected value or range (metrics) | | |
|---|---|---|---|
| | Preferred | Marginal | Unacceptable |
| points within threshold distance of any facility line point (as indicated in historical reference data) | within 1 foot. | | |
| EXP: Type = Electric; Percentage of points within threshold distance of any facility line point (as indicated in historical reference data) | 95% or more of points are within 1 foot. | Less than 95% of points are within 1 foot, but 50% or more of points are within 2 feet. | 50% or more of points are outside 2 feet. |
| ACT: Type = Electric; Percentage of points within threshold distance of any facility line point (as indicated in historical reference data) | | 10% of points are outside of 1 foot, but 75% of points are within 2 feet. | |
| EXP: Type = Water; Percentage of points within threshold distance of any facility line point (as indicated in historical reference data) | 95% or more of points are within 1 foot. | Less than 95% of points are within 1 foot, but 50% or more of points are within 2 feet. | 50% or more of points are outside 2 feet. |
| ACT: Type = Water; Percentage of points within threshold distance of any facility line point (as indicated in historical reference data) | | | 80% of points are outside 1 foot. |

In some embodiments, a scoring table, similar to Table 7 may be used to assess the quality of a locate and/or marking operation based on a plurality of different criteria. An example of such a scoring table is shown below in Table 9. Table 9 is similar to Table 7, except that instead of a single criterion in the left-most column, there are multiple criteria. In addition, in Table 9, each criterion may be assigned a weight factor, such that some criteria (e.g., criteria that are deemed more important) may optionally be given greater weight than others in the quality assessment. As with Table 7, for each criterion in Table 9, actual data (field data) obtained from the locate and/or marking operation being evaluated may be compared with expected data (reference data) values or ranges for that criterion, and a number of points may be awarded based on the scoring category into which the locate and/or marking operation falls for that criterion and a weight factor assigned to that scoring category. For example, if the weight factor for a particular criterion is 5 and the marking operation falls into the "Preferred" category for that criterion, then 10 points (i.e. 2×5) would be awarded for that criterion based on the example given above in connection with Table 7.

TABLE 9

| Criterion | Expected value or range | | | Weight Factor | Weighted Score |
|---|---|---|---|---|---|
| | Preferred (score = 2) | Marginal (score = 1) | Unacceptable (score = 0) | | |
| EXP: Percentage of points in distance vector within threshold distance | 75% or more of points are within 5 feet. | Less than 75% of points are within 5 feet, but 50% or more of points are within 10 feet. | 50% or more of points are outside 10 feet. | — | — |
| ACT: Percentage of points in distance vector within threshold distance | 90% of points are within 5 feet. | | | ×1 | 2 |
| EXP: Dig area geo-location | N35° 43.57518, W078° 49.78314 ≤0.2 miles | N35° 43.57518, W078° 49.78314 >0.2 to ≤0.5 miles | N35° 43.57518, W078° 49.78314 >0.5 miles | — | — |
| ACT: Geo-location data | N35° 43.57518, W078° 49.78314 ±0.04 mi | | | P/F | P |
| EXP: Locate Date | Before 05FEB09 | On 05FEB09 | After 05FEB09 | — | — |
| ACT: Timestamp data | 04FEB09; 09:35:15.2 | | | ×2 | 4 |
| EXP: Elapsed time | 40 mins | 40 mins ± 10-20 mins | 40 mins ± >20 mins | — | — |

TABLE 9-continued

| Criterion | Preferred (score = 2) | Marginal (score = 1) | Unacceptable (score = 0) | Weight Factor | Weighted Score |
|---|---|---|---|---|---|
| ACT: Timestamp data | | 54 mins | | ×2 | 2 |
| EXP: Type = Electric power | RED color data present | n/a | RED color data absent | — | — |
| ACT: Color data | RED present | | | ×5 | 10 |
| EXP: Geo-location | N35° 43.57518, W078° 49.78314 ±0 to 0.1 mi | N35° 43.57518, W078° 49.78314 ±>0.1 to <0.2 mi | N35° 43.57518, W078° 49.78314 ±>0.2 mi | — | — |
| ACT: Geo-location data | N35° 43.57518, W078° 49.78314 ±0.04 mi | | | ×2 | 4 |
| EXP: Gain | 0-45 | >45-70 | >70-100 | | |
| ACT: Gain | 35 | | | ×1 | 2 |
| EXP: Sig. strength | 100-85% | <85-65% | <65% | — | — |
| ACT: Signal data | | 83% | | ×1 | 1 |
| EXP: Type = Gas, oil | YELLOW color data absent | n/a | YELLOW color data present | — | — |
| ACT: Color data | YELLOW absent | | | ×5 | 10 |
| EXP: Type = Com, CATV | ORANGE color data absent | n/a | ORANGE color data present | — | — |
| ACT: Color data | ORANGE absent | | | ×5 | 10 |
| EXP: Type = Water | BLUE color data present | n/a | BLUE color data absent | — | — |
| ACT: Color data | BLUE present | | | ×5 | 10 |
| EXP: Geo-location | N35° 43.57518, W078° 49.78314 ±0 to 0.1 mi | N35° 43.57518, W078° 49.78314 ±>0.1 to <0.2 mi | N35° 43.57518, W078° 49.78314 ±>0.2 mi | — | — |
| ACT: Geo-location data | | N35° 43.57518, W078° 49.78314 ±0.14 mi | | ×2 | 2 |
| EXP: Gain | 0-45 | >45-70 | >70-100 | | |
| ACT: Gain | 35 | | | ×1 | 2 |
| EXP: Sig. strength | 100-85% | <85-65% | <65% | — | — |
| ACT: Signal data | 87% | | | ×1 | 2 |
| EXP: Type = Sewer | GREEN color data absent | n/a | GREEN color data present | — | — |
| ACT: Color data | GREEN absent | | | ×5 | 10 |
| EXP: Type = Irrigation | PURPLE color data absent | n/a | PURPLE color data present | — | — |
| ACT: Color data | PURPLE absent | | | ×5 | 10 |
| EXP: Locate technician ID | Lookup table | n/a | Not found | | |
| ACT: Locate technician ID | 4815 | | | P/F | P |
| EXP: Marking Device ID | Lookup table | n/a | Not found | | |
| ACT: Marking Device ID | 7362 | | | P/F | P |
| EXP: Locate Device ID | Lookup table | n/a | Not found | | |
| ACT: Locate Device ID | 7345 | | | P/F | P |

TABLE 9-continued

| Criterion | Expected value or range | | | Weight Factor | Weighted Score |
| --- | --- | --- | --- | --- | --- |
| | Preferred (score = 2) | Marginal (score = 1) | Unacceptable (score = 0) | | |
| EXP: Temp (° F.) | 50-80 | 20-<50, >80-110 | <20, >110 | — | — |
| ACT: Temp data | 73 F | | | ×2 | 4 |
| EXP: Humidity | 0-40% | >40-90% | >90-100% | — | — |
| ACT: Humidity data | | 52% | | ×2 | 2 |
| EXP: Light | 4.0 to 5.0 volts | 2.0 to <4.0 volts | <2.0 volts | — | — |
| ACT: Light data | 4.3 volts | | | ×2 | 4 |
| EXP: Inclinometer | −30 to 30 degrees | <−30 to −60 degrees or >30 to 60 degrees | <−60 to −90 degrees or >60 to 90 degrees | — | — |
| ACT: Inclinometer data | −17 | | | ×1 | 2 |
| EXP: Accelerometer data | 0.2 g to 1.0 g | >1.0 g to 1.5 g | >1.5 g | — | — |
| ACT: | 0.375 g | | | ×1 | 2 |
| EXP: Battery strength data | 100-85% | <85-50% | <50% | — | — |
| ACT: Battery strength data | 93% | | | ×5 | 10 |
| Total points earned out of a possible 112 = | | | | | 105 |
| Percent Score = | | | | | 93.8% |

Once the number of points awarded for each criterion has been determined, a total number of points may be computed by summing together the points awarded for each of the criteria together. The maximum number of points possible for the locate and/or marking operation may be determined by first determining the sum of all weight factors and then multiplying this sum by the point value of the "Preferred" result. A percentage score may be determined by dividing the number of points awarded by the maximum number of points possible and multiplying the result by 100.

For example and referring to Table 9, the sum of the weight factors is 56 and the point value of the "Preferred" result is 2. Therefore, in this example the maximum number of points possible for the locate operation is 56×2, which is 112. The sum of the points earned for the current locate operation, in the example of Table 9, is 105. Thus, the percent score for the current locate operation, which in this example is 105/112× 100=93.8%.

As discussed above, a range of percent scores may be converted to letter scores, so that a letter score letter score indicative of the quality of the locate and/or marking operation may be assigned. For example, a percent score of 100-90% may be converted to a letter score of A, 89-80% may be converted to a letter score of B, 79-70% may be converted to a letter score of C, 69-60% may be converted to a letter score of D, and <60% may be converted to a letter score of F. In yet another example, a range of percent scores may be converted to a simple PASS/FAIL score. For example, a percent score of 100-60% may be converted to a score of PASS and a percent score of <60% may be converted to a score of FAIL.

In other embodiments, the numerical quality assessment score may be used to automatically categorize a locate operation as either APPROVED, COACH, or QC Referral. In one example, using the numeric scoring system of 0 to 100%, a score of 60% or below may automatically render an assessment of QC Referral, in which case, for example after act 1314 of FIG. 8, the process continues to act 1322. A score of >60% to 80% may automatically render an assessment of COACH, in which case the process continues to act 1318, and a score of >80% to 100% may automatically render an assessment of APPROVED.

The example of Table 9 depicts a scoring table have a number of various different criteria. The number of criteria and the particular criteria used are merely illustrative, as any number or type of criteria may be used. Thus, the constructs provided by Tables 7-9 above illustrate various concepts germane to assessing the quality of locate and/or marking operations based at least on reference information derived from geo-location data representative of at least one facility position (e.g., geo-location data measured in a current locate and/or marking operation or measured in a prior locate and/or marking operation), which reference information may be used alone or in combination with other information that may provide for a variety of criteria by which such operations may be assessed.

VI. VISUAL REPRESENTATIONS

In some embodiments, as discussed above, any of the field information and reference information available to the assessment process from any of a variety of sources (e.g., marking information including marking geo-location data, and locate information including locate geo-location data) may be visually rendered in a display field (e.g., of a display coupled to the system 1800 shown in FIG. 2) to provide a visual aid in connection with an assessment process. A visual representation may appear, at least in part, as depicted in FIG. 11. In some exemplary implementations, electronic visual renderings may be provided by an EM (electronic manifest) application, as discussed above. According to one aspect of this embodiment, it is particularly instructive as a visual aid to "overlay" some or all of the contents of the field information with that of the reference information in the display field, so as to provide a visual comparison of the information (e.g., as a supplement to the automated/electronic comparison of various elements of the available field and reference information). To aid in such a comparison, different facility types may be indicated in the display field, for example, by employing different colors or line types, and different environmental landmarks may be indicated in the display field, for example, by employing different colors, shapes, patterns, icons, etc.

Figure 12:
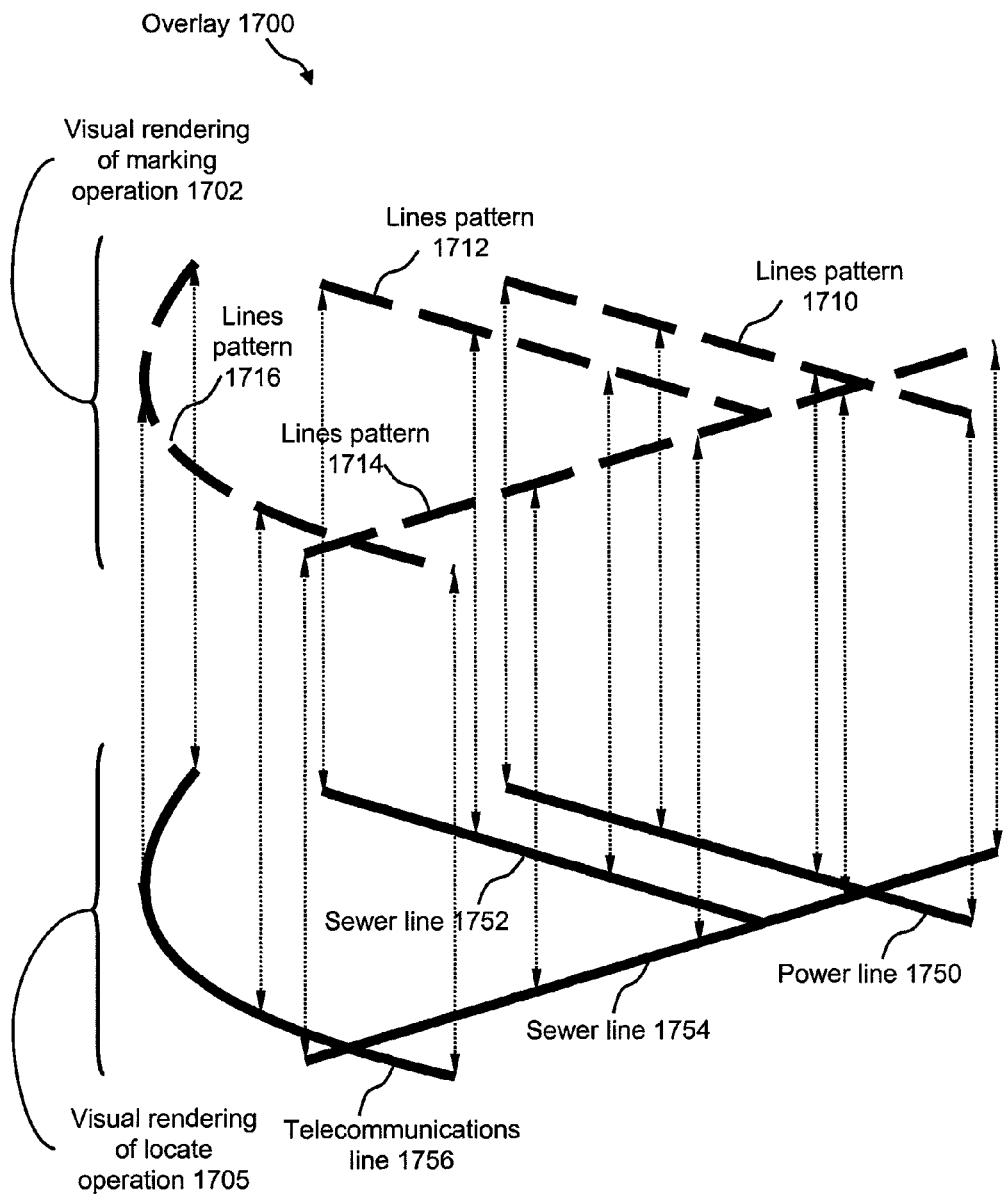
FIG. 12 is an example of a computer-aided visual rendering illustrating an overlay of marking information and locate information, in accordance with some embodiments of the present disclosure.

FIG. 12 illustrates a perspective view of an overlay 1700 of a visual rendering 1702 of a marking operation on a visual rendering 1705 of a locate operation to provide a user with a visual picture of where locate marks were dispensed relative to the detected locations of facility lines, according to one embodiment. From the overlay 1700, a viewer may obtain an "at-a-glance" qualitative view of the marking information as compared to the locate information. For example, in FIG. 12, the visual rendering 1702 or the marking operation includes: 1) a lines pattern 1716 correlated to telecommunications line 1756 of the visual rendering 1705 of the locate operation; 2) a lines pattern 1712 correlated to sewer line 1752; 3) a lines pattern 1714 correlated to telecommunications line 1754; and 4) a lines pattern 1710 correlated to power line 1750. Overlay 1700 of FIG. 12 is an example of a comparison that illustrates significant correspondence between the marking operation and the locate operation (i.e., substantially no discrepancies between the marking geo-location data and the locate geo-location data). However, those skilled in the art will recognize that discrepancies may occur. In such situations, the overlay of the locate marks for a particular facility line may be displaced from the detected location of the facility line.

More specifically, various techniques may be employed to assist the human user in making the visual comparisons of marking information and locate information. For example, the information used to render line patterns may be suitably filtered, interpolated, smoothed or otherwise processed, as discussed above, to enhance the appearance of the line patterns. Additionally, features corresponding to marking data and features corresponding to locate data may be differentiated in a display field in any of a variety of manners (e.g., different line types, symbols or patterns; different colors or shades of related colors; different vertical planes of display, etc.) to allow for visual perception of both the marking data and the locate data.

To further facilitate visual observations of available information from electronic renderings, in one embodiment, each of the marking information/data and the locate information data, if present in a computer-aided visual rendering, as well as any constituent information forming part of the marking data and the locate data, may be displayed as separate "layers" of the visual rendering, such that a viewer of the visual rendering may turn on and turn off displayed data based on a categorization of the displayed data. For example, some or all marking data may be categorized generally under one layer designation (e.g., "Marking"), and independently enabled or disabled for display (e.g., hidden) accordingly. Similarly, all locate data may be categorized generally under another layer designation (e.g., "Locate") and independently enabled or disabled for display accordingly. Respective layers may be enabled or disabled for display in any of a variety of manners; for example, in one implementation, a "layer directory" or "layer legend" pane may be included in the display field (or as a separate window selectable from the display field of the visual rendering), showing all available layers, and allowing a viewer to select each available layer to be either displayed or hidden, thus facilitating comparative viewing of layers.

Furthermore, any of the above-mentioned general categories for layers may have sub-categories for sub-layers, such that each sub-layer may also be selectively enabled or disabled for viewing by a viewer. For example, under the general layer designation of "Marking," different facility types that may have been marked (and indicated in the marking data by color, for example) may be categorized under different sub-layer designations (e.g., "Marking—Electric;" "Marking—Gas;" etc.); in this manner, a viewer may be able to hide the electric marking data while viewing the gas marking data, or vice versa, in addition to having the option to view or hide all marking data. Sub-layer designations similarly may be employed for the locate data (e.g., "Locate—water/sewer;" "Locate—CATV"). Virtually any characteristic of the information available for display may serve to categorize the information for purposes of displaying layers or sub-layers.

VII. CONCLUSION

In sum, information relating to a marking operation (e.g., marking information) may be compared to a variety of reference information for purposes of assessing a quality of the marking operation. The types of reference information may include geographic information, facility type information, landmark information, and/or other information relating to the facilities identified during a current or prior locate operation (e.g., locate information). For example, the comparison may generally involve determining whether there is agreement between data representative of a marking operation and data representative of one or more sets of corresponding reference information (e.g., locate information), and may further comprise identifying at least one correspondence or discrepancy between the compared data, and in some instances a degree of correspondence.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. In a computer comprising at least one hardware processor, at least one non-transitory tangible storage medium, and at least one input/output (I/O) interface, a method for evaluating a quality of a locate operation and/or a marking operation to identify a presence or an absence of at least one underground facility at a work site, the method comprising:
   A) comparing, by the at least one hardware processor, marking information relating to the marking operation to locate information relating to the locate operation, wherein:
      the marking information includes a first set of geo-location data points indicating first geographic locations at which at least one facility line of the at least one underground facility was marked during the locate and/or marking operation; and
      the locate information includes a second set of geo-location data points indicating second geographic locations at which the at least one facility line of the at least one underground facility was detected during the locate and/or marking operation,
      and wherein A) comprises:
      A1) comparing the first set of geo-location data points with the second set of geo-location data points; and
      A2) determining a distance between at least one point in the first set and a nearest point in the second set to generate at least one distance value;
   B) automatically generating at least one indication of a quality assessment of the locate and/or marking operation, wherein B) comprises:
      B1) generating the at least one indication of the quality assessment based, at least in part, on the at least one distance value generated in A2);
      B2) generating the at least one indication of the quality assessment as a score or grade having one of a plurality of possible values; and
      B3) assigning to the locate and/or marking operation the score or grade as the at least one indication of the quality assessment of the locate and/or marking operation; and
   C) electronically storing on the at least one tangible storage medium, and/or electronically transmitting via the at least one I/O interface, the at least one indication of the quality assessment so as to provide an electronic record of the quality assessment;
   wherein at least one of the marking information and the locate information includes at least two of:
   at least one location at which locating equipment was used to perform the locate and/or marking operation;
   facility-type information identifying at least one underground facility for which the presence or the absence was detected and/or marked during the locate and/or marking operation;
   facility location information identifying a location of the at least one underground facility for which a field-service technician detected and/or marked the presence or the absence during the locate and/or marking operation;
   marking material type information identifying at least one characteristic of a marking material used to mark the presence or the absence of the at least one underground facility;
   signal information identifying a signal strength measured by a locate device at the location of the at least one underground facility for which the field-service technician detected the presence or the absence during the locate and/or marking operation;
   position information identifying an angle and/or acceleration of the locating equipment during the locate and/or marking operation;
   environmental information describing at least one environmental condition present during the locate and/or marking operation;
   service-related information including one or more identifiers for the field-service technician performing the locate and/or marking operation, the locating equipment and/or a locate contractor dispatching the field-service technician;
   ticket information relating to a locate request ticket for the locate and/or marking operation; and
   device health information about a status of one or more components of the locating equipment.

2. The method of claim 1, wherein one of the locate operation and the marking operation is a current operation, and wherein the other of the locate operation and the marking operation is a historical operation.

3. The method of claim 1, wherein the computer comprises at least one display device, and wherein the method further comprises:
   displaying the at least one indication of the quality assessment on the at least one display device.

4. The method of claim 1, wherein the locate and/or marking operation is performed by at least one technician, and wherein C) comprises:
   transmitting at least one feedback message to the at least one technician prior to completion of the location and/or marking operation, the feedback message being generated based at least in part on the at least one indication of the quality assessment generated in B).

5. The method of claim 1, further comprising:
obtaining at least one of the marking information and the locate information from at least one historical ticket, at least one electronic manifest, and/or at least one electronic record generated by locate equipment used to perform the locate and/or marking information.

6. The method of claim 1, wherein at least one of the marking information and the locate information is generated by the locating equipment used by the field-service technician to perform the locate and/or marking operation, wherein the locating equipment comprises at least one of a marking device, the locate device, and a combined locate and marking device, wherein the method further comprises:
prior to A), receiving at least one of the marking information and the locate information from the locating equipment.

7. The method of claim 6, wherein the at least one of the marking device, the locate device, and the combined locate and marking device includes the computer including the at least one hardware processor executing the method.

8. The method of claim 6, wherein A), B), and C) are performed during or immediately following the locate and/or marking operation, and wherein the method further comprises:
D) altering at least one operating characteristic of the locating equipment based on the at least one indication of the quality assessment.

9. The method of claim 8, wherein the at least one indication of the quality assessment comprises a numeric score indicative of the quality of the locate and/or marking operation, and wherein D) further comprises:
D1) altering the at least one operating characteristic of the locating equipment if the numeric score is below a predetermined threshold.

10. The method of claim 8, wherein D) comprises disabling the locating equipment if the at least one indication of the quality assessment is unsatisfactory.

11. The method of claim 1, wherein at least one of the marking information and the locate information comprises an electronic manifest of the locate and/or marking operation, the electronic manifest comprising:
at least one image of the work site; and
at least one electronic marking on the image indicating the presence or the absence of the at least one underground facility.

12. The method of claim 11, wherein the electronic manifest further comprises first geographic information indicating the location of the at least one electronic marking.

13. The method of claim 12, wherein the method further comprises:
A1) prior to A), selecting for comparison at least some of the marking information and/or at least some of the locate information based at least in part on a dig area indicator that indicates a dig area of the work site on a digital image.

14. The method of claim 13, wherein A1) comprises:
receiving, via the at least one I/O interface, geographic coordinates for the dig area indicator; and
selecting the at least some of the marking information, and/or the at least some of the locate information, that relates only to a geographic area including the geographic coordinates for the dig area indicator.

15. The method of claim 14, wherein the geographic area is within a predetermined radius of the geographic coordinates for the dig area indicator.

16. The method of claim 13, wherein the dig area indicator delimits the dig area on the digital image, and wherein A1) comprises:
receiving, via the at least one I/O interface, dig area indicator geographic information including geographic coordinates for the dig area indicator; and
selecting the at least some of the marking information, and/or the at least some of the locate information, that relates only to a geographic area delimited by the dig area indicator geographic information.

17. The method of claim 1, wherein A2) comprises:
determining the distance between each point in the first set and the nearest point in the second set to generate a distance vector including a plurality of distance values.

18. The method of claim 1, wherein the first set of geo-location data points is expressed in a first reference frame and the second set of geo-location data points is expressed in a second reference frame different from the first reference frame, and wherein the processor transforms at least one of the first set of geo-location data points and the second set of geo-location data points to a common reference frame.

19. The method of claim 1, wherein B2) comprises:
providing at least one quality assessment criterion relating to at least one of the marking information and the locate information;
providing at least two scoring categories for the at least one quality assessment criterion, each scoring category associated with a scoring value or grade;
for each scoring category providing an expected data value or range of expected data values;
determining, for the at least one quality assessment criterion, into which of the at least two scoring categories the locate and/or marking operation falls by comparing the at least one of the marking information and the locate information to the expected data value or range of expected data values for at least one of the at least two scoring categories; and
wherein B3) comprises assigning to the locate and/or marking operation the scoring value or grade associated with the scoring category into which the locate and/or marking operation falls.

20. An apparatus for evaluating a quality of a locate and/or marking operation to identify a presence or an absence of at least one underground facility at a work site, the apparatus comprising:
at least one input/output (I/O) interface;
at least one memory storing processor-executable instructions; and
a processor coupled to the memory and the at least one I/O interface, wherein upon execution of the processor-executable instructions by the processor, the processor:
A) compares marking information relating to the marking operation to locate information relating to the locate operation, wherein:
the marking information includes a first set of geo-location data points indicating first geographic locations at which at least one facility line of the at least one underground facility was marked during the locate and/or marking operation; and
the locate information includes a second set of geo-location data points indicating second geographic locations at which the at least one facility line of the at least one underground facility was detected during the locate and/or marking operation,
and wherein A) comprises:
A1) comparing the first set of geo-location data points with the second set of geo-location data points; and A2) determining a distance between at least one point in the first set and a nearest point in the second set to generate at least one distance value;

B1) automatically generates, based on A), at least one indication of a quality assessment of the locate and/or marking operation as a score or grade having one of a plurality of possible values; and B2) automatically assigns to the locate and/or marking operation the score or grade as the at least one indication of the quality assessment of the locate and/or marking operation; and C) controls the at least one memory so as to electronically store, and/or controls the at least one I/O interface so as to electronically transmit, the at least one indication of the quality assessment so as to provide an electronic record of the quality assessment;

wherein at least one of the marking information and the locate information includes at least two of:

at least one location at which locating equipment was used to perform the locate and/or marking operation;

facility-type information identifying at least one underground facility for which the presence or the absence was detected and/or marked during the locate and/or marking operation;

facility location information identifying a location of the at least one underground facility for which a field-service technician detected and/or marked the presence or the absence during the locate and/or marking operation;

marking material type information identifying at least one characteristic of a marking material used to mark the presence or the absence of the at least one underground facility;

signal information identifying a signal strength measured by the locate device at the location of the at least one underground facility for which the field-service technician detected the presence or the absence during the locate and/or marking operation;

position information identifying an angle and/or acceleration of the locating equipment during the locate and/or marking operation;

environmental information describing at least one environmental condition present during the locate and/or marking operation;

service-related information including one or more identifiers for the field-service technician performing the locate and/or marking operation, the locating equipment and/or a locate contractor dispatching the field-service technician;

ticket information relating to a locate request ticket for the locate and/or marking operation; and device health information about a status of one or more components of the locating equipment.

21. At least one non-transitory computer-readable storage medium encoded with instructions that, when executed by a processor in a computer comprising at least one input/output (I/O) interface, perform a method for evaluating a quality of a locate and/or marking operation to identify a presence or an absence of at least one underground facility within a work site, the method comprising:

A) comparing marking information relating to the marking operation to locate information relating to the locate operation, wherein:

the marking information includes a first set of geo-location data points indicating first geographic locations at which at least one facility line of the at least one underground facility was marked during the locate and/or marking operation; and the locate information includes a second set of geo-location data points indicating second geographic locations at which the at least one facility line of the at least one underground facility was detected during the locate and/or marking operation, and wherein A) comprises:

A1) comparing the first set of geo-location data points with the second set of geo-location data points; and A2) determining a distance between at least one point in the first set and a nearest point in the second set to generate at least one distance value;

B1) automatically generating, based on A), at least one indication of a quality assessment of the locate and marking operation;

B2) generating the at least one indication of the quality assessment as a score or grade having one of a plurality of possible values;

B3) assigning to the locate and/or marking operation the score or grade as the at least one indication of the quality assessment of the locate and/or marking operation; and C) electronically storing on the at least one computer-readable storage medium, and/or electronically transmitting via the at least one I/O interface, the at least one indication of the quality assessment so as to provide an electronic record of the quality assessment;

wherein at least one of the marking information and the locate information includes at least two of:

at least one location at which locating equipment was used to perform the locate and/or marking operation;

facility-type information identifying at least one underground facility for which the presence or the absence was detected and/or marked during the locate and/or marking operation;

facility location information identifying a location of the at least one underground facility for which a field-service technician detected and/or marked the presence or the absence during the locate and/or marking operation;

marking material type information identifying at least one characteristic of a marking material used to mark the presence or the absence of the at least one underground facility;

signal information identifying a signal strength measured by the locate device at the location of the at least one underground facility for which the field-service technician detected the presence or the absence during the locate and/or marking operation;

position information identifying an angle and/or acceleration of the locating equipment during the locate and/or marking operation;

environmental information describing at least one environmental condition present during the locate and/or marking operation;

service-related information including one or more identifiers for the field-service technician performing the locate and/or marking operation, the locating equipment and/or a locate contractor dispatching the field-service technician;

ticket information relating to a locate request ticket for the locate and/or marking operation; and device health information about a status of one or more components of the locating equipment.

22. An apparatus for automatically assessing a quality of a locate and/or marking operation, the apparatus comprising:

a memory storing processor-executable instructions;

at least one I/O interface; and a processor coupled to the memory and the at least one I/O interface, wherein upon execution of the processor-executable instructions, the processor:

A) identifies at least one first geographic location at which at least one facility line of at least one underground facility was marked during the marking operation;

B) obtains marking geo-location data based on A) to provide at least some marking information;

C) identifies at least one second geographic location at which the at least one facility line of at least one underground facility was detected during the locate operation;

D) obtains locate geo-location data based C) to provide at least some locate information;

E) determines a measure of distances between the marking geo-location data and the locate geo-location data;

F) assesses the quality of the locate and/or marking operation based at least in part on E); and G) generates at least one indication of a quality assessment of the locate and/or marking operation based on F), wherein in G) the processor generates the at least one indication of the quality assessment based, at least in part, on a percentage of distances determined in E) that are less than a first threshold;

wherein at least one of the marking information and the locate information further includes at least two of:

at least one location at which locating equipment was used to perform the locate and/or marking operation;

facility-type information identifying at least one underground facility for which the presence or the absence was detected and/or marked during the locate and/or marking operation;

facility location information identifying a location of the at least one underground facility for which a field-service technician detected and/or marked the presence or the absence during the locate and/or marking operation;

marking material type information identifying at least one characteristic of a marking material used to mark the presence or the absence of the at least one underground facility;

signal information identifying a signal strength measured by the locate device at the location of the at least one underground facility for which the field-service technician detected the presence or the absence during the locate and/or marking operation;

position information identifying an angle and/or acceleration of the locating equipment during the locate and/or marking operation;

environmental information describing at least one environmental condition present during the locate and/or marking operation;

service-related information including one or more identifiers for the field-service technician performing the locate and/or marking operation, the locating equipment and/or a locate contractor dispatching the field-service technician;

ticket information relating to a locate request ticket for the locate and/or marking operation; and device health information about a status of one or more components of the locating equipment.

23. The apparatus of claim 22, wherein in F), the processor statistically analyzes the measure of distances to assess the quality of the locate and/or marking operation.

* * * * *